United States Patent
Ono

(10) Patent No.: US 10,333,412 B2
(45) Date of Patent: Jun. 25, 2019

(54) POWER DELIVERY DEVICE, AC ADAPTER, AC CHARGER, ELECTRONIC APPARATUS AND POWER DELIVERY SYSTEM

(71) Applicant: ROHM CO., LTD., Ukyo-ku, Kyoto-shi, Kyoto (JP)

(72) Inventor: Akihiro Ono, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/684,397

(22) Filed: Aug. 23, 2017

(65) Prior Publication Data
US 2018/0131283 A1  May 10, 2018

Related U.S. Application Data

(63) Continuation of application No. PCT/JP2016/052630, filed on Jan. 29, 2016.

(30) Foreign Application Priority Data

Feb. 23, 2015  (JP) .................................. 2015-032981

(51) Int. Cl.
*H02M 3/335* (2006.01)
*H02J 7/04* (2006.01)
(Continued)

(52) U.S. Cl.
CPC .......... *H02M 3/33507* (2013.01); *G06F 1/26* (2013.01); *G06F 1/266* (2013.01); *H02J 1/00* (2013.01);
(Continued)

(58) Field of Classification Search
CPC ......... H02M 3/33507; H02M 3/33553; H02M 3/33576; H02M 3/33584; H02M 3/33592;
(Continued)

(56) References Cited

U.S. PATENT DOCUMENTS 5,349,523 A * 9/1994 Inou .................. H02M 3/33515
                                                            363/21.05
5,675,480 A * 10/1997 Stanford ............... H02M 3/285
                                                             307/58
(Continued)

FOREIGN PATENT DOCUMENTS

CN       101728958 A       6/2010
CN       103166487 A       6/2013
(Continued)

OTHER PUBLICATIONS

B. Dunstan et al., "USB Power Delivery Specification," USB Power Delivery Specification Revision 1.0; Jun. 2013, pp. 1-328, Version 1.2.

(Continued)

*Primary Examiner* — Gary L Laxton
*Assistant Examiner* — Sisay G Tiku
(74) *Attorney, Agent, or Firm* — Cantor Colburn LLP

(57) ABSTRACT

A PD device comprises: a DC/DC converter disposed between an input and a VBUS output; a primary-side controller configured to control an input current of the DC/DC converter; a signal conversion and switching circuit coupled to a control input and configured to executes signal conversion and switching; an output capacitor $C_O$ connected between the VBUS output and the signal conversion and switching circuit; and a secondary-side controller coupled to the signal conversion and switching circuit, and configured to receive the control input signals subjected to the signal conversion and switching executed in the signal conversion and switching circuit, and to feed back the control input signals to the primary-side controller. The primary-side controller varies an output voltage value and an available output current value (MAX value) of the DC/DC converter (Continued)

by controlling the input current on the basis of the control input signals fed back from the secondary-side controller.

19 Claims, 58 Drawing Sheets

(51) Int. Cl.
| | |
|---|---|
| H02J 7/06 | (2006.01) |
| H02J 1/00 | (2006.01) |
| G06F 1/26 | (2006.01) |
| H02J 1/06 | (2006.01) |
| H02M 3/28 | (2006.01) |
| H02M 1/00 | (2006.01) |

(52) U.S. Cl.
CPC .............. *H02J 1/06* (2013.01); *H02M 3/285* (2013.01); *H02M 3/33523* (2013.01); *H02M 3/33576* (2013.01); H02M 2001/0006 (2013.01); H02M 2001/007 (2013.01); H02M 2001/008 (2013.01)

(58) Field of Classification Search
CPC ............... H02M 3/28; H02M 3/33546; H02M 3/33523; H02M 3/335; H02J 7/04; H02J 7/06
See application file for complete search history.

(56) References Cited

U.S. PATENT DOCUMENTS

| | | | | |
|---|---|---|---|---|
| 9,190,914 | B2 * | 11/2015 | Asai | H02M 3/33507 |
| 9,320,118 | B2 * | 4/2016 | Gruber | H05B 37/0254 |
| 9,853,553 | B2 * | 12/2017 | Zhang | H02M 3/33523 |
| 9,859,803 | B2 * | 1/2018 | Strzalkowski | H02M 3/33584 |
| 9,893,626 | B2 * | 2/2018 | Wang | H02M 3/33507 |
| 10,033,288 | B2 * | 7/2018 | Yao | H02M 3/33576 |
| 2012/0307530 | A1 * | 12/2012 | Miyazaki | H02M 1/36 363/21.01 |
| 2013/0155737 | A1 | 6/2013 | Jeong | |
| 2014/0136863 | A1 * | 5/2014 | Fritchman | G06F 1/26 713/310 |
| 2014/0192565 | A1 | 7/2014 | Wang | |
| 2014/0192656 | A1 | 7/2014 | Chandramouli et al. | |
| 2014/0313792 | A1 * | 10/2014 | Nate | H02M 3/33523 363/21.15 |
| 2014/0313793 | A1 * | 10/2014 | Ono | H02M 3/33523 363/21.15 |
| 2014/0313794 | A1 * | 10/2014 | Ono | H02M 3/33523 363/21.15 |
| 2014/0369084 | A1 * | 12/2014 | Freeman | H02M 3/33523 363/21.03 |
| 2015/0229149 | A1 * | 8/2015 | Fahlenkamp | H02J 7/0044 320/114 |
| 2015/0280573 | A1 * | 10/2015 | Gong | H02M 3/33523 363/21.14 |
| 2016/0079878 | A1 * | 3/2016 | Lin | H02M 3/33592 363/21.14 |
| 2016/0373014 | A1 * | 12/2016 | Pflaum | H02M 3/33523 |
| 2017/0040819 | A1 * | 2/2017 | Ono | H02J 7/0052 |
| 2017/0040820 | A1 * | 2/2017 | Ono | H02J 7/0052 |
| 2017/0170734 | A1 * | 6/2017 | Sheng | H02M 3/33507 |
| 2018/0254648 | A1 * | 9/2018 | Harju | H02J 7/0052 |
| 2018/0367045 | A1 * | 12/2018 | Zhang | H02M 1/08 |

FOREIGN PATENT DOCUMENTS

| | | |
|---|---|---|
| CN | 103715901 A | 4/2014 |
| CN | 103872918 A | 6/2014 |
| CN | 104038066 A | 9/2014 |
| JP | 2011082802 A | 4/2011 |
| JP | 2013126373 A | 6/2013 |
| JP | 2014138458 A | 7/2014 |
| WO | 2009128025 A1 | 10/2009 |

OTHER PUBLICATIONS

International Search Report for corresponding Application No. PCT/JP2016/052630; dated Apr. 19, 2016.
Taiwan Office Action of the Intellectual Property Office corresponding to Application No. 1051045810; dated Oct. 11, 2018.
SIPO First Office Action corresponding to Application No. 201680010648.4; dated Dec. 21, 2018.

\* cited by examiner

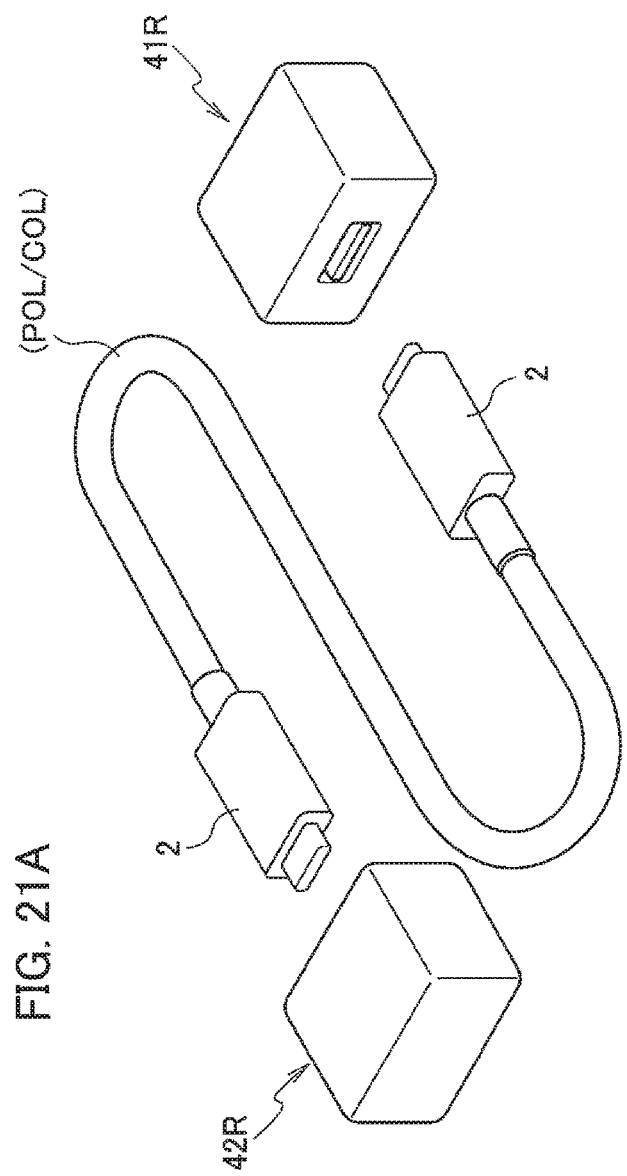

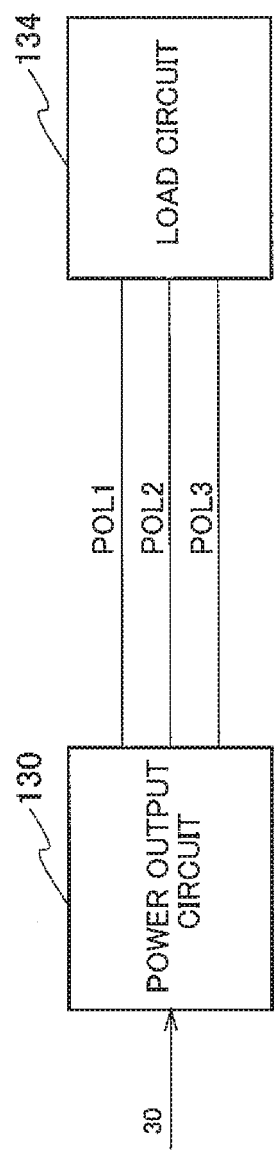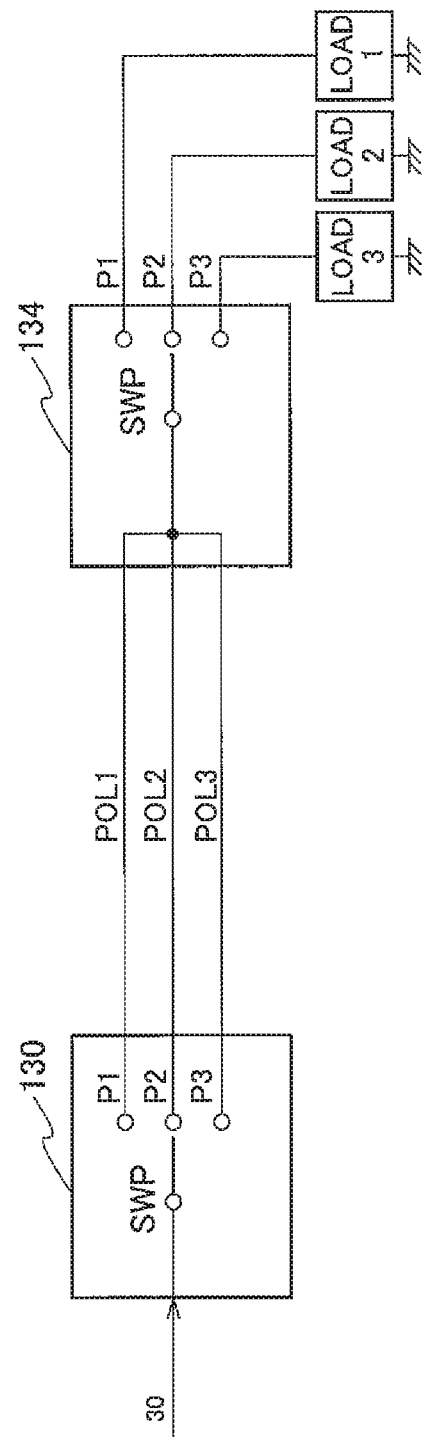
FIG. 22A
FIG. 22B

POWER DELIVERY DEVICE, AC ADAPTER, AC CHARGER, ELECTRONIC APPARATUS AND POWER DELIVERY SYSTEM

CROSS REFERENCE TO RELATED APPLICATIONS

This is a continuation application of PCT Application No. PCT/JP2016/052630, filed on Jan. 29, 2016, which claims priority to Japan Patent Application No. 2015-032981 filed on Feb. 23, 2015 and is based upon and claims the benefit of priority from prior Japanese Patent Applications No. 2015-032981 filed on Feb. 23, 2015 and PCT Application No. PCT/JP2016/052630, filed on Jan. 29, 2016, the entire contents of each of which are incorporated herein by reference.

FIELD

Embodiments described herein relate to a Power Delivery device (PD device), an Alternating-Current (AC) adapter, an AC charger, an electronic apparatus, and a Power Delivery system (PD system).

BACKGROUND

Conventionally, there have been provided Direct Current (DC) outlets which can intercommunicate between terminal devices and power line carrier communication networks supporting telecommunications standards with a Power Delivery (PD).

There are Power over Ethernet (PoE) technology and Universal Serial Bus (USB) technology as a Power Delivery technology (PD technology) using data lines.

As the USB technologies, there are USB 2.0 Standard up to maximum supply power of 2.5 W, USB 3.1 Standard up to maximum supply power of 4.5 W, and Battery Charging (BC) Revision 1.2 up to maximum supply power of 7.5 W according to the Power Delivery level (PD level).

Moreover, a USB Power Delivery (USB PD) Specification is compatible with existing cables and existing connectors, and coexists also with the USB 2.0 Standard, the USB 3.1 Standard, and the USB-BC Revision 1.2. In such a specification, values of the charging current and voltage is selectable within a range of voltage 5V-12V-20V and a range of current 1.5 A-2 A-3 A-5 A, and the USB electric charging and power transmission can be achieved to be 10 W, 18 W, 36 W, 65 W, and the maximum of 100 W.

DC/DC converters have been used as a power source for achieving such a PD. There are a diode rectification system and a synchronous rectification method in the DC/DC converters.

SUMMARY

The embodiments provide a PD device, an AC adapter, an AC charger, an electronic apparatus, and a PD system, each capable of switching with respect to a plurality of apparatuses, and each capable of controlling an output voltage value and an available output current value (MAX value).

According to one aspect of the embodiments, there is provided a power delivery device comprising: a DC/DC converter disposed between an input and a VBUS output; a primary-side controller configured to control an input current of the DC/DC converter; a signal conversion and switching circuit coupled to a control input, the signal conversion and switching circuit configured to execute signal conversion and switching of a control input signal of the control input; an output capacitor connected between the VBUS output and the signal conversion and switching circuit; and a secondary-side controller coupled to the signal conversion and switching circuit, the secondary-side controller configured to receive the control input signals subjected to the signal conversion and switching executed in the signal conversion and switching circuit, and configured to feed back the received control input signals to the primary-side controller, wherein the primary-side controller varies an output voltage value and an available output current value of the DC/DC converter by controlling the input current on the basis of the control input signal fed back from the secondary-side controller.

According to another aspect of the embodiments, there is provided a power delivery device, comprising: a DC/DC converter disposed between an input and a VBUS output; a primary-side controller configured to control an input current of the DC/DC converter; a signal conversion and switching circuit coupled to a control input, the signal conversion and switching circuit configured to execute signal conversion and switching of a control input signal of the control input; and a secondary-side controller coupled to the signal conversion and switching circuit, the secondary-side controller configured to receive the control input signals subjected to the signal conversion and switching executed in the signal conversion and switching circuit, and configured to feed back the received control input signals to the primary-side controller, wherein the primary-side controller varies an output voltage value and an available output current value of the DC/DC converter by controlling the input current on the basis of the control input signal fed back from the secondary-side controller.

According to a still another aspect of the embodiments, there is provided a power delivery device, comprising: DC/DC converter disposed between an input and a VBUS output; a primary-side controller configured to control an input current of the DC/DC converter; a coupling capacitor coupled to a control input; an output capacitor coupled between the VBUS output and the control input; and a secondary-side controller coupled to the control input through the coupling capacitor, the secondary-side controller configured to receive the VBUS output and a control input signal of the control input, and configured to feed back the received control input signal to the primary-side controller, wherein the primary-side controller varies an output voltage value and an available output current value of the DC/DC converter by controlling the input current on the basis of the control input signal fed back from the secondary-side controller.

According to a yet another aspect of the embodiments, there is provided a power delivery device, comprising: a DC/DC converter disposed between an input and a VBUS output; a primary-side controller configured to control an input current of the DC/DC converter; a signal conversion and switching circuit coupled to a plurality of control inputs, the signal conversion and switching circuit configured to execute switching of control input signals of the plurality of the control inputs; an insulation circuit coupled to the signal conversion and switching circuit, the insulation circuit configured to receive the control input signal switched in the signal conversion and switching circuit, and then feed back the received control input signal to the primary-side controller; and an output capacitor connected between the VBUS output and the signal conversion and switching circuit, wherein the primary-side controller varies an output voltage value and an available output current value of the DC/DC converter by controlling the input current on the basis of the control input signal fed back from the insulation circuit.

According to a further aspect of the embodiments, there is provided an AC adapter comprising the above-mentioned power delivery device.

According to a still further aspect of the embodiments, there is provided an AC charger comprising the above-mentioned power delivery device.

According to a yet further aspect of the embodiments, there is provided an electronic apparatus comprising the above-mentioned power delivery device.

According to the embodiments, there can be provided the PD device, the AC adapter, the AC charger, the electronic apparatus, and the PD system, each capable of switching with respect to the plurality of the apparatuses, and each capable of controlling the output voltage value and the available output current value (MAX value).

BRIEF DESCRIPTION OF DRAWINGS

FIG. 21A is a schematic configuration diagram showing an aspect of connecting between the PD devices according to the first embodiment through receptacles and a plug cable.

FIG. 21B is a diagram showing a connecting relationship between the two receptacles.

FIG. 22A is a schematic block configuration diagram for explaining a connecting relationship between a power output circuit applicable to the PD device according to the first embodiment, and a power input circuit.

FIG. 22B is a schematic circuit configuration diagram corresponding to the configuration shown in FIG. 22A.

DESCRIPTION OF EMBODIMENTS

Figure 1:
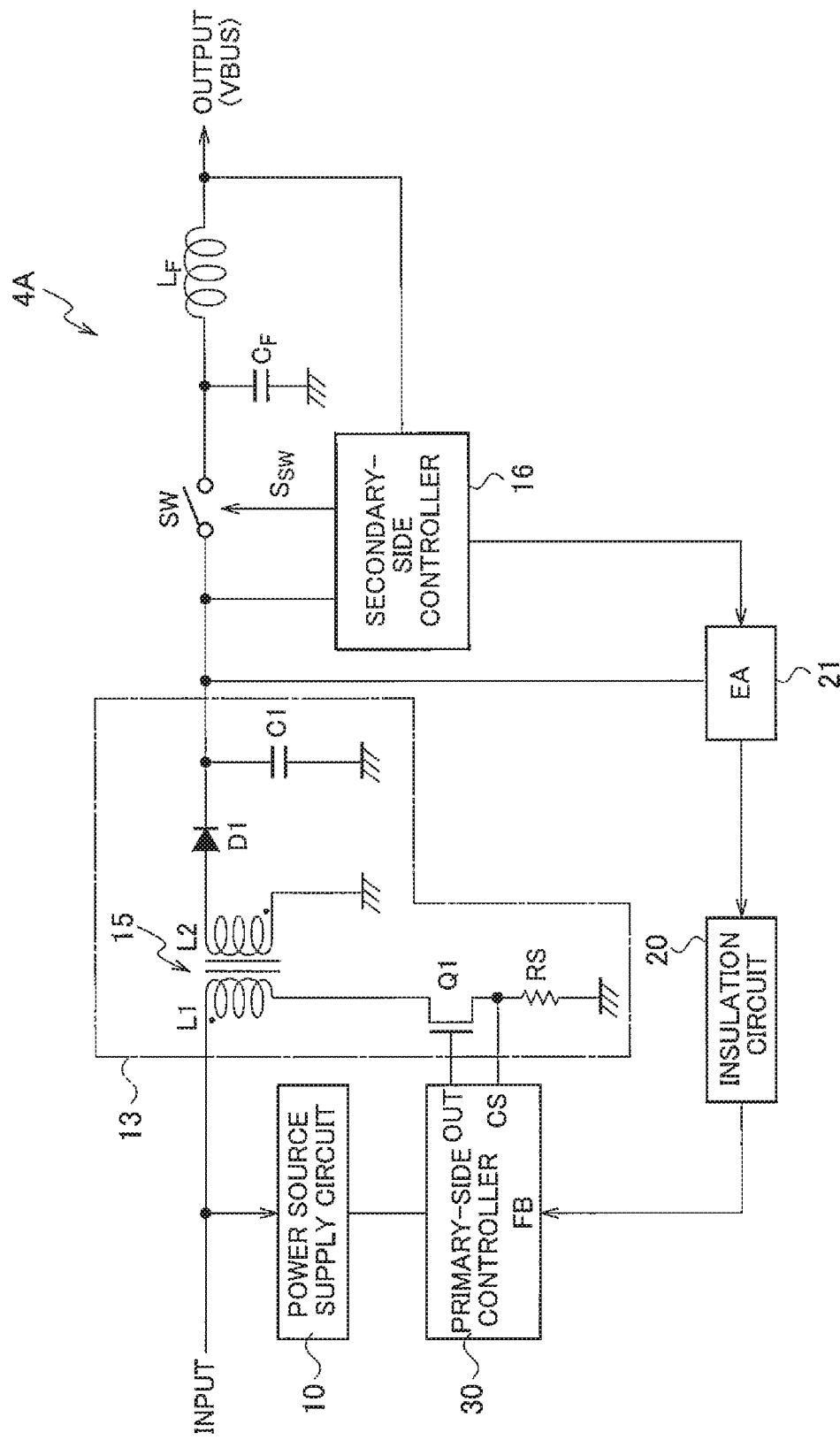
FIG. 1 is a schematic circuit block configuration diagram showing a PD device according to basic technology.

Next, certain embodiments will now be described with reference to drawings. In the description of the following drawings, the identical or similar reference numeral is attached to the identical or similar part. However, it should be noted that the drawings are schematic and therefore the relation between thickness and the plane size and the ratio of the thickness differs from an actual thing. Therefore, detailed thickness and size should be determined in consideration of the following explanation.

Moreover, the embodiments shown hereinafter exemplify the apparatus and method for materializing the technical idea; and the embodiments does not specify the material, shape, structure, placement, etc. of each component part as the following. The embodiments may be changed without departing from the spirit or scope of claims.

Basic Technology

As shown in FIG. 1, a PD device 4A according to a basic technology includes: a DC/DC converter 13 disposed between an input and an output, DC/DC converter 13 including a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 connected between the input and the primary-side controller 30, the power source supply circuit 10 configured to supply a power source to the primary-side controller 30; a secondary-side controller 16 connected to the output, the secondary-side controller 16 capable of controlling an output voltage $V_o$ and an output current $I_o$; an error amplifier 21 for error compensation connected to an output of the DC/DC converter 13 and the secondary-side controller 16; and an insulation circuit 20 connected to the error amplifier 21, the insulation circuit 20 configured to feed back output information to the primary-side controller 30.

Moreover, the secondary-side controller 16 may be connected to the output (VBUS) through an AC coupling capacitor.

Moreover, as shown in FIG. 1, the PD device 4A according to the basic technology includes: a switch SW configured to interrupt the output of the DC/DC converter 13 and the power line output (VBUS); and a filter circuit ($L_F$, $C_F$) disposed between the switch SW and the power line output (VBUS). ON/OFF control for the switch SW can be executed by the secondary-side controller 16.

An AC signal is superimposed to be input into the power line output (VBUS) from an outside, in the PD device 4A according to the basic technology.

In the PD device 4A according to the basic technology, the control input signal is input into the secondary-side controller 16 from the power line output (VBUS), and electric power information at the output side is fed back to the primary-side controller 30 through the error amplifier 21 and the insulation circuit 20. The primary-side controller 30 controls ON/OFF of the MOS transistor Q1, thereby stabilizing the output voltage.

Moreover, in the PD device 4A according to the basic technology, an amount of current conducted to the primary-side inductance L1 is detected by the current sensing resistor RS, and an amount of current, e.g. a primary-side overcurrent, is controlled in the primary-side controller 30. As a consequence, the PD device 4A according to the basic technology has a variable function of an output voltage value and available output current value (MAX value).

In the PD device 4A according to the basic technology, the variable function of the output voltage value and the available output current value (MAX value) of the step-down (buck) type DC/DC converter 13 is realized by the feedback control from the secondary-side controller 16 to the primary-side controller 30. Accordingly, a relationship between the output voltage $V_o$ and the output currents $I_o$ can be varied (variable function) in accordance with loads (e.g., smartphones, laptop PCs, tablet PCs, etc.) connected to the output.

The inductance $L_F$ formed with a filter coil at the output side is a separating inductance. More specifically, the filter circuit including the inductance $L_F$ and the capacitor $C_F$ separates a control signal from the DC/DC converter in order that the control input signal from the output is not input into the DC/DC converter 13.

First Embodiment

Figure 2:
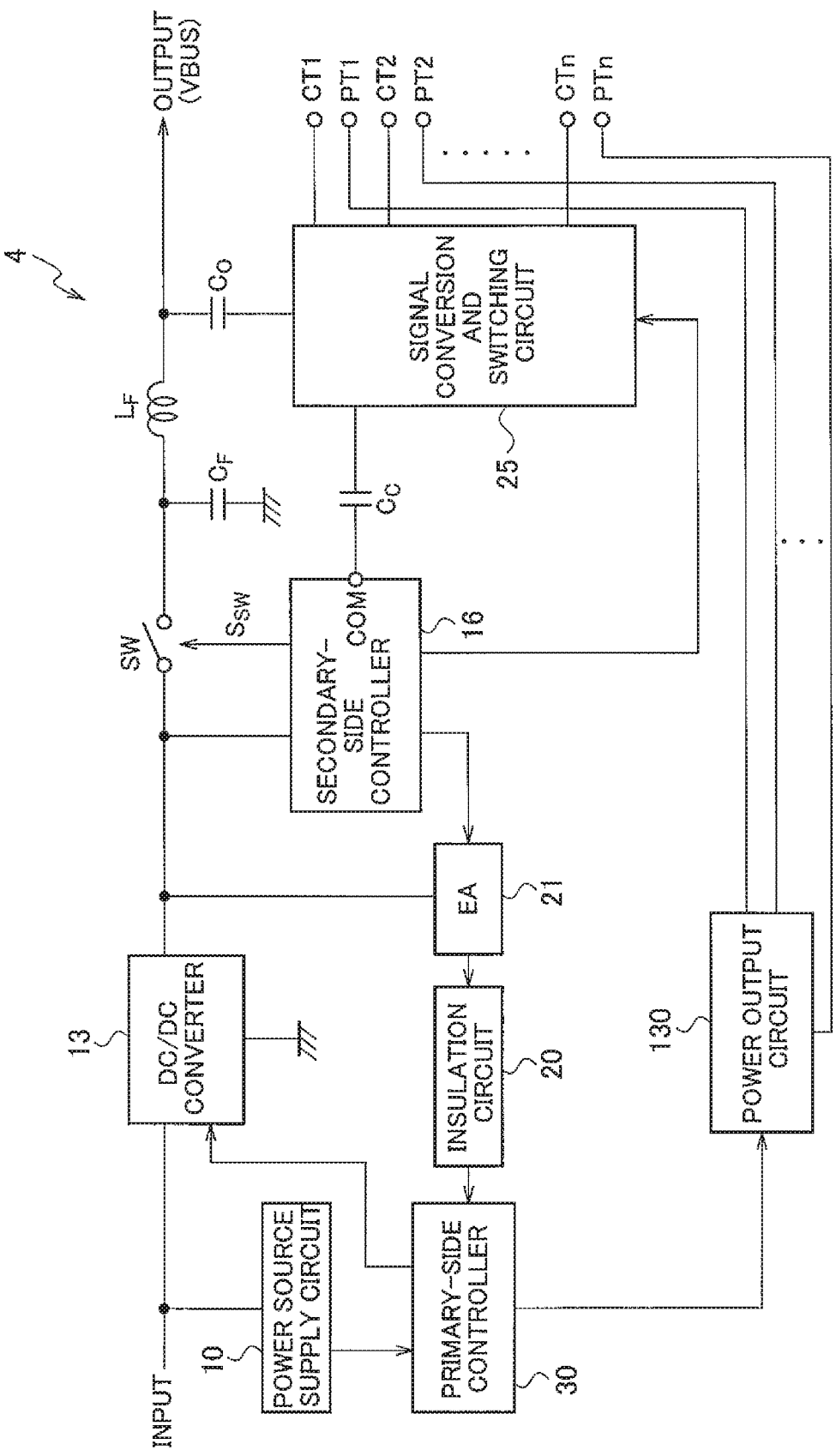
FIG. 2 is a schematic circuit block configuration diagram showing a PD device according to a first embodiment.

As shown in FIG. 2, a PD device 4 according to the first embodiment includes: a DC/DC converter 13 disposed between an input and a VBUS output; a primary-side controller 30 configured to control an input current of the DC/DC converter 13; a signal conversion and switching circuit 25 coupled to a control input, the signal conversion and switching circuit 25 configured to execute signal conversion and switching of a control input signal of the control input; an output capacitor $C_O$ connected between the VBUS output and the signal conversion and switching circuit 25; and a secondary-side controller 16 coupled to the signal conversion and switching circuit 25, the secondary-side controller 16 configured to receive the control input signal subjected to the signal conversion and switching executed in the signal conversion and switching circuit 25, and configured to feed back the received control input signal to the primary-side controller 30. In this context, the primary-side controller 30 varies an output voltage value and an available output current value (MAX value) of the DC/DC converter 13 by controlling the input current on the basis of the control input signal fed back from the secondary-side controller 16.

Moreover, the PD device 4 according to the first embodiment may include a coupling capacitor $C_C$ configured to couple the secondary-side controller 16 and the signal conversion and switching circuit 25 to each other, as shown in FIG. 2.

Moreover, the PD device 4 according to the first embodiment may include AC coupling capacitors $C_{A1}$, $C_{A2}$, and $C_{An}$ configured to respectively couple the signal conversion and switching circuit 25 and the control inputs (CT1, CT2, ..., CTn) to each other.

Moreover, the signal conversion and switching circuit 25 can further execute signal conversion and switching of an AC signal component of the VBUS output. The AC signal component of the VBUS output is coupled to the signal conversion and switching circuit 25 through the output capacitor $C_O$ connected between the VBUS output and the signal conversion and switching circuit 25.

Moreover, as shown in FIG. 2, the signal conversion and switching circuit 25 may be coupled to a plurality of control inputs, and may execute signal conversion and switching of the plurality of control input signals, in the PD device 4 according to the first embodiment.

Moreover, as shown in FIG. 2, the PD device 4 according to the first embodiment may include a power output circuit 130 connected to the primary-side controller 30, the power output circuit 130 configured to supply output voltages to a plurality of VBUS power outputs disposed in pairs with the plurality of the control inputs.

Figure 3:
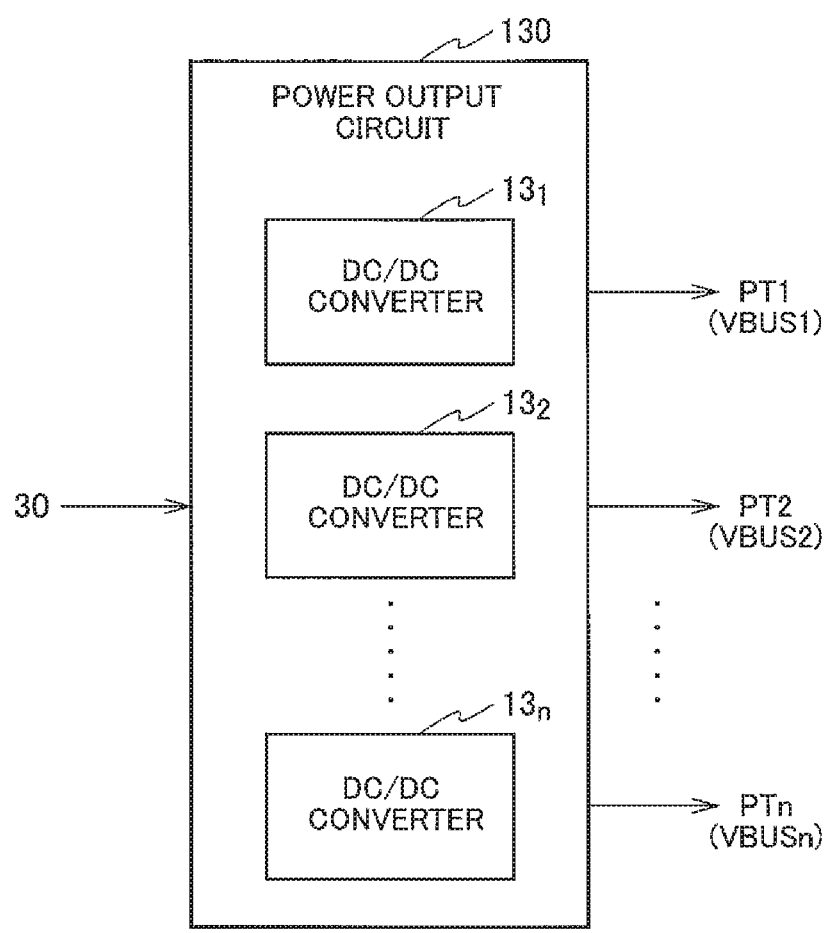
FIG. 3 is a schematic block configuration diagram showing a power output circuit applicable to the PD device according to the first embodiment.

FIG. 3 shows a schematic block configuration of the power output circuit 130 applicable to the PD device 4 according to the first embodiment. As shown in FIG. 3, the power output circuit 130 applicable to the PD device 4 according to the first embodiment may include a plurality of DC/DC converters $13_1$, $13_2$, ..., $13_n$.

The control input signal switched in the signal conversion and switching circuit 25 is input into a communication terminal COM of the secondary-side controller 16.

Moreover, as shown in FIG. 2, the PD device 4 according to the first embodiment may include a plurality of control terminals CT1, CT2, ..., CTn, and the plurality of the control inputs may be respectively coupled to the plurality of the controls terminals CT1, CT2, ..., CTn. Moreover, the respective control output signals of the PD device 4 according to the first embodiment can be output to an external apparatuses through the plurality of the respective control terminals CT1, CT2, ..., CTn.

Moreover, as shown in FIG. 2, the PD device 4 according to the first embodiment includes a plurality of VBUS power output terminals PT1, PT2, ..., PTn, and the power output circuit 130 can supply the output voltages through the plurality of the VBUS power output terminals PT1, PT2, ..., PTn.

Moreover, the PD device 4 according to the first embodiment may include AC coupling capacitors (not shown)

coupled to the plurality of the control inputs, and the signal conversion and switching circuit 25 may be coupled to the plurality of the control inputs respectively through the AC coupling capacitors.

Moreover, the plurality of the control inputs may be directly connected to the signal conversion and switching circuit 25. More specifically, the control input signals of the plurality of the control inputs may be directly input to the signal conversion and switching circuit 25 without through the AC coupling capacitors, as shown in FIG. 2.

Moreover, the PD device 4 according to the first embodiment may include a coupling capacitor $C_C$ configured to couple the secondary-side controller 16 and the signal conversion and switching circuit 25 to each other. Moreover, the secondary-side controller 16 and the signal conversion and switching circuit 25 may be directly connected to each other without through the coupling capacitor $C_C$.

In the PD device 4 according to the first embodiment, the signal conversion and switching circuit 25 can execute a frequency conversion, a direct current (DC) level conversion, or an amplitude level conversion, for example.

Moreover, in the PD device 4 according to the first embodiment, the signal conversion and switching circuit 25 may be controlled by the secondary-side controller 16.

Moreover, as shown in FIG. 2, the PD device 4 according to the first embodiment may include the insulation circuit 20 connected to the secondary-side controller 16, the insulation circuit 20 configured to feed back the control input signal to the primary-side controller 30. A capacitor, a photo coupler, a transformer, etc. is applicable to the insulation circuit 20. Moreover, as usage, a bidirectional transformer having an insulated driver, a bilateral device, etc. may also be applied thereto.

Moreover, as shown in FIG. 2, the PD device 4 according to the first embodiment may include the error amplifier 21 for error compensation connected to the secondary-side controller 16, the error amplifier 21 configured to feed back the control input signal to the insulation circuit 20. The error amplifier 21 is controlled by the secondary-side controller 16 and can execute an error compensation of the control input signal to be fed back to the insulation circuit 20.

Moreover, as shown in FIG. 2, the PD device 4 according to the first embodiment may include the switch SW connected to the output of the DC/DC converter 13, the switch SW configured to interrupt an output voltage of the DC/DC converter 13. The output of the DC/DC converter 13 and the power line output (VBUS) can be interrupted by the switch SW. ON/OFF control for the switch SW can be executed by the secondary-side controller 16. The switch SW may include a Metal Oxide Semiconductor Field Effect Transistor (MOSFET).

Moreover, as shown in FIG. 2, the PD device 4 according to the first embodiment may include a power source supply circuit 10 connected between an input of the DC/DC converter 13 and the primary-side controller 30, the power source supply circuit 10 configured to supply electric power to the primary-side controller 30.

An AC signal is superimposed to be input into the power line output (VBUS) from an outside of the PD device 4, in the PD device 4 according to the first embodiment. More specifically, a plurality of control inputs are provided with the power line output (VBUS). Accordingly, there will be required the separating inductance $L_F$. More specifically, the filter circuit including the inductance $L_F$ and the capacitor $C_F$ can separate the control signal from the DC/DC converter so that the control input signal from the output is not input into the DC/DC converter 13.

In the PD device 4 according to the first embodiment, the control input signals are input from the plurality of the control inputs; the control input signals switched in the signal conversion and switching circuit 25 are further input into the secondary-side controller 16; and control information including electric power information at the output side is fed back to the primary-side controller 30 through the error amplifier 18 and the insulation circuit 20 in accordance with the control input signals. The primary-side controller 30 controls ON/OFF of the MOS transistor Q1, thereby stabilizing the output voltage.

In the PD device 4 according to the first embodiment, the variable function of the output voltage value and the available output current value (MAX value) of the step-down (buck) type DC/DC converter 13 is realized by the feedback control from the secondary-side controller 16 to the primary-side controller 30. Accordingly, a relationship between the output voltage $V_o$ and the output currents $I_o$ can be varied (variable function) in accordance with loads (e.g., smartphones, laptop PCs, tablet PCs, etc.) connected to the output.

Figure 4A:
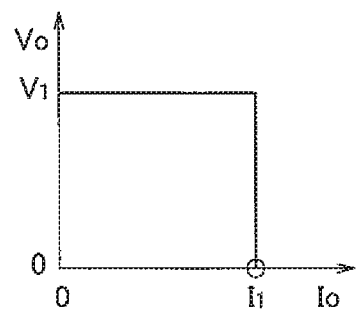
FIG. 4A is a schematic diagram showing a relationship of an output voltage and an output current obtained using the PD device according to the first embodiment, which is an example of a rectangular shape showing a Constant Voltage Constant Current (CVCC).
Figure 4B:
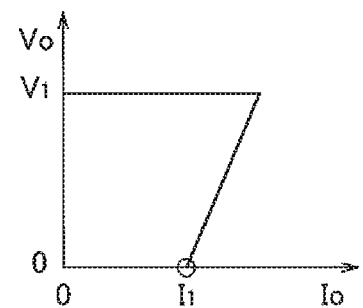
FIG. 4B is a schematic diagram showing the relationship of the output voltage and the output current obtained using the PD device according to the first embodiment, which is an example of a fold-back shape of an inverted trapezium.
Figure 4C:
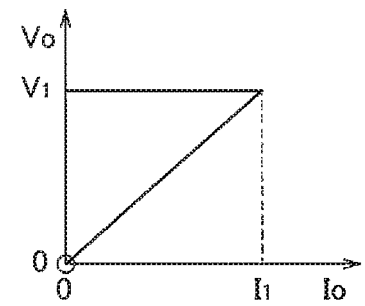
FIG. 4C is a schematic diagram showing the relationship of the output voltage and the output current obtained using the PD device according to the first embodiment, which is an example of a fold-back shape of an inverted triangle.
Figure 4D:
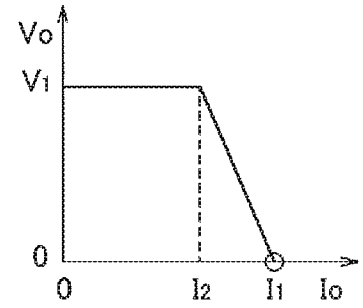
FIG. 4D is a schematic diagram showing the relationship of the output voltage and the output current obtained using the PD device according to the first embodiment, which is an example of a trapezoidal shape.
Figure 4E:
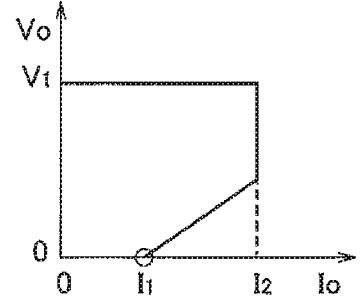
FIG. 4E is a schematic diagram showing the relationship of the output voltage and the output current obtained using the PD device according to the first embodiment, which is an example of a pentagon shape.

As the relationship between the output voltage $V_o$ and the output current $I_o$ obtained by using the PD device 4 according to the first embodiment, there can be adopted various shape, e.g. a rectangular shape as shown in FIG. 4A, a fold-back shape of inverted trapezium as shown in FIG. 4B, a fold-back shape of inverted triangle as shown in FIG. 4C, a trapezoidal shape as shown in FIG. 4D, and a pentagonal shape as shown in FIG. 4E. For example, the rectangular shape shown in FIG. 4A is an example of Constant Voltage Constant Current (CVCC).

Figure 5:
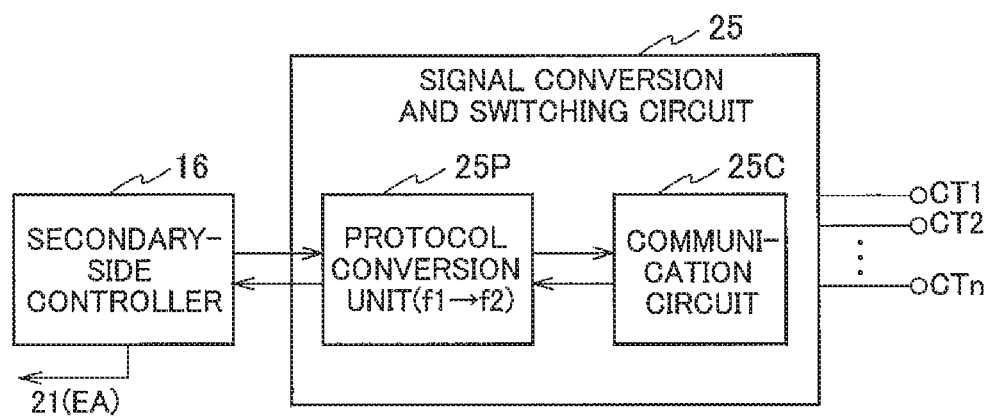
FIG. 5 is a schematic block configuration diagram showing a secondary-side controller and a signal conversion and switching circuit applicable to the PD device according to the first embodiment.

FIG. 5 shows a schematic block configuration of the secondary-side controller 16 and the signal conversion and switching circuit 25 applicable to the PD device according to the first embodiment. Moreover, FIG. 6 shows a schematic block configuration of the secondary-side controller 16 and the signal conversion and switching circuit 25 also including a connecting relationship with the output (VBUS) line.

As shown in FIG. 5, in the PD device according to the first embodiment, the signal conversion and switching circuit 25 may include: a protocol conversion unit 25P connected to the secondary-side controller 16 and configured to execute a frequency conversion; and a communication circuit 25C disposed between the protocol conversion unit 25P and the control input and configured to execute a code conversion.

Figure 6:
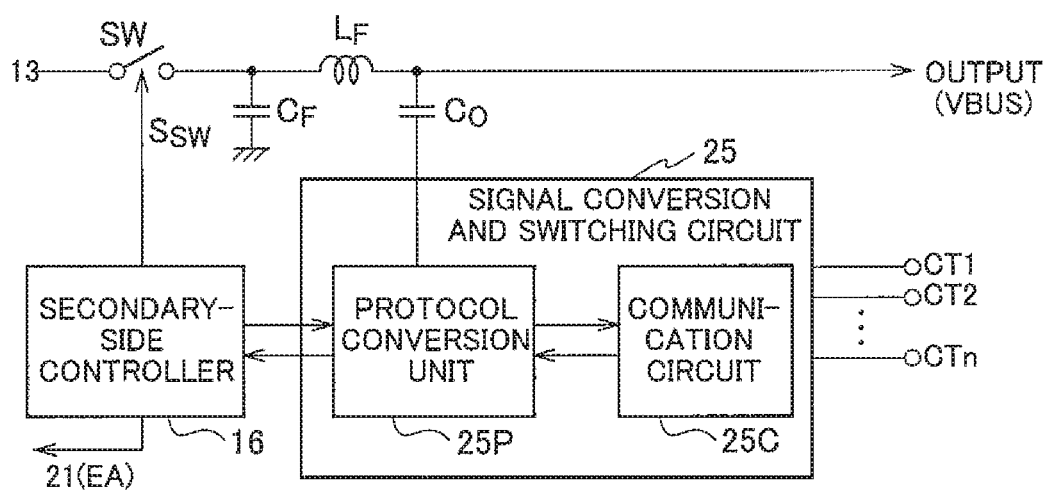
FIG. 6 is a schematic block configuration diagram showing the secondary-side controller and the signal conversion and switching circuit also including a connecting relationship to an output (VBUS) line.

Moreover, as shown in FIG. 6, the output capacitor $C_O$ may be connected between the protocol conversion unit 25P and the VBUS output, in the PD device according to the first embodiment.

The signal conversion and switching circuit 25 can be controlled by the secondary-side controller 16.

In the PD device according to the first embodiment, the control inputs in the plurality of the control terminals CT1, CT2, . . . , CTn are subjected to a coding modulation in the communication circuit 25C, and also are subjected to a frequency conversion from a frequency f1 to a frequency f2 in the protocol conversion unit 25P, and then are input into the secondary-side controller 16.

Moreover, the respective control output signals of the PD device 4 according to the first embodiment can be output to external apparatuses through the plurality of the respective control terminals CT1, CT2, . . . , CTn. More specifically, the control signals from the secondary-side controller 16 are also subjected to a frequency conversion from the frequency f2 to the frequency f1 in the protocol conversion unit 25P, and are also subjected to a coding modulation in the communication circuit 25C, and then can be output to the plurality of the control terminals CT1, CT2, . . . , CTn.

Moreover, the AC signal components superimposed on the VBUS output are subjected to a frequency conversion from the frequency f1 to the frequency f2 through the output capacitor $C_O$ in the protocol conversion unit 25P, and are subjected to a coding modulation in the communication circuit 25C, and then are input into the secondary-side controller 16. Moreover, the control signals from the secondary-side controller 16 are also subjected to a frequency conversion from the frequency f2 to the frequency f1 in the protocol conversion unit 25P, and are also subjected to a coding modulation in the communication circuit 25C, and then can be output to the VBUS output through the output capacitor $C_O$. Thus, a control output signal of the PD device 4 according to the first embodiment can be output to an external apparatus also through the VBUS output.

Configuration of Signal Conversion and Switching Circuit

Configuration Example 1

Figure 7:
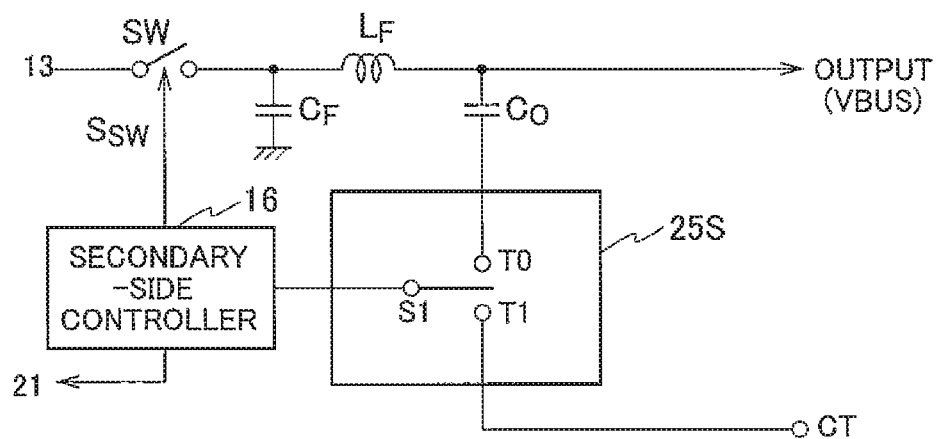
FIG. 7 is a schematic block configuration diagram showing the signal conversion and switching circuit (configuration example 1) applicable to the PD device according to the first embodiment.

FIG. 7 shows a schematic block configuration example 1 of the signal conversion and switching circuit applicable to the PD device according to the first embodiment.

In the PD device according to the first embodiment, as shown in FIG. 7, the signal conversion and switching circuit 25S may include a switch (S1, T0, T1) controlled by the secondary-side controller 16, the switch (S1, T0, T1) configured to select (switch) between the output capacitor $C_O$ and the control input supplied into the control terminal CT.

Configuration Example 2

Figure 8:
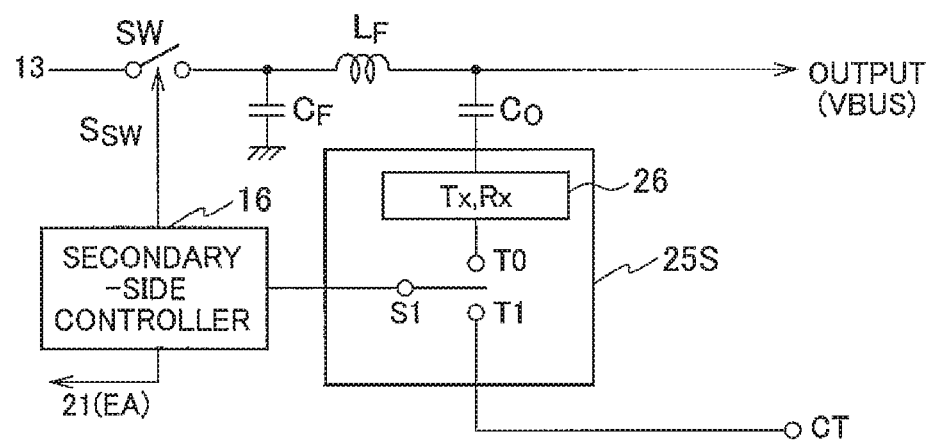
FIG. 8 is a schematic block configuration diagram showing the signal conversion and switching circuit (configuration example 2) applicable to the PD device according to the first embodiment.

FIG. 8 shows a schematic block configuration example 2 of the signal conversion and switching circuit applicable to the PD device according to the first embodiment.

In the PD device according to the first embodiment, as shown in FIG. 8, the signal conversion and switching circuit 25S may include: a transceiver 26 connected to the output capacitor $C_O$; and a switch (S1, T0, T1) controlled by the secondary-side controller 16, the switch (S1, T0, T1) configured to select between the transceiver 26 and the control input supplied into the control terminal CT.

Configuration Example 3

Figure 9:
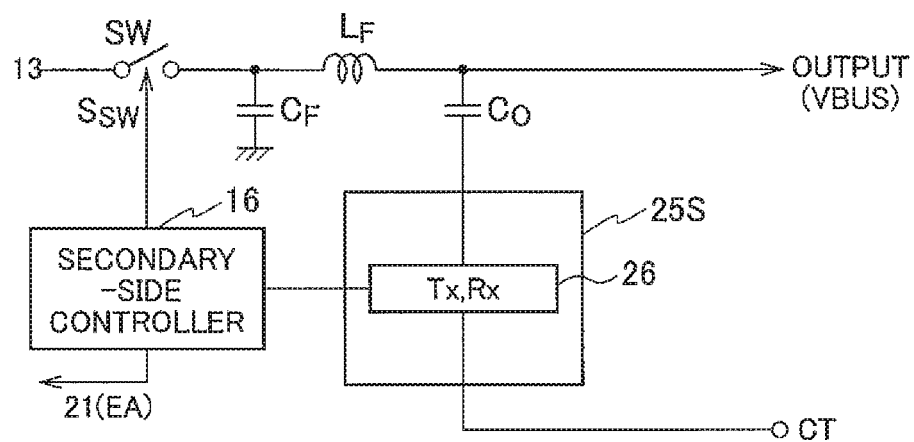
FIG. 9 is a schematic block configuration diagram showing the signal conversion and switching circuit (configuration example 3) applicable to the PD device according to the first embodiment.

FIG. 9 shows a schematic block configuration example 3 of the signal conversion and switching circuit applicable to the PD device according to the first embodiment.

In the PD device according to the first embodiment, as shown in FIG. 9, the signal conversion and switching circuit 25S may include a transceiver 26 controlled by the secondary-side controller 16, the transceiver 26 configured to select between the output capacitor $C_O$ and the control input supplied into the control terminal CT. In this context, the transceiver 26 can execute conversion and switching of transmission and reception signal between the output capacitor $C_O$ and the control input supplied into the control terminal CT.

Configuration Example 4

Figure 10:
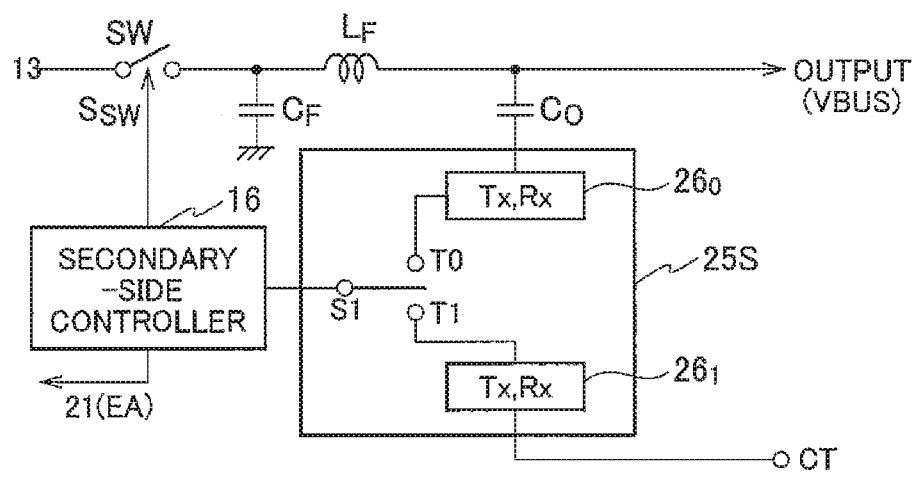
FIG. 10 is a schematic block configuration diagram showing the signal conversion and switching circuit (configuration example 4) applicable to the PD device according to the first embodiment.

FIG. 10 shows a schematic block configuration example 4 of the signal conversion and switching circuit applicable to the PD device according to the first embodiment.

In the PD device according to the first embodiment, as shown in FIG. 10, the signal conversion and switching circuit 25S may include: a first transceiver $26_0$ connected to the output capacitor $C_O$; a second transceiver $26_1$ connected to the control input supplied into the control terminal CT; and a switch (S1, T0, T1) controlled by the secondary-side controller 16, the switch (S1, T0, T1) configured to select between the first transceiver $26_0$ and the second transceiver $26_1$. In this context, the first transceiver $26_0$ and the second transceiver $26_1$ include the same configuration.

Configuration Example 5

Figure 11:
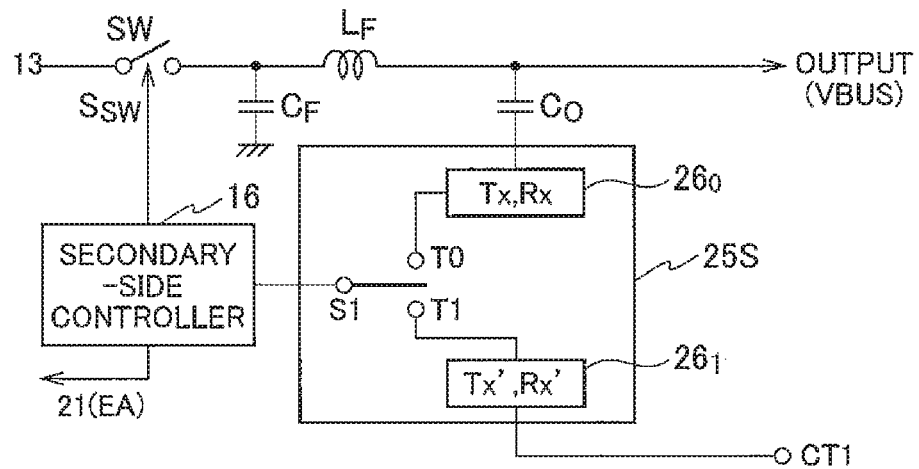
FIG. 11 is a schematic block configuration diagram showing the signal conversion and switching circuit (configuration example 5) applicable to the PD device according to the first embodiment.

FIG. 11 shows a schematic block configuration example 5 of the signal conversion and switching circuit applicable to the PD device according to the first embodiment.

In the PD device according to the first embodiment, as shown in FIG. 11, the signal conversion and switching circuit 25S may include: a first transceiver $26_0$ connected to the output capacitor $C_O$; a second transceiver 261 connected to the control input supplied into the control terminal CT; and a switch (S1, T0, T1) controlled by the secondary-side controller 16, the switch (S1, T0, T1) configured to select between the first transceiver $26_0$ and the second transceiver $26_1$. In this context, the first transceiver $26_0$ and the second transceiver $26_1$ include configurations different from each other.

Configuration Example 6

Figure 12:
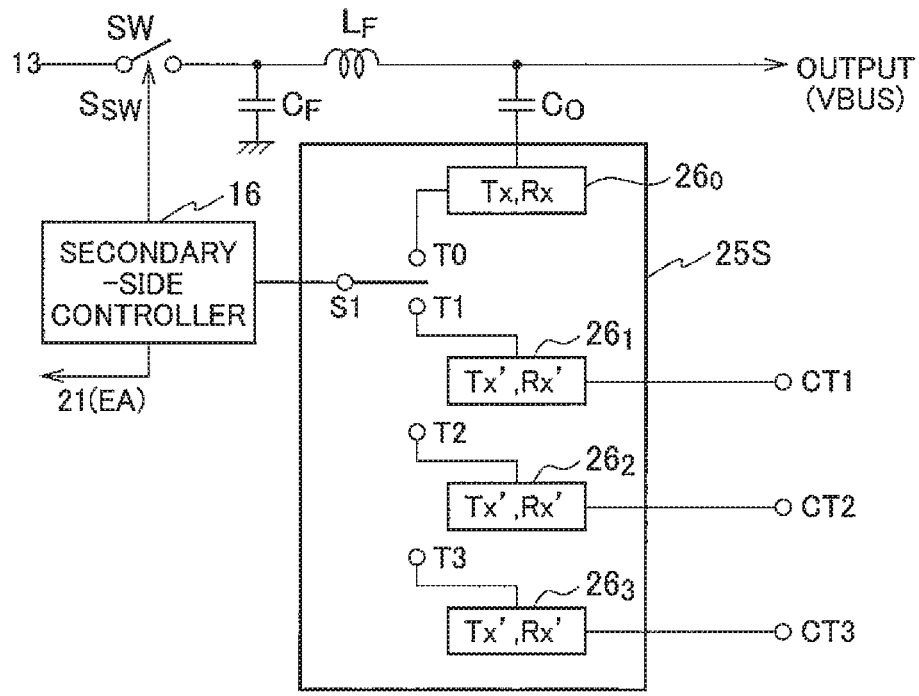
FIG. 12 is a schematic block configuration diagram showing the signal conversion and switching circuit (configuration example 6) applicable to the PD device according to the first embodiment.

FIG. 12 shows a schematic block configuration example 6 of the signal conversion and switching circuit applicable to the PD device according to the first embodiment.

In the PD device according to the first embodiment, as shown in FIG. 12, the signal conversion and switching circuit 25S may include: a first transceiver $26_0$ connected to the output capacitor $C_O$; a plurality of second transceivers $26_1$, $26_2$, and $26_3$ respectively connected to control inputs respectively supplied into a plurality of control terminals CT1, CT2, and CT3; and a switch (S1, T0, T1) controlled by the secondary-side controller 16, the switch (S1, T0, T1) configured to select between the first transceiver $26_0$ and the plurality of the second transceivers $26_1$, $26_2$, and $26_3$. In this context, the plurality of the second transceivers $26_1$, $26_2$, and $26_3$ may include the same configuration, and the first transceiver $26_0$ and the second transceivers $26_1$, $26_2$, and $26_3$ may include configurations different from each other.

Configuration Example 7

Figure 13:
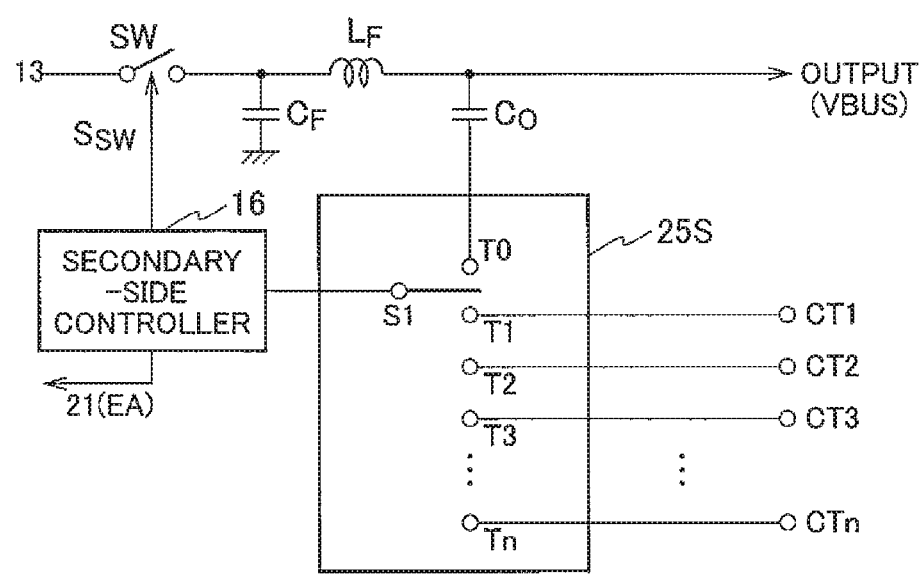
FIG. 13 is a schematic block configuration diagram showing the signal conversion and switching circuit (configuration example 7) applicable to the PD device according to the first embodiment.

FIG. 13 shows a schematic block configuration example 7 of the signal conversion and switching circuit applicable to the PD device according to the first embodiment.

In the PD device according to the first embodiment, as shown in FIG. 13, the signal conversion and switching circuit 25S may include a switch (S1, T0, T1, T2, T3, . . . , Tn) controlled by the secondary-side controller 16, the switch (S1, T0, T1, T2, T3, . . . , Tn) configured to select between the output capacitor $C_O$ and a plurality of control inputs supplied into a plurality of control terminals CT1, CT2, CT3, . . . , CTn.

Configuration Example 8

Figure 14:
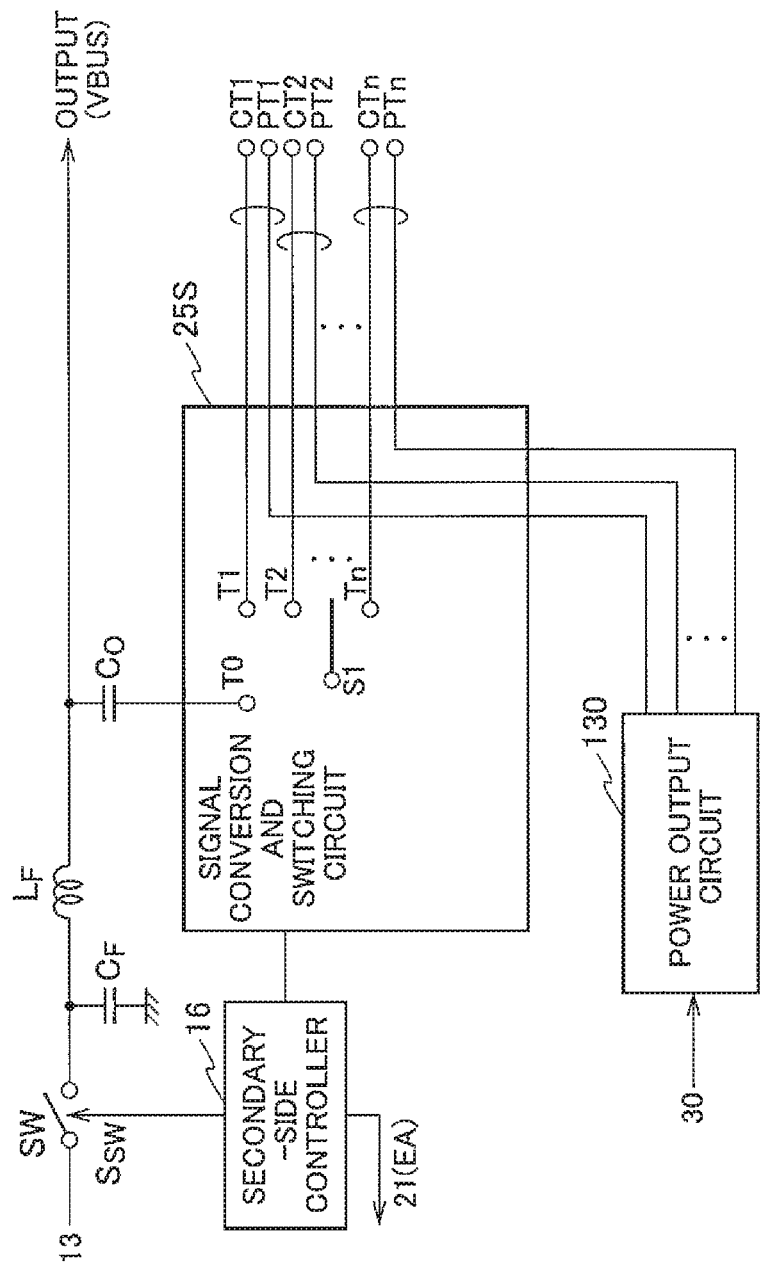
FIG. 14 is a schematic block configuration diagram showing the signal conversion and switching circuit (configuration example 8) applicable to the PD device according to the first embodiment.

FIG. 14 shows a schematic block configuration example 8 of the signal conversion and switching circuit applicable to the PD device according to the first embodiment.

As shown in FIG. 14, the PD device 4 according to the first embodiment may include a power output circuit 130 connected to the primary-side controller 30, the power output circuit 130 configured to supply output voltages to a plurality of VBUS outputs disposed in pairs with the plurality of the control inputs; and the signal conversion and switching circuit 25S may include a switch (S1, T0, T1, T2, T3, . . . , Tn) configured to select a plurality of control inputs.

Moreover, as shown in FIG. 14, the plurality of the control inputs are respectively coupled to a plurality of control terminals CT1, CT2, . . . , CTn. Moreover, the respective control output signals of the PD device 4 according to the first embodiment can be output to external apparatuses through the plurality of the respective control terminals CT1, CT2, . . . , CTn.

Moreover, as shown in FIG. 14, the power output circuit 130 can supply the output voltages respectively through the plurality of the VBUS power output terminals PT1, PT2, . . . , PTn.

Configuration Example 9

Figure 15:
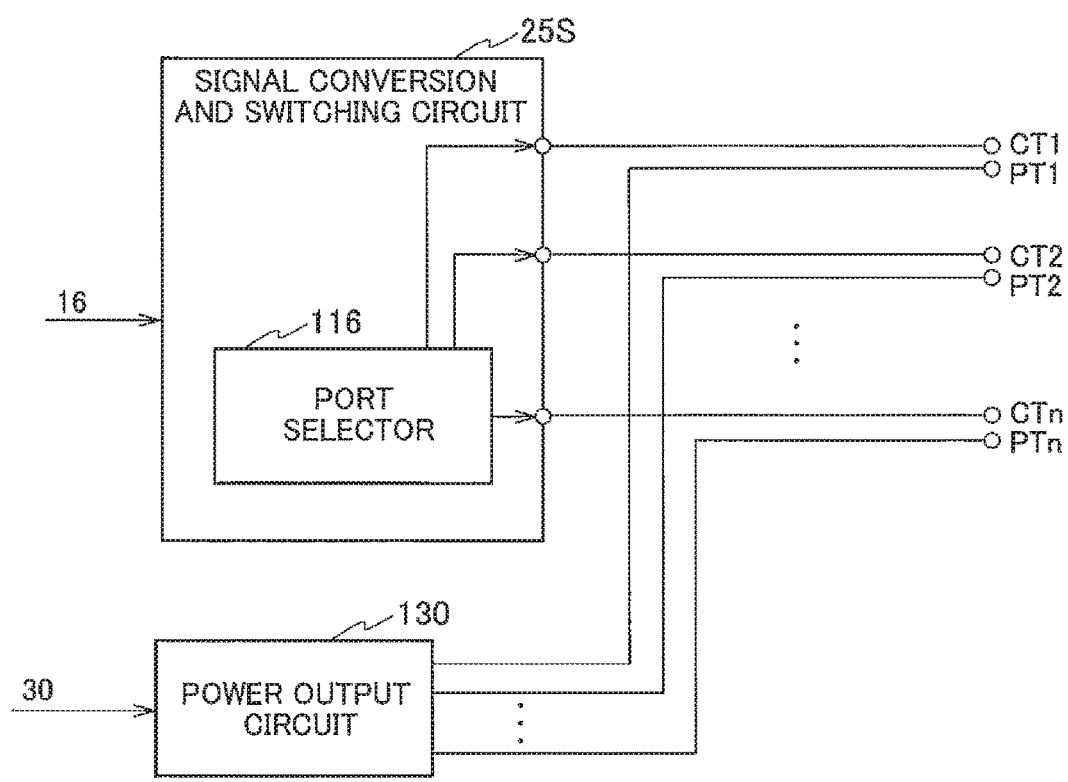
FIG. 15 is a schematic block configuration diagram showing the signal conversion and switching circuit (configuration example 9) applicable to the PD device according to the first embodiment.

FIG. 15 shows a schematic block configuration example 9 of the signal conversion and switching circuit applicable to the PD device according to the first embodiment.

As shown in FIG. 15, the PD device 4 according to the first embodiment may include a power output circuit 130 connected to the primary-side controller 30, the power output circuit 130 configured to supply output voltages to a plurality of VBUS outputs disposed in pairs with the plurality of the control inputs; and the signal conversion and switching circuit 25S may include a port selector 116 configured to select the plurality of the control inputs.

Moreover, as shown in FIG. 15, the plurality of the control inputs are respectively coupled to a plurality of control terminals CT1, CT2, . . . , CTn. Moreover, the respective control output signals of the PD device 4 according to the first embodiment can be output to external apparatuses through the plurality of the respective control terminals CT1, CT2, . . . , CTn.

Moreover, as shown in FIG. 15, the power output circuit 130 can supply the output voltages respectively through the plurality of the VBUS power output terminals PT1, PT2, . . . , PTn.

Figure 16A:
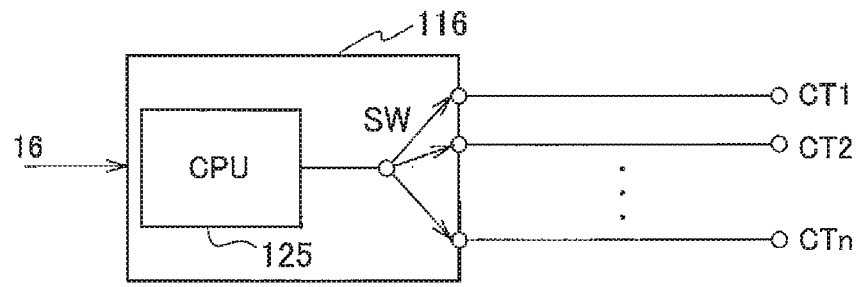
FIG. 16A shows a configuration example of a port selector shown in FIG. 15.
Figure 16B:
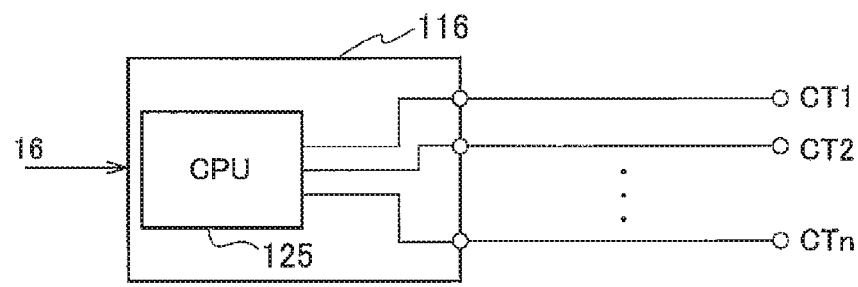
FIG. 16B shows another configuration example of the port selector shown in FIG. 15.

Moreover, FIG. 16A shows a configuration example of the port selector 116, and FIG. 16B shows another configuration example of the port selector 116.

As shown in FIG. 16A, the port selector 116 may include: a CPU 125; and a switch SW connected to the CPU 125, the switch SW configured to select the plurality of the control terminals CT1, CT2, . . . , CTn.

Moreover, as shown in FIG. 16B, the port selector 116 may include a CPU 125 connected to the plurality of the control terminals CT1, CT2, . . . , CTn. More specifically, the CPU 125 itself may include a switch function configured to select the plurality of the control terminals CT1, CT2, . . . , CTn, in the example shown in FIG. 16B.

Configuration Example 10

Figure 17:
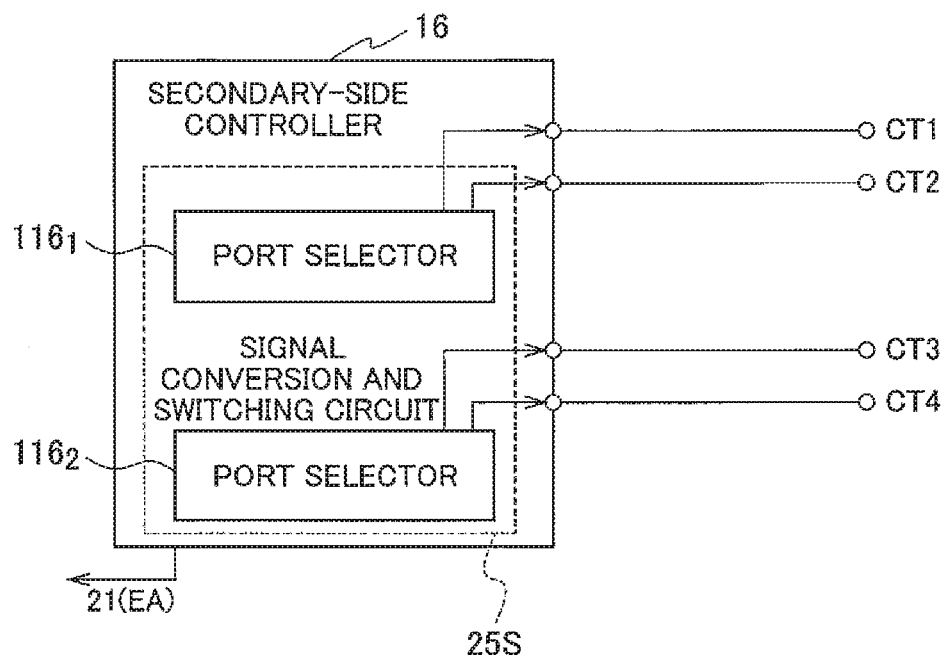
FIG. 17 is a schematic block configuration diagram showing the signal conversion and switching circuit (configuration example 10) applicable to the PD device according to the first embodiment.

FIG. 17 shows a schematic block configuration example 10 of the signal conversion and switching circuit applicable to the PD device according to the first embodiment.

In the PD device according to the first embodiment, as shown in FIG. 17, the signal conversion and switching circuit 25S may be disposed in the inside of the secondary-side controller 16, and may include a plurality of port selectors $116_1$ and $116_2$.

As shown in FIG. 17, the control input terminals CT1 and CT2 are connected to the port selector $116_1$, and the control input terminals CT3 and CT4 are connected to the port selector $116_2$.

In the same manner as the configuration example 8 in FIG. 14 or the configuration example 9 in FIG. 15, the PD device 4 according to the first embodiment may include a power output circuit 130 connected to the primary-side controller 30, the power output circuit 130 configured to supply output voltages to a plurality of VBUS outputs disposed in pairs with the plurality of the control inputs.

In the same manner as the configuration example 9 shown in FIGS. 16A and 16B, each of the port selectors $116_1$ and $116_2$ may include a CPU and a switch connected to the CPU, the switch configured to select the plurality of the control terminals. Alternatively, each of the port selectors $116_1$ and $116_2$ may include a CPU connected to the plurality of the control terminals.

Example of Connection Through Receptacle

Figure 18:
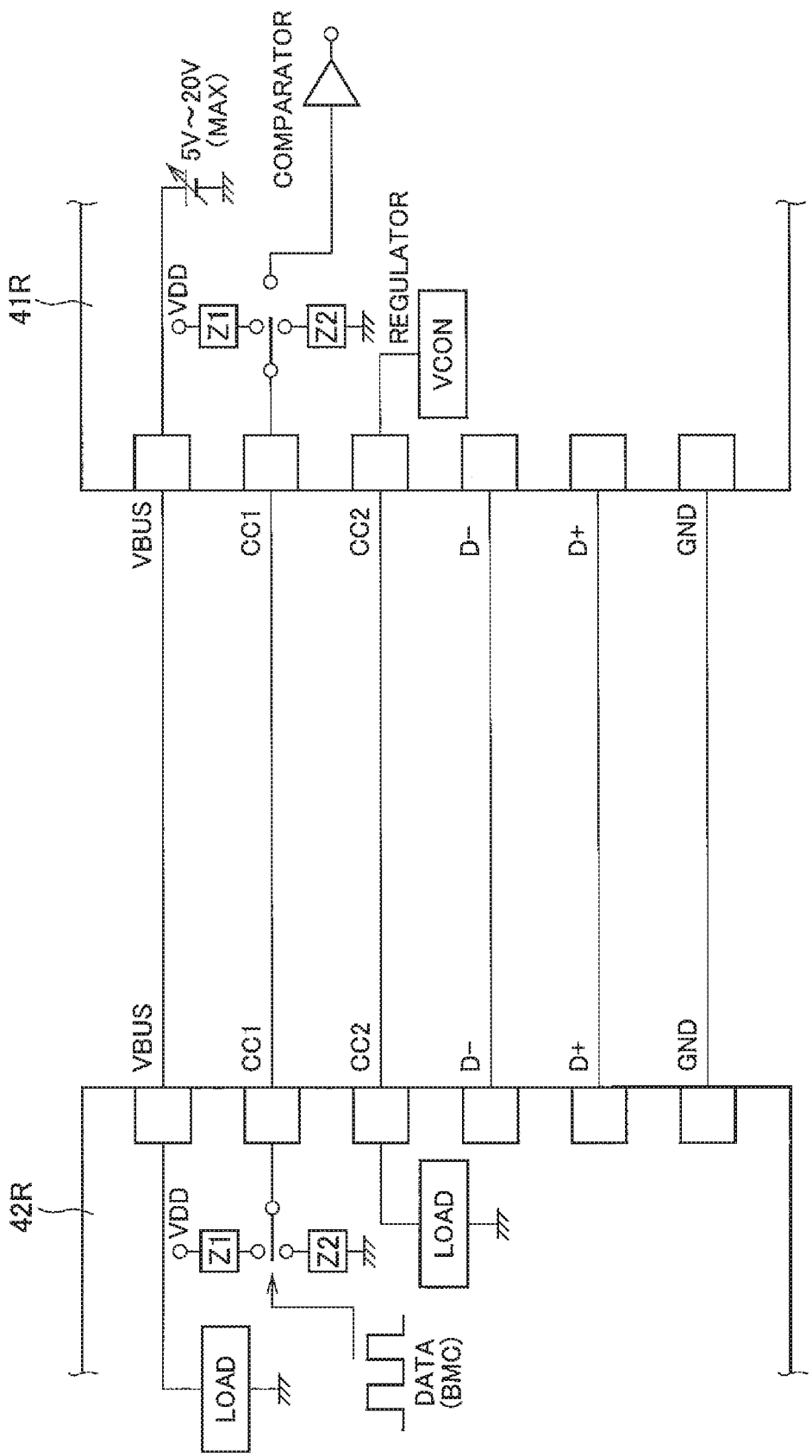
FIG. 18 is a schematic configuration diagram showing an aspect of connecting between the PD devices according to the first embodiment through receptacles.

FIG. 18 shows a schematic configuration of connecting between the PD devices according to the first embodiment through receptacles 41R and 42R.

Each of the receptacles 41R and 42R has a VBUS terminal, a CC1 terminal, a CC2 terminal, a D− terminal, a D+ terminal, and a GND terminal, and is configured to connect between the PD devices according to the first embodiment.

The VBUS terminal is connected to a power line POL used for bidirectional communications between the devices. One of the VBUS terminals is connected to a load (LOAD), and another of the VBUS terminals is connected to a variable power supply of approximately 5V to approximately 20V (MAX), for example. In this context, the variable power supply corresponds to the output voltage of the PD device according to the first embodiment. The GND terminal is a ground terminal (earth terminal).

The CC1 terminal and the CC2 terminal are communication terminals connected to a communication dedicated line COL used for bidirectional communications between the devices. The connecting configuration is set so that a constant voltage can be supplied to the CC1 terminal by a power supply VDD and impedance circuits Z1 and Z2, and data (BMC) is supplied from one of the CC1 terminals and then is received into the other of the CC1 terminals through a comparator, for example. The CC1 terminal may be connected to a constant current supply, instead of supplying the constant voltage. In this context, each of the impedance circuits Z1 and Z2 can be configured by including a parallel circuit including a current source and a resistance, and can select any one of the current source or the resistance. Moreover, a voltage control regulator (VCON) may be connected to one of the CC2 terminals, and a load (LOAD) may be connected to the other of the CC2 terminals.

The D− terminal and the D+ terminal are serial-data interface terminals for realizing a flipping function.

Configuration Example of Inside of Receptacle

Figure 19:
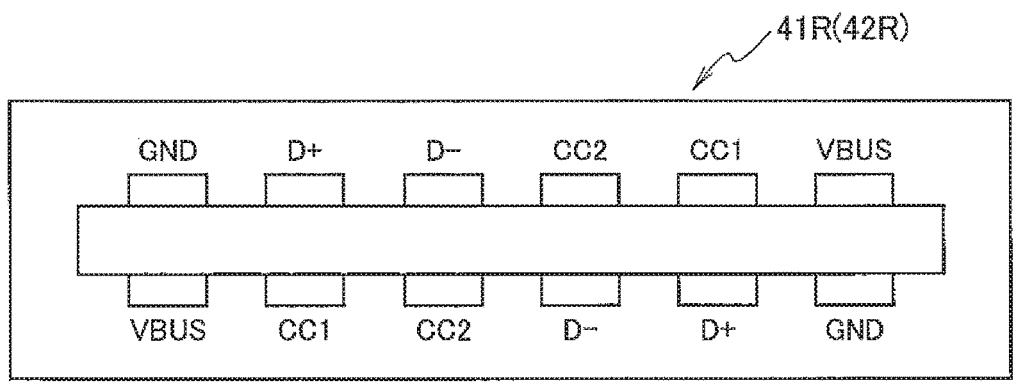
FIG. 19 is a schematic configuration diagram showing the inside of the receptacle applicable to the PD device according to the first embodiment.

FIG. 19 shows a schematic configuration of the inside of the receptacle 41R (42R) applicable to the PD device according to the first embodiment. In the internal configuration of the receptacle 41R (42R), the VBUS, CC1, CC2, D−, D+, and GND terminals are disposed on both sides of a substrate used for disposing terminals. Accordingly, there is no need to distinguish between the upper or lower surface (front or back surface) of the receptacle 41R (42R).

Example of Connection Through Receptacle and Plug

Figure 20:
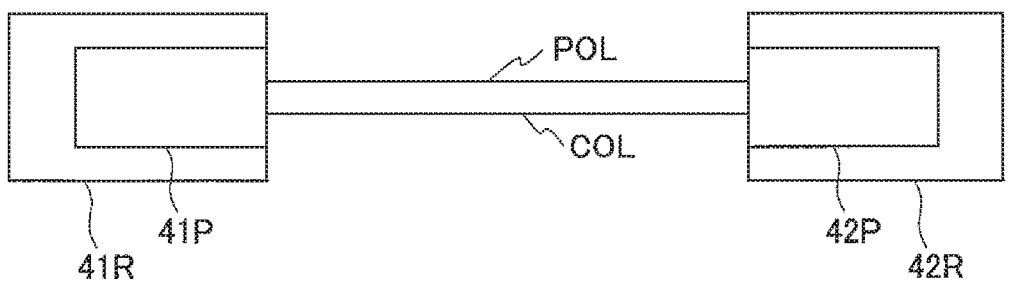
FIG. 20 is a schematic configuration diagram showing an aspect of connecting between the PD devices according to the first embodiment through receptacles and plugs.

FIG. 20 shows a schematic configuration of connecting between the PD devices according to the first embodiment through a receptacle 41R (42R) and a plug 41P (42P). As shown in FIG. 20, by inserting the plug 41P (42P) into the receptacle 41R (42R), an electric power supply becomes available through the power line POL, and data communications also become available through the communication dedicated line COL.

FIG. 21A shows a schematic configuration of connecting between the PD devices according to the first embodiment through the receptacles 41R and 42R, plugs 2, and a cable (POL/COL). In this context, the plug 2 corresponds to the plug 41P (42P) shown in FIG. 20.

The plug 2 has a shape corresponding to the shape of the receptacles 41R and 42R shown in FIG. 19, and includes an electrode on one side surface thereof, and has the VBUS, CC1, CC2, D−, D+, and GND terminals. Furthermore, the plug 2 also includes an electrode on a back surface side thereof, and has the GND, D+, D−, CC2, CC1, and VBUS terminals. Accordingly, the plug 2 can be called as an advanced USB plug, and the receptacle 41R (42R) can be called as an advanced USB receptacle.

A connecting relationship between the two receptacles 41R and 42R is expressed as shown in FIG. 21B. As shown in FIG. 21B, four kinds of connecting relationship between the two receptacles (41R, 42R) with respect to the plugs (41P, 42P) are available, i.e., a relationship between a normal connection N and a normal connection N, a relationship between a normal connection N and a reverse connection R, a relationship between a reverse connection R and a normal connection N, and a relationship between a reverse connection R and a reverse connection R.

Connecting Relationship Between Power Circuits

FIG. 22A shows a schematic block configuration for explaining a connecting relationship between the power output circuit 130 applicable to the PD device according to the first embodiment and a load circuit 134, and FIG. 22B shows a schematic circuit configuration corresponding to the configuration shown in FIG. 22A.

It can be assumed that the load circuit 134 is disposed in an external device which is externally connected through the connection between the receptacles 41R and 42R.

In the example shown in FIG. 22A, a plurality of VBUS outputs are included in the power output circuit 130, and the respective VBUS output are connected to the load circuit 134 through respective power lines POL1, POL2, and PLO3. As shown in FIG. 22B, the power output circuit 130 includes a plurality of switches (SWP, P1, P2, P3); the load circuit 134 includes a plurality of switches (SWP, P1, P2, P3) respectively connected to the power lines POL1, POL2, and PLO3, and is connected to loads 1-3. The power output circuit 130 and the load circuit 134 are bidirectionally connected to each other.

Figure 23A:
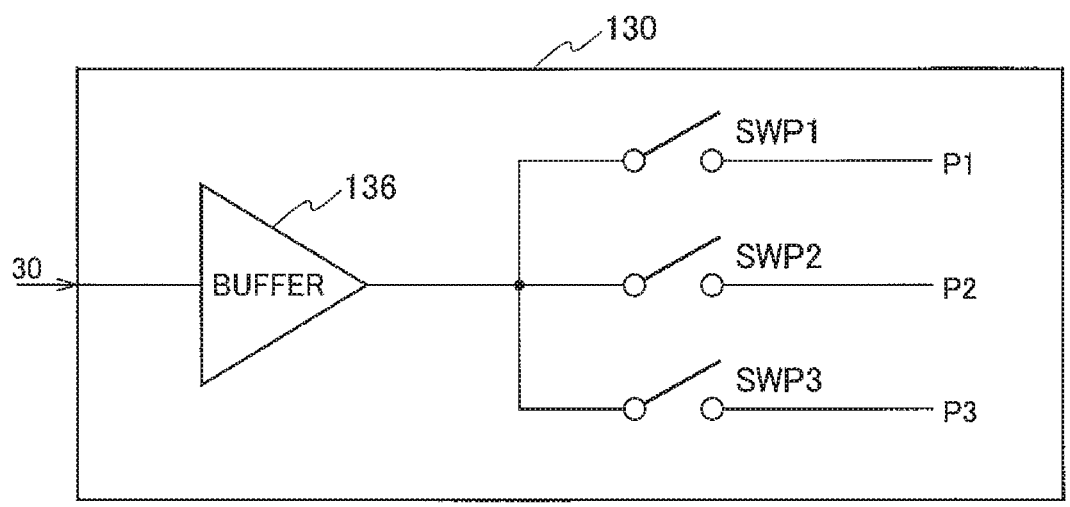
FIG. 23A shows a specific circuit configuration example of the power output circuit shown in FIG. 22B.
Figure 23B:
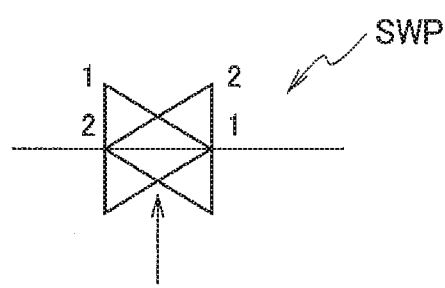
FIG. 23B is a configuration diagram showing a bidirectional switch applicable to the configuration shown in FIG. 23A.

A specific circuit configuration of the power output circuit 130 shown in FIG. 22B is expressed as shown in FIG. 23A. As shown in FIG. 23A, the power output circuit 130 is includes: a buffer 136 connected to the primary-side controller 30, and a plurality of switches (SWP1, SWP2, SWP3) connected to an output of the buffer 136. In this context, the plurality of switches (SWP1, SWP2, SWP3) can be configured to include bidirectional switches, for example, as shown in FIG. 23B.

Configuration of Power Output Circuit

Configuration Example 1

Figure 24:
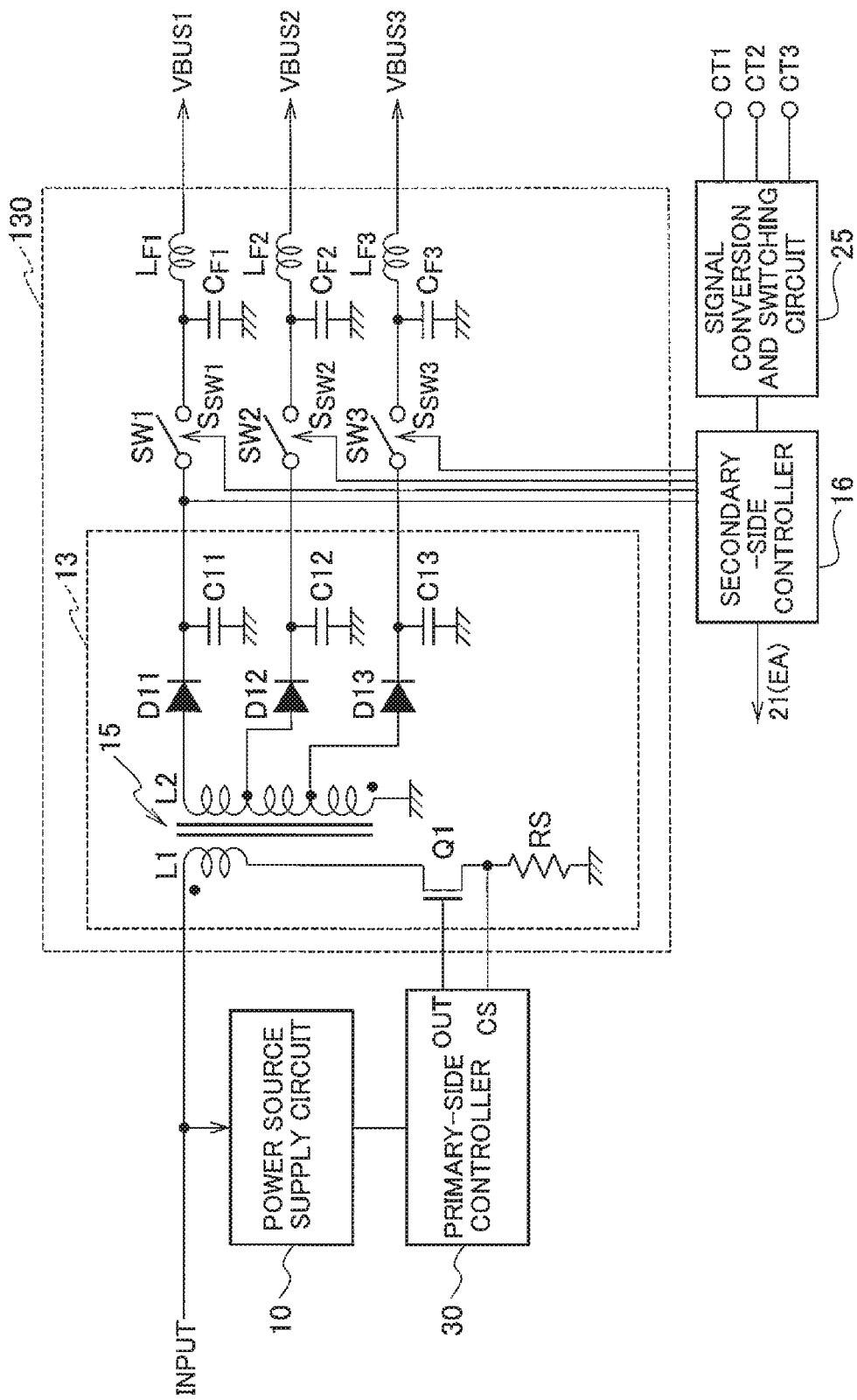
FIG. 24 is a schematic circuit configuration diagram showing the power output circuit (configuration example 1) applicable to the PD device according to the first embodiment.

FIG. 24 shows a schematic circuit configuration example 1 of the power output circuit 130 applicable to the PD device according to the first embodiment.

As shown in FIG. 24, the schematic circuit configuration example 1 of the power output circuit 130 applicable to the PD device according to the first embodiment includes a configuration of being branched from the secondary-side inductance L2 of the transformer 15 in the diode rectification type DC/DC converter 13. More specifically, a VBUS output VBUS1 is obtained from an output of a diode D11 and a capacitor C11 through a switch SW1 and a filter circuit $L_{F1}$ and $C_{F1}$, a VBUS output VBUS2 is obtained from an output of a diode D12 and a capacitor C12 through a switch SW2 and filter circuit $L_{F2}$ and $C_{F2}$, and a VBUS output VBUS3 is obtained from an output of a diode D13 and a capacitor C13 through a switch SW3 and a filter circuit $L_{F3}$ and $C_{F3}$.

Configuration Example 2

Figure 25:
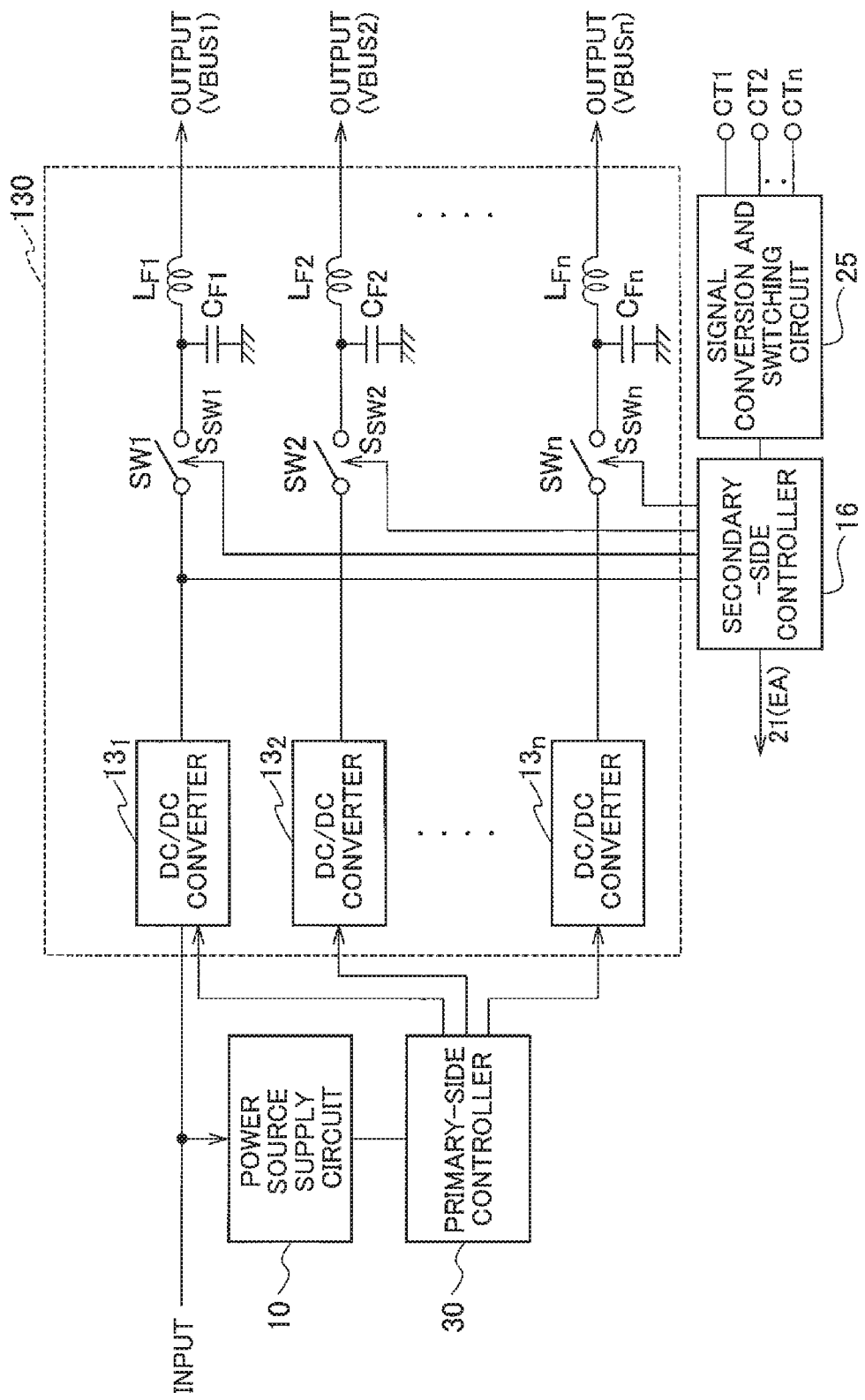
FIG. 25 is a schematic circuit configuration diagram showing the power output circuit (configuration example 2) applicable to the PD device according to the first embodiment.

FIG. 25 shows a schematic circuit configuration example 2 of the power output circuit 130 applicable to the PD device according to the first embodiment.

As shown in FIG. 25, the schematic circuit configuration example 2 of the power output circuit 130 applicable to the PD device according to the first embodiment includes a plurality of DC/DC converters $13_1$, $13_2$, . . . , $13_n$. More specifically, an VBUS output VBUS1 is obtained from an output of the DC/DC converter $13_1$ through a switch SW1 and a filter circuit $L_{F1}$ and $C_{F1}$, an VBUS output VBUS2 is obtained from an output of the DC/DC converter $13_2$ through a switch SW2 and a filter circuit $L_{F2}$ and $C_{F2}$, . . . , and a VBUS output VBUSn is obtained from an output of the DC/DC converter $13_n$ through a switch SWn and a filter circuit $L_{Fn}$ and $C_{Fn}$.

Configuration Example 3

Figure 26:
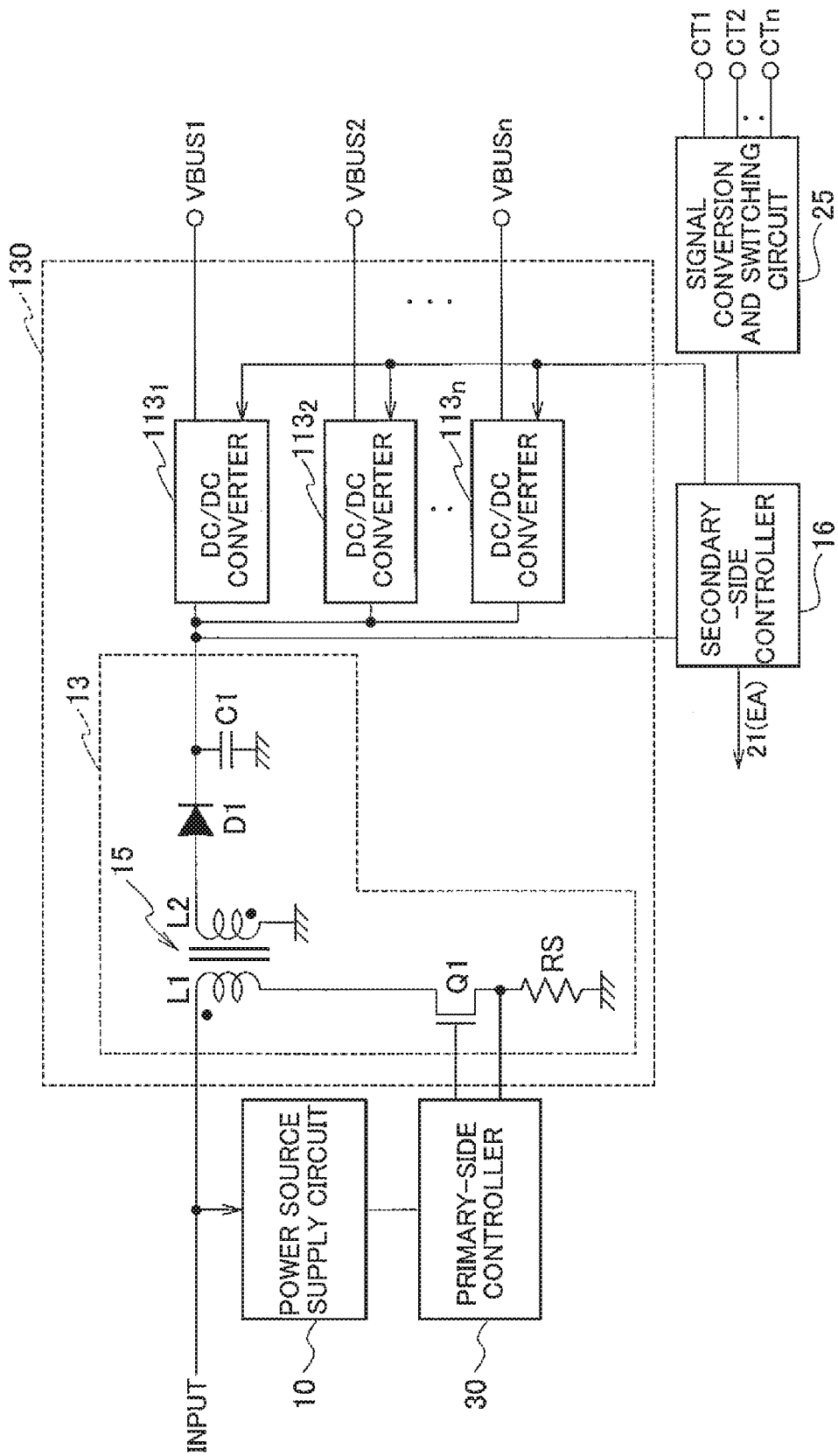
FIG. 26 is a schematic circuit configuration diagram showing the power output circuit (configuration example 3) applicable to the PD device according to the first embodiment.

FIG. 26 shows a schematic circuit configuration example 3 of the power output circuit 130 applicable to the PD device according to the first embodiment.

As shown in FIG. 26, the schematic circuit configuration example 3 of the power output circuit 130 applicable to the PD device according to the first embodiment includes: a diode rectification type DC/DC converter 13; and a plurality of DC/DC converters $113_1$, $113_2$, . . . , $113_n$ connected to an output of the diode rectification type DC/DC converter 13. More specifically, an VBUS output VBUS1 is obtained from an output of the DC/DC converter $113_1$ through a switch SW1 and a filter circuit $L_{F1}$ and $C_{F1}$, an VBUS output VBUS2 is obtained from an output of the DC/DC converter $113_2$ through a switch SW2 and a filter circuit $L_{F2}$ and $C_{F2}$, . . . , and a VBUS output VBUSn is obtained from an output of the DC/DC converter $113_n$ through a switch SWn and a filter circuit $L_{Fn}$ and $C_{Fn}$.

Configuration Example 4

Figure 27:
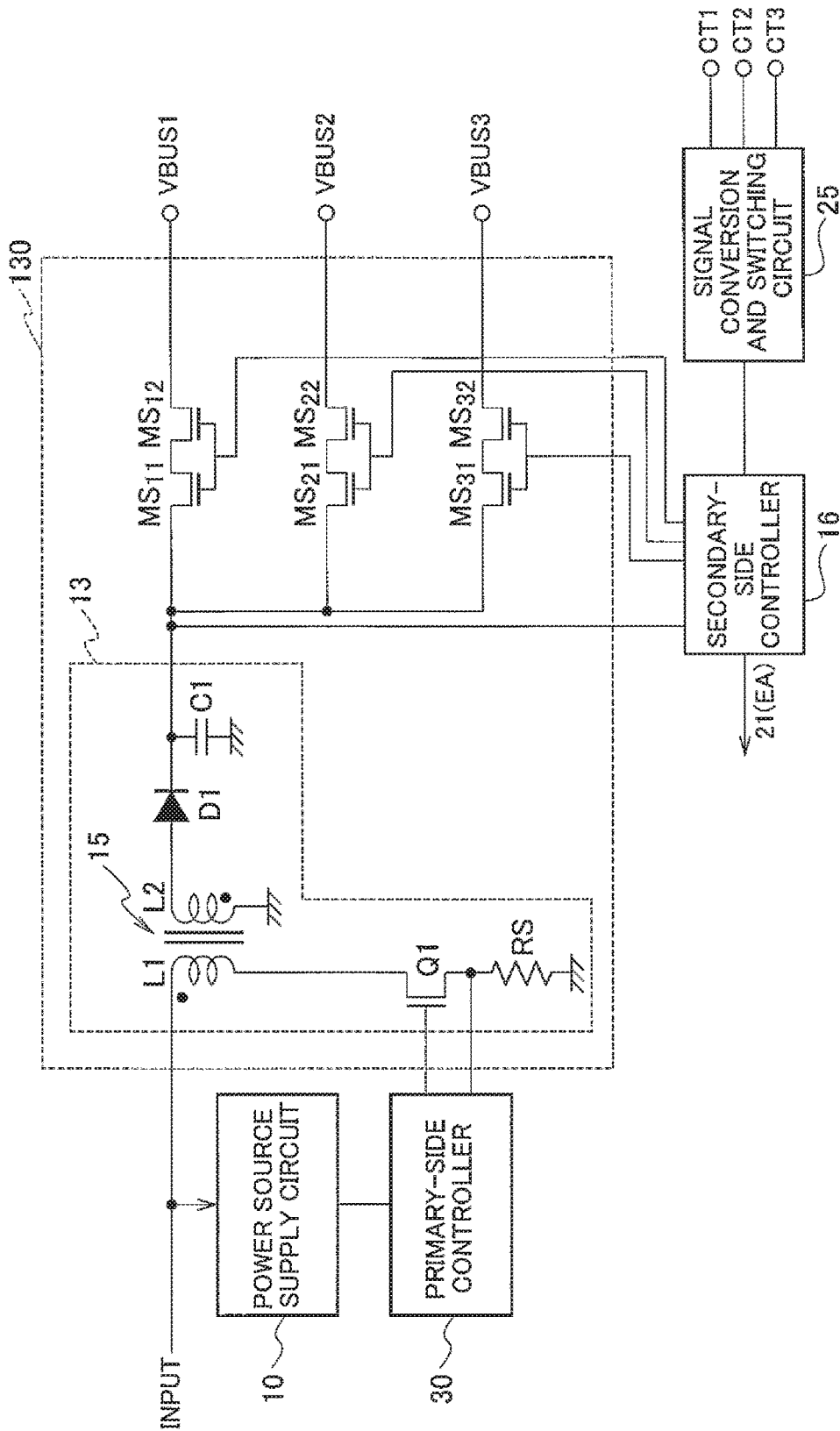
FIG. 27 is a schematic circuit configuration diagram showing the power output circuit (configuration example 4) applicable to the PD device according to the first embodiment.

FIG. 27 shows a schematic circuit configuration example 4 of the power output circuit 130 applicable to the PD device according to the first embodiment.

As shown in FIG. 27, the schematic circuit configuration example 4 of the power output circuit 130 applicable to the PD device according to the first embodiment includes: a diode rectification type DC/DC converter 13; and a plurality of MOS switches ($MS_{11}$ and $MS_{12}$), ($MS_{21}$ and $MS_{22}$), and ($MS_{31}$ and $MS_{32}$) connected to an output of the DC/DC converter 13, wherein conductive states of the MOS switches can be controlled by the secondary-side controller 16. More specifically, a VBUS output VBUS1, a VBUS output VBUS2, and a VBUS output VBUS3 are respectively obtained from outputs of the plurality of the MOS switches ($MS_{11}$ and $MS_{12}$), ($MS_{21}$ and $MS_{22}$), and ($MS_{31}$ and $MS_{32}$).

Figure 28A:
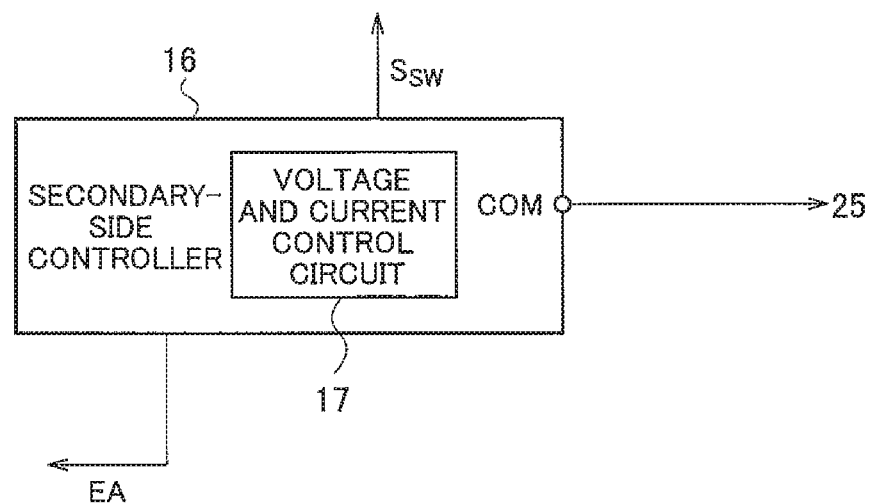
FIG. 28A is a schematic circuit block configuration diagram showing a secondary-side controller applied to the PD device according to the first embodiment.

In the PD device according to the first embodiment, as shown in FIG. 28A, the secondary-side controller 16 may include a voltage and current control circuit 17 configured to execute determination of voltage and current on the basis of the control input signal, the voltage and current control circuit 17 configured to control the output voltage $V_o$ and the output current $I_o$. Moreover, the control input signal may include a signal based on a half-duplex communication system. For example, a frequency may be fixed at 150 kHz (300 kbps), and a pulse width of ON/OFF of "1"/"0" may be modulated.

Figure 28B:
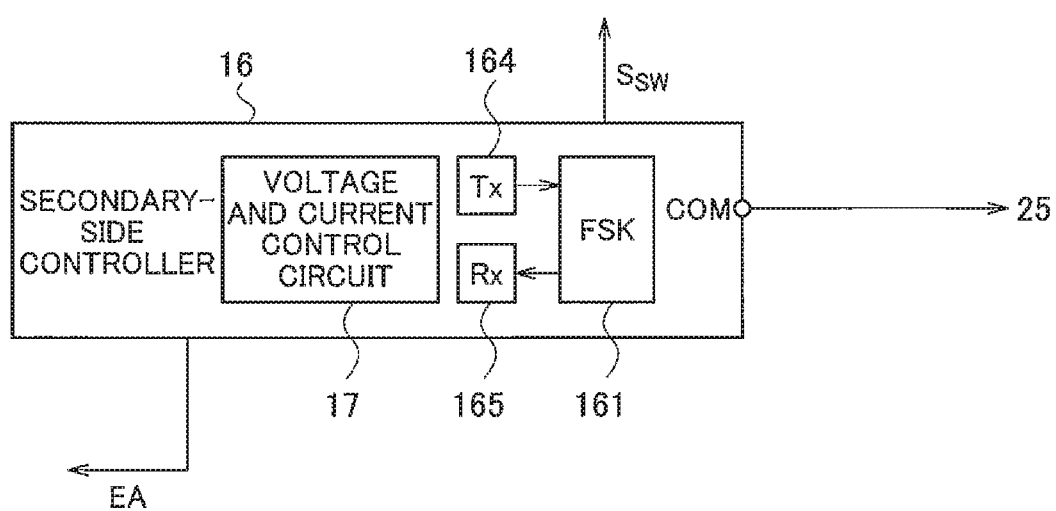
FIG. 28B is another schematic circuit block configuration diagram showing the secondary-side controller applied to the PD device according to the first embodiment.

Moreover, as shown in FIG. 28B, the secondary-side controller 16 applied to the PD device according to the first embodiment may further contain a frequency conversion circuit (FSK) 161, a transmitter 164 and receiver 165. In this context, a frequency conversion from approximately 23.2 MHz to approximately 500 kHz, for example, can be realized by the frequency conversion circuit 161, the transmitter 164, and the receiver 165.

Moreover, in the PD device according to the first embodiment, the signal conversion and switching circuit 25 instead of the secondary-side controller 16 may include the voltage and current control circuit 17 configured to execute determination of voltage and current on the basis of the control input signal, the voltage and current control circuit 17 to control the output voltage $V_o$ and the output current $I_o$.

In addition, also in the PD device 4 according to the first embodiment, an output capacitor $C_O$ for extracting the AC signals superimposed to be input into the power line output (VBUS) from an outside may be connected between the signal conversion circuit and switching 25 and the power line output (VBUS). In such a case, there will be required the separating inductance $L_F$. More specifically, since it is required to separate the control input signal from the power line output (VBUS) in order that the control input signal is not input into the DC/DC converter 13, there will be required a filter circuit including the inductance $L_F$ and the capacitor $C_F$. Thus, also in the PD device 4 according to the first embodiment, the power line output (VBUS)/AC superposition mode may be used in conjunction with the power line output (VBUS)/AC separation mode.

Modified Example 1

Figure 29:
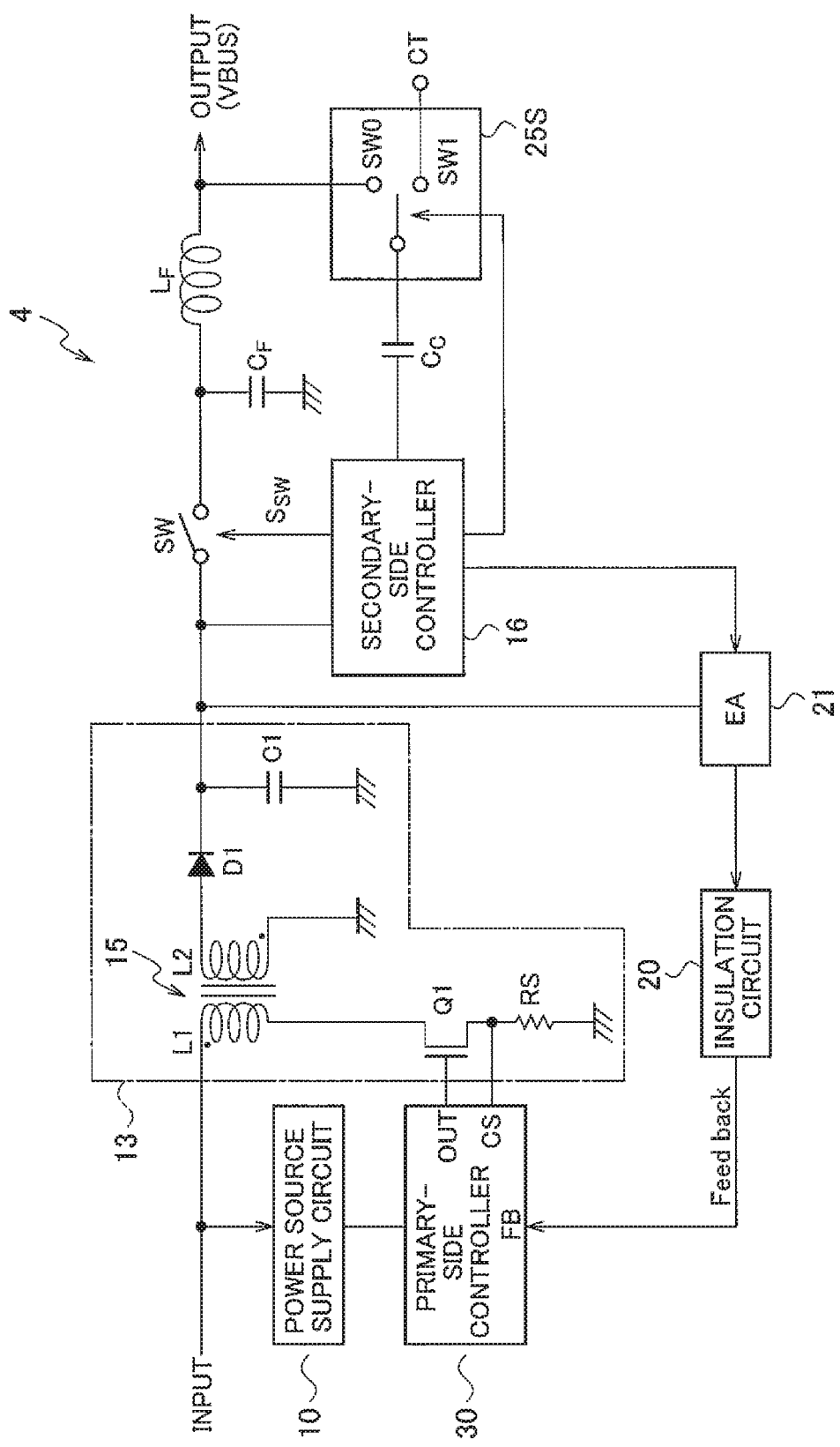
FIG. 29 is a schematic circuit block configuration diagram showing a PD device according to a modified example 1 of the first embodiment.

As shown in FIG. 29, the PD device 4 according to the modified example 1 of the first embodiment includes: a DC/DC converter 13 disposed between an input and a VBUS output; a primary-side controller 30 configured to control an input current of the DC/DC converter 13; a signal conversion and switching circuit 25S coupled to a control input, the signal conversion and switching circuit 25S configured to execute signal conversion and switching of a control input signal of the control input; and a secondary-side controller 16 coupled to the signal conversion and switching circuit 25S, the secondary-side controller 16 configured to receive the control input signal subjected to the signal conversion and switching executed in the signal conversion and switching circuit 25S, and configured to feed back the received control input signal to the primary-side controller 30. In this context, the primary-side controller 30 varies an output voltage value and an available output current value of the DC/DC converter 13 by controlling the input current on the basis of the control input signal fed back from the secondary-side controller 16.

As shown in FIG. 29, the signal conversion and switching circuit 25S includes a switch (SW0, SW1) configured to select between the VBUS output and the control input. The switch (SW0, SW1) can automatically or manually execute the selecting operation.

Moreover, the switch (SW0, SW1) may be controlled by the secondary-side controller 16, in the PD device 4 according to the modified example 1 of the first embodiment.

The DC/DC converter 13 is a diode rectification converter.

The DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the output; and a first capacitor C1 connected between the output and the ground potential.

The DC/DC converter 13 may be a synchronous rectification converter. Other configurations are the same as those of the first embodiment.

Modified Example 2

Figure 30:
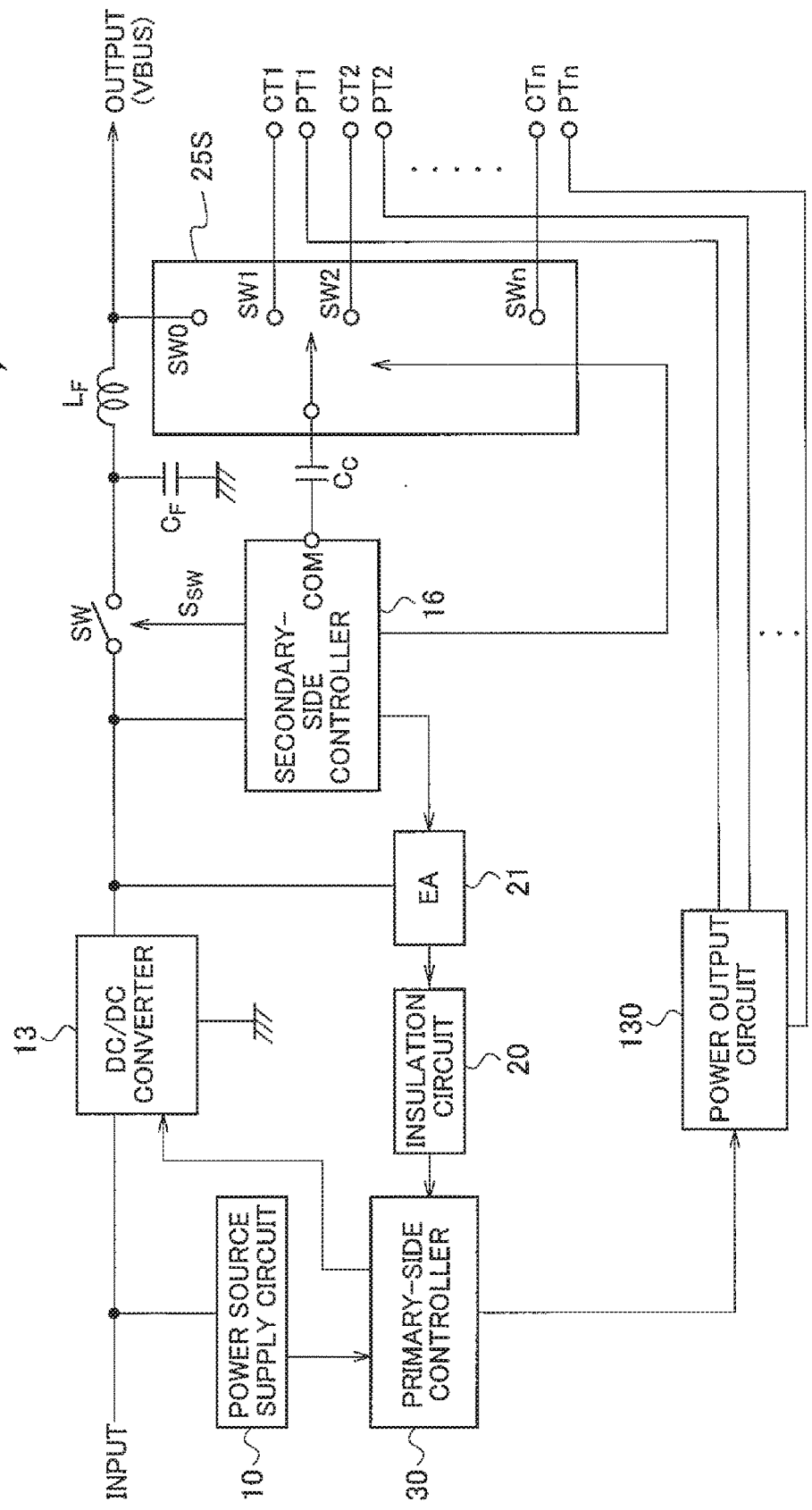
FIG. 30 is a schematic circuit block configuration diagram showing a PD device according to a modified example 2 of the first embodiment.

As shown in FIG. 30, the PD device 4 according to the modified example 2 of the first embodiment includes: a DC/DC converter 13 disposed between an input and a VBUS output; a primary-side controller 30 configured to control an input current of the DC/DC converter 13; a signal conversion and switching circuit 25S coupled to a plurality of control inputs, the signal conversion and switching circuit 25S configured to execute signal conversion and switching of control input signals of the plurality of the control inputs; and a secondary-side controller 16 coupled to the signal conversion and switching circuit 25S, the secondary-side controller 16 configured to receive the control input signal subjected to the signal conversion and switching executed in the signal conversion and switching circuit 25S, and configured to feed back the received control input signal to the primary-side controller 30. In this context, the primary-side controller 30 varies an output voltage value and an available output current value of the DC/DC converter 13 by controlling the input current on the basis of the control input signal fed back from the secondary-side controller 16.

As shown in FIG. 30, the signal conversion and switching circuit 25S includes a plurality of switches SW0, SW1, SW2, . . . , SWn configured to select between the VBUS output and the control inputs. The switches SW0, SW1, SW2, . . . , SWn can automatically or manually execute the selecting operation.

Moreover, the plurality of the switches SW0, SW1, SW2, . . . , SWn may be controlled by the secondary-side controller 16, in the PD device 4 according to the modified example 2 of the first embodiment.

Moreover, the signal conversion and switching circuit 25 can further execute signal conversion and switching of an AC signal component of the VBUS output. The AC signal component of the VBUS output is coupled to the signal conversion and switching circuit 25 through the output capacitor $C_O$ connected between the VBUS output and the signal conversion and switching circuit 25.

Moreover, as shown in FIG. 2, the PD device 4 according to the modified example 2 of the first embodiment may include a power output circuit 130 connected to the primary-side controller 30, the power output circuit 130 configured to supply output voltages to a plurality of VBUS power outputs disposed in pairs with the plurality of the control inputs.

FIG. 3 shows a schematic block configuration of the power output circuit 130 applicable to the PD device 4 according to the modified example 2 of the first embodiment. As shown in FIG. 3, the power output circuit 130 applicable to the PD device 4 according to the modified example 2 of the first embodiment may include a plurality of DC/DC converters $13_1, 13_2, \ldots, 13_n$.

The control input signal selected in the signal conversion and switching circuit 25 is input into a communication terminal COM of the secondary-side controller 16.

Moreover, as shown in FIG. 30, there may be included a plurality of control terminals CT1, CT2, ..., CTn, and a plurality of the control inputs may be coupled to the plurality of the controls terminals CT1, CT2, ..., CTn. Moreover, the respective control output signals of the PD device 4 according to the modified example 2 of the first embodiment can be output to external apparatuses through the plurality of the respective control terminals CT1, CT2, ..., CTn.

Moreover, as shown in FIG. 30, the PD device 4 includes a plurality of VBUS power output terminals PT1, PT2, ..., PTn, and the power output circuit 130 can supply the output voltages through the plurality of the VBUS power output terminals PT1, PT2, ..., PTn. Other configurations are the same as those of the modified example 1 of the first embodiment.

Modified Example 3

Figure 31:
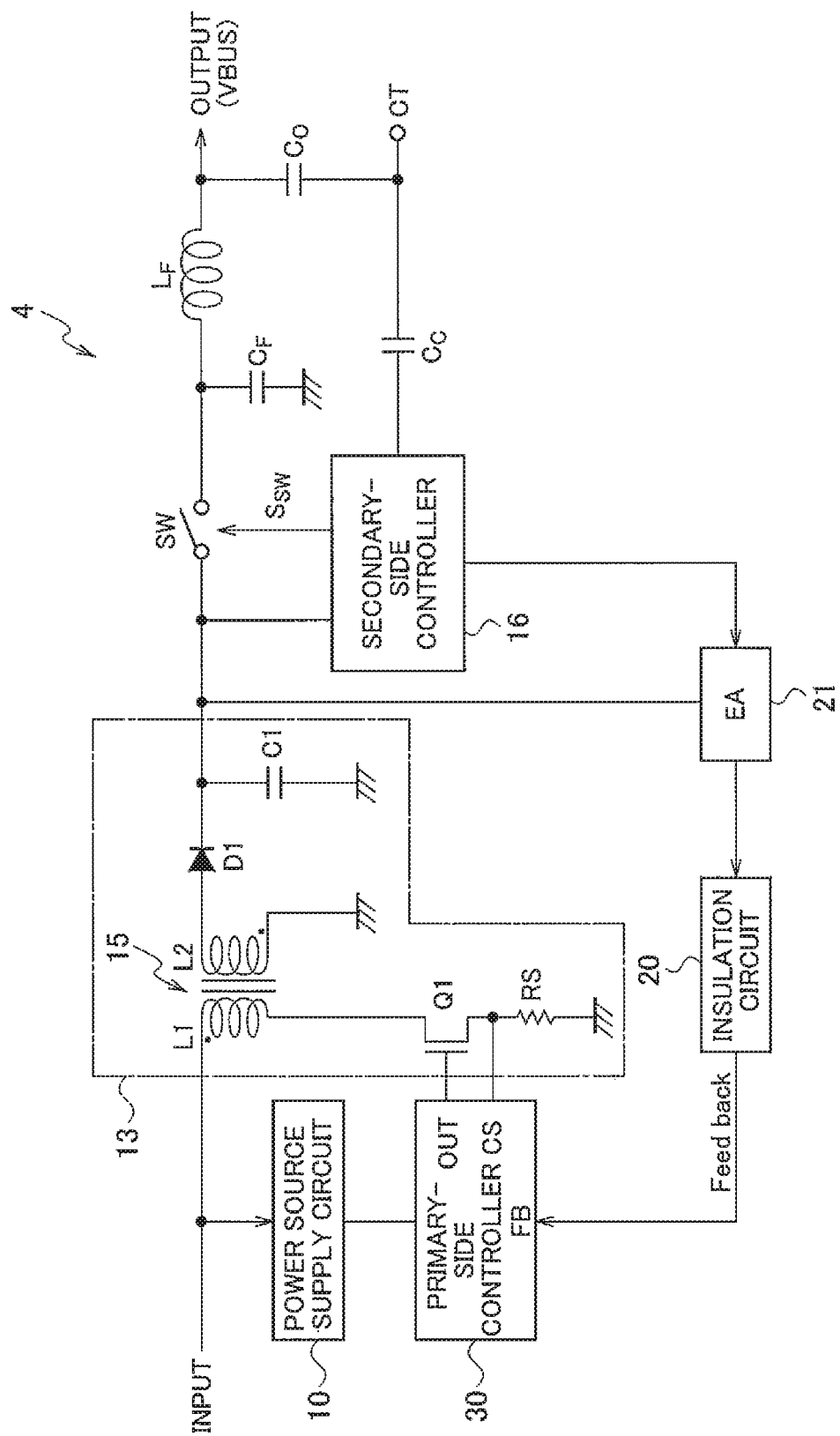
FIG. 31 is a schematic circuit block configuration diagram showing a PD device according to a modified example 3 of the first embodiment.

As shown in FIG. 31, the PD device 4 according to the modified example 3 of the first embodiment includes: a DC/DC converter 13 disposed between an input and a VBUS output; a primary-side controller 30 configured to control an input current of the DC/DC converter 13; a coupling capacitor $C_C$ coupled to the control input; an output capacitor $C_O$ coupled between the VBUS output and the control input; and a secondary-side controller 16 coupled to the control input through the coupling capacitor $C_C$, the secondary-side controller 16 configured to receive the VBUS output and a control input signal of the control input, and configured to feed back the received control input signal to the primary-side controller 30. In this context, the primary-side controller 30 varies an output voltage value and an available output current value of the DC/DC converter 13 by controlling the input current of the DC/DC converter 13 on the basis of the control input signal fed back from the secondary-side controller 16.

As shown in FIG. 31, the PD device 4 according to the modified example 3 of the first embodiment may include a control terminal CT, and the control input may be coupled to the control terminal CT.

Moreover, as shown in FIG. 31, in the PD device 4 according to a modified example 3 of the first embodiment, an AC signal component superimposed on the VBUS output can be input into the secondary-side controller 16 through the output capacitor $C_O$ and the coupling capacitor $C_C$. Similarly, a control output signal of the PD device 4 according to the modified example 3 of the first embodiment can also be output to an external apparatus through the VBUS output. Thus, the PD device 4 according to a modified example 3 of the first embodiment is capable of branching a system of superimposing the control signal on the power supply line of the VBUS output, and a system of directly extracting the control signal from control terminal CT. Other configurations are the same as those of the modified example 1 of the first embodiment.

Modified Example 4

Figure 32:
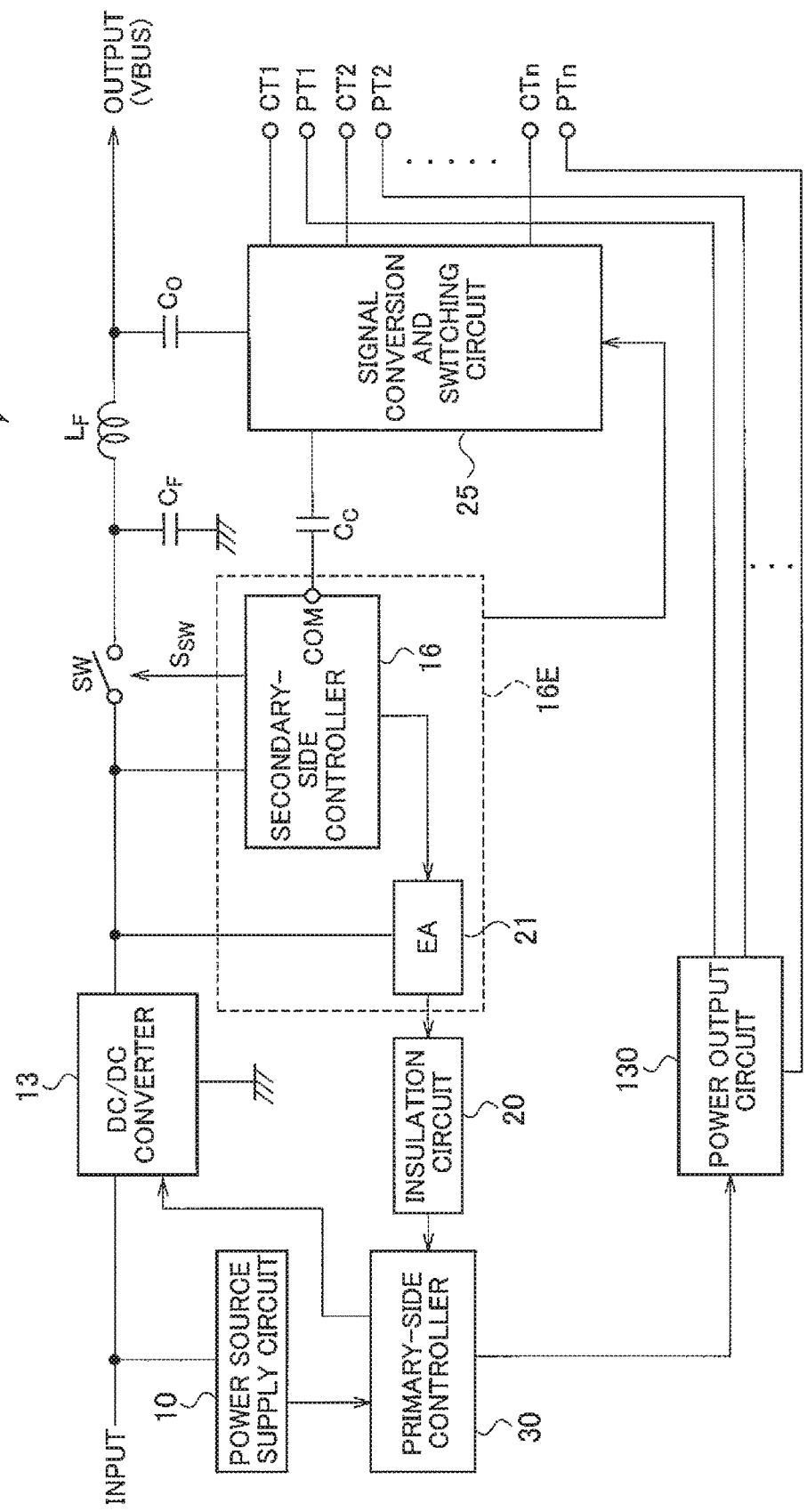
FIG. 32 is a schematic circuit block configuration diagram showing a PD device according to a modified example 4 of the first embodiment.

A PD device 4 according to a modified example 4 of the first embodiment may include a secondary-side controller 16E in which the error amplifier 21 is contained, as shown in FIG. 32. More specifically, as shown in FIG. 32, the secondary-side controller 16E and the error amplifier 21 may be integrally formed with each other. In this context, the signal conversion and switching circuit 25 may be controlled by the secondary-side controller 16E.

Moreover, in the PD device 4 according to the modified example 4 of the first embodiment, the signal conversion and switching circuit 25 may be omitted therefrom, and the same configuration as the PD device 4 according to the modified example 3 as shown in FIG. 31 may be adopted thereinto. Other configurations are the same as those of the first embodiment.

Modified Example 5

Figure 33:
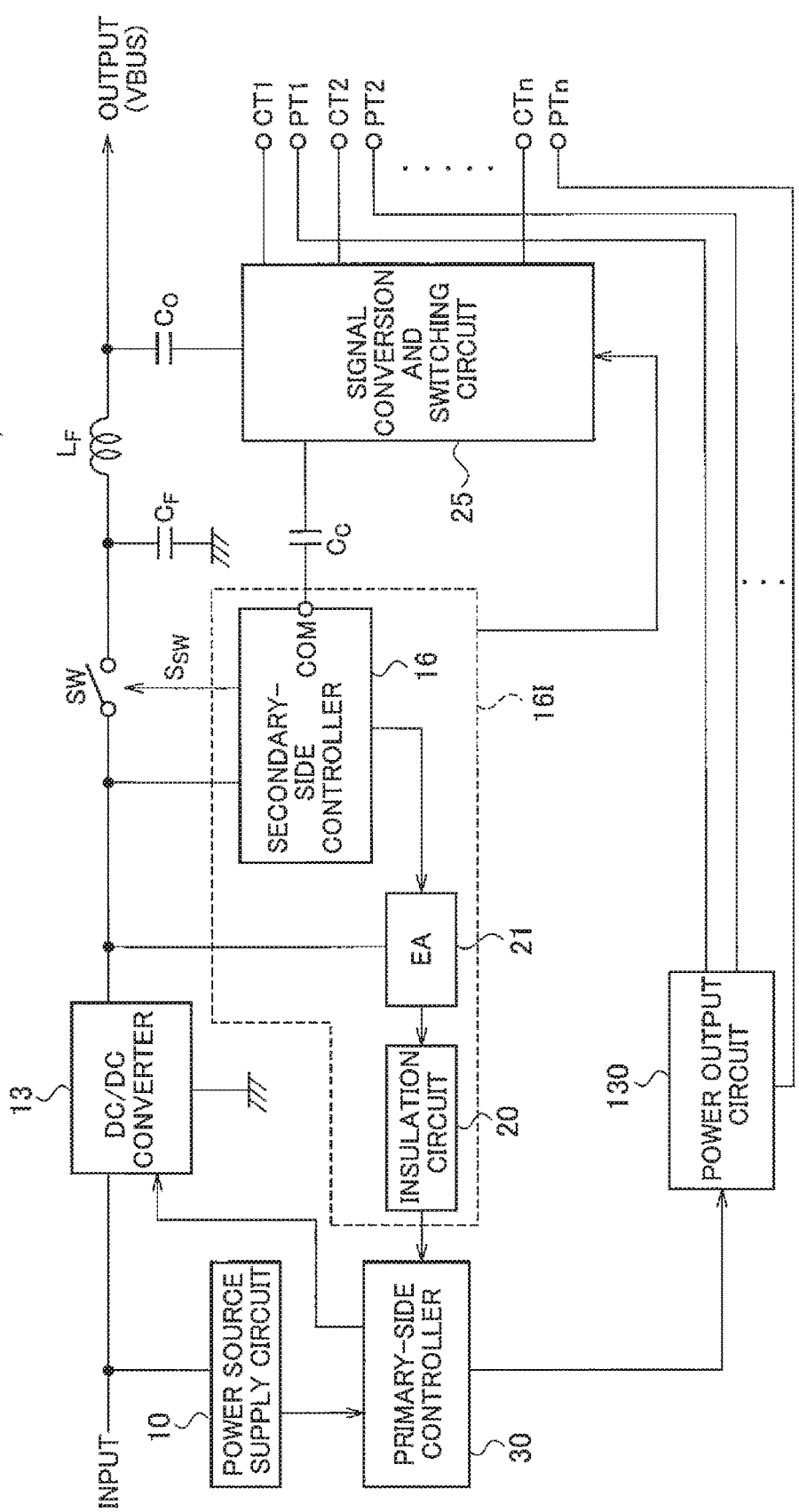
FIG. 33 is a schematic circuit block configuration diagram showing a PD device according to a modified example 5 of the first embodiment.

Moreover, a PD device 4 according to a modified example 5 of the first embodiment may include a secondary-side controller 16I in which an error amplifier 21 and an insulation circuit 20 are contained, as shown in FIG. 33. More specifically, as shown in FIG. 33, the secondary-side controller 16I, the error amplifier 21, and the insulation circuit 20 may be integrally formed with one another. In this context, the signal conversion and switching circuit 25 may be controlled by the secondary-side controller 16I.

Moreover, in the PD device 4 according to the modified example 5 of the first embodiment, the signal conversion and switching circuit 25 may be omitted therefrom, and the same configuration as the PD device 4 according to the modified example 3 as shown in FIG. 31 may be adopted thereinto. Other configurations are the same as those of the first embodiment.

Modified Example 6

Figure 34:
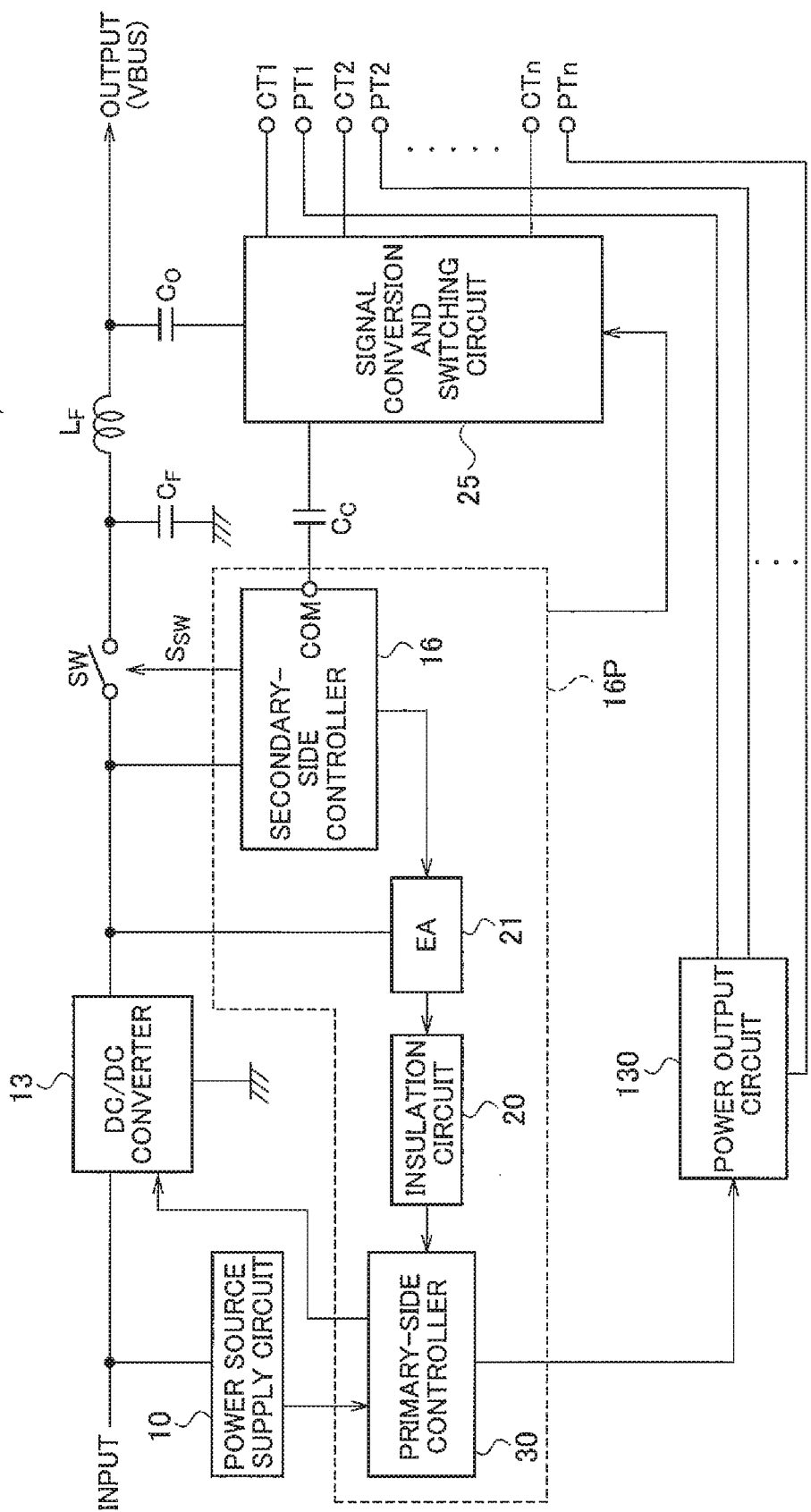
FIG. 34 is a schematic circuit block configuration diagram showing a PD device according to a modified example 6 of the first embodiment.

Moreover, a PD device 4 according to a modified example 6 of the first embodiment may include a secondary-side controller 16P in which the error amplifier 21, the insulation circuit 20, and the primary-side controller 30 are contained, as shown in FIG. 34. More specifically, as shown in FIG. 34, the secondary-side controller 16, the error amplifier 21, the insulation circuit 20, and the primary-side controller 30 may be integrally formed with one another. In this context, the signal conversion and switching circuit 25 may be controlled by the secondary-side controller 16P.

Moreover, in the PD device 4 according to the modified example 6 of the first embodiment, the signal conversion and switching circuit 25 may be omitted therefrom, and the same configuration as the PD device 4 according to the modified example 3 as shown in FIG. 31 may be adopted thereinto. Other configurations are the same as those of the first embodiment.

According to the first embodiment and its modified examples, there can be provided the PD device capable of switching with respect to the plurality of apparatuses, and capable of controlling the output voltage value and the available output current value (MAX value).

Second Embodiment

Figure 35:
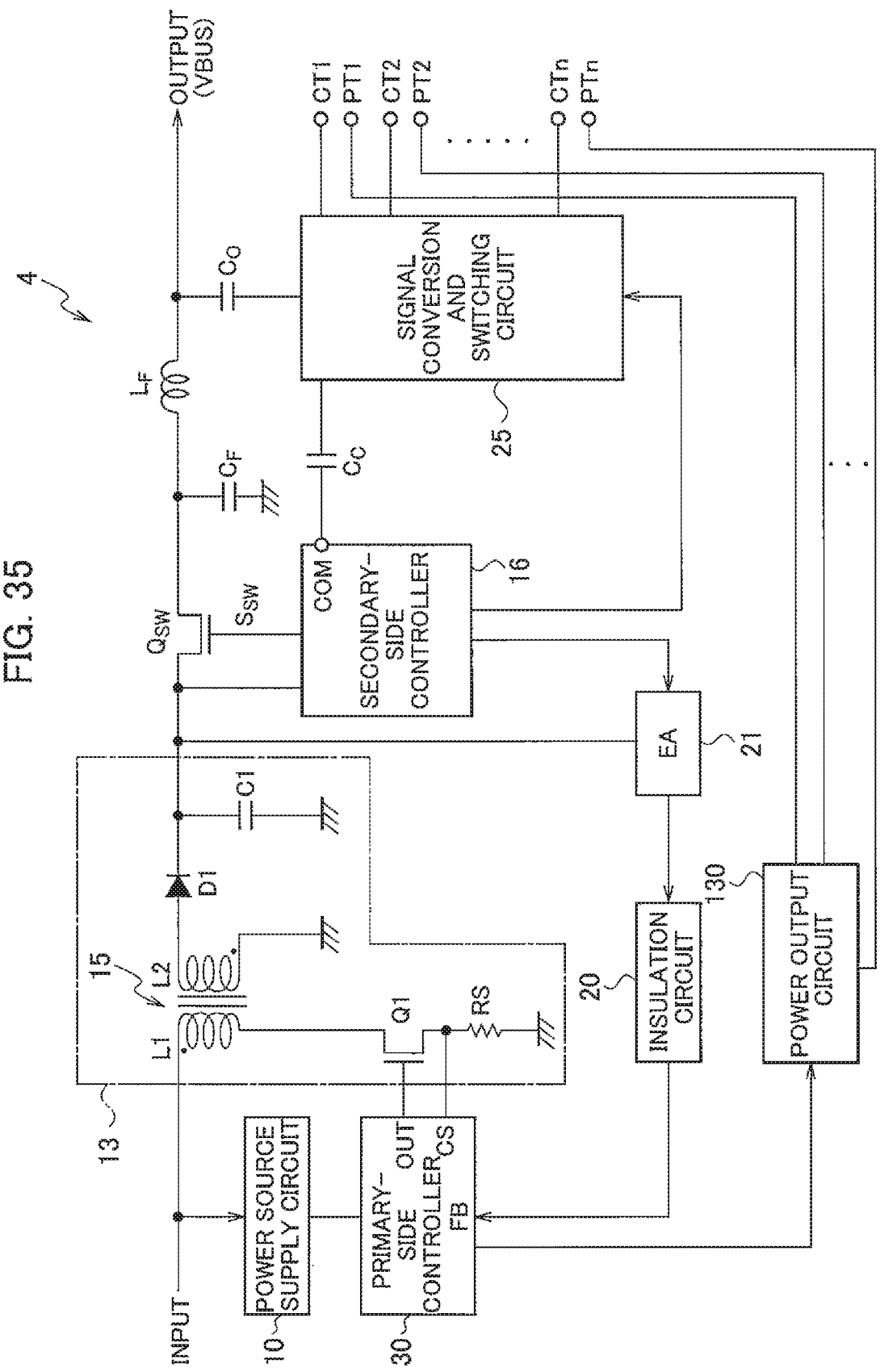
FIG. 35 is a schematic circuit block configuration diagram showing a PD device according to a second embodiment.

As shown in FIG. 35, a PD device 4 according to the second embodiment includes: a DC/DC converter 13 disposed between an input and a VBUS output; a primary-side controller 30 configured to control an input current of the DC/DC converter 13; a signal conversion and switching circuit 25 coupled to a plurality of control inputs, the signal conversion and switching circuit 25 configured to execute signal conversion and switching of control input signals of the plurality of the control inputs; an output capacitor $C_O$ connected between the VBUS output and the signal conversion and switching circuit 25; and a secondary-side controller 16 coupled to the signal conversion and switching circuit 25, the secondary-side controller 16 configured to receive the control input signals subjected to the signal conversion and switching executed in the signal conversion and switching circuit 25, and configured to feed back the received control input signals to the primary-side controller 30. In this context, the primary-side controller 30 varies an output voltage value and an available output current value (MAX value) of the DC/DC converter 13 by controlling the input current on the basis of the control input signals fed back from the secondary-side controller 16.

Moreover, the signal conversion and switching circuit 25 can execute signal conversion and switching of an AC signal component of the VBUS output. The AC signal component of the VBUS output is coupled to the signal conversion and switching circuit 25 through the output capacitor $C_O$ connected between the VBUS output and the signal conversion and switching circuit 25.

Moreover, as shown in FIG. 35, the PD device 4 according to the second embodiment may include a power output circuit 130 connected to the primary-side controller 30, the power output circuit 130 configured to supply output voltages to a plurality of VBUS power outputs disposed in pairs with the plurality of the control inputs.

The control input signal selected in the signal conversion and switching circuit 25 is input into a communication terminal COM of the secondary-side controller 16.

Moreover, as shown in FIG. 35, the PD device 4 according to the second embodiment may include a plurality of control terminals CT1, CT2, ..., CTn, and the plurality of the control inputs may be respectively coupled to the plurality of the controls terminals CT1, CT2, ..., CTn. Moreover, a control output signal of the PD device 4 according to the second embodiment can be output to an external apparatus through the plurality of the control terminals CT1, CT2, ..., CTn.

Moreover, as shown in FIG. 35, the PD device 4 according to the second embodiment includes a plurality of VBUS power output terminals PT1, PT2, ..., PTn, and the power output circuit 130 can supply the output voltages through the plurality of the VBUS power output terminals PT1, PT2, ..., PTn.

Moreover, the PD device 4 according to the second embodiment may include AC coupling capacitors (not shown) coupled to the plurality of the control inputs, and the signal conversion and switching circuit 25 may be coupled to the plurality of the control inputs respectively through the AC coupling capacitors.

In the PD device 4 according to the second embodiment, the DC/DC converter 13 is a diode rectification type converter. More specifically, the DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the output; and a first capacitor C1 connected between the output and the ground potential.

Moreover, the PD device 4 according to the second embodiment may include a coupling capacitor $C_C$ configured to couple the secondary-side controller 16 and the signal conversion and switching circuit 25 to each other. Moreover, the secondary-side controller 16 and the signal conversion and switching circuit 25 may be directly connected to each other without through the coupling capacitor $C_C$.

In the PD device 4 according to the second embodiment, the signal conversion and switching circuit 25 can execute a frequency conversion, a DC level conversion, or an amplitude level conversion, for example.

Moreover, in the PD device 4 according to the second embodiment, the signal conversion and switching circuit 25 may be controlled by the secondary-side controller 16.

Moreover, as shown in FIG. 35, the PD device 4 according to the second embodiment may include a MOS switch $Q_{SW}$ connected to the output of the DC/DC converter 13, the MOS switch $Q_{SW}$ configured to interrupt an output voltage of the DC/DC converter 13. The output of the DC/DC converter 13 and the power line output (VBUS) can be interrupted by the MOS switch $Q_{SW}$. ON/OFF control for the MOS switch $Q_{SW}$ can be executed by the secondary-side controller 16. Other configurations are the same as those of the first embodiment.

According to the second embodiment, there can be provided the PD device capable of switching with respect to the plurality of apparatuses, and capable of controlling the output voltage value and the available output current value (MAX value).

Third Embodiment

Figure 36:
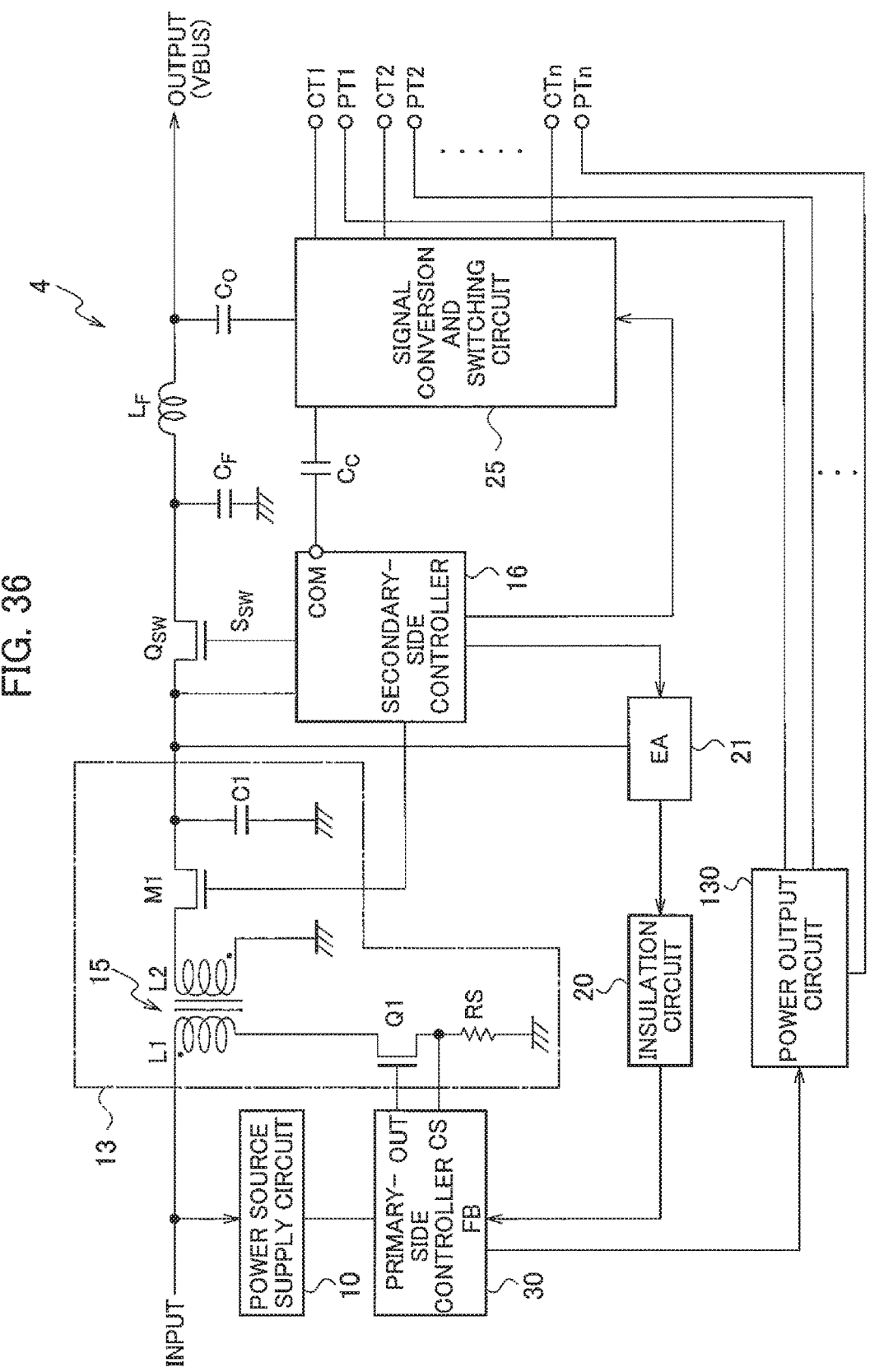
FIG. 36 is a schematic circuit block configuration diagram showing a PD device according to a third embodiment.

As shown in FIG. 36, a PD device 4 according to the third embodiment includes: a DC/DC converter 13 disposed between an input and a VBUS output; a primary-side controller 30 configured to control an input current of the DC/DC converter 13; a signal conversion and switching circuit 25 coupled to a plurality of control inputs, the signal conversion and switching circuit 25 configured to execute signal conversion and switching of control input signals of the plurality of the control inputs; an output capacitor $C_O$ connected between the VBUS output and the signal conversion and switching circuit 25; and a secondary-side controller 16 coupled to the signal conversion and switching circuit 25, the secondary-side controller 16 configured to receive the control input signals subjected to the signal conversion and switching executed in the signal conversion and switching circuit 25, and configured to feed back the received control input signals to the primary-side controller 30. In this context, the primary-side controller 30 varies an output voltage value and an available output current value (MAX value) of the DC/DC converter 13 by controlling the input current on the basis of the control input signals fed back from the secondary-side controller 16.

Moreover, the signal conversion and switching circuit 25 can execute signal conversion and switching of an AC signal component of the VBUS output. The AC signal component of the VBUS output is coupled to the signal conversion and switching circuit 25 through the output capacitor $C_O$ connected between the VBUS output and the signal conversion and switching circuit 25.

Moreover, as shown in FIG. 36, the PD device 4 according to the third embodiment may include a power output circuit 130 connected to the primary-side controller 30, the power output circuit 130 configured to supply output voltages to a plurality of VBUS power outputs disposed in pairs with the plurality of the control inputs.

The control input signal selected in the signal conversion and switching circuit 25 is input into a communication terminal COM of the secondary-side controller 16.

Moreover, as shown in FIG. 36, the PD device 4 according to the third embodiment may include a plurality of control terminals CT1, CT2, . . . , CTn, and the plurality of the control inputs may be respectively coupled to the plurality of the controls terminals CT1, CT2, . . . , CTn. Moreover, a control output signal of the PD device 4 according to the third embodiment can be output to an external apparatus through the plurality of the control terminals CT1, CT2, . . . , CTn.

Moreover, as shown in FIG. 36, the PD device 4 according to the third embodiment includes a plurality of VBUS power output terminals PT1, PT2, . . . , PTn, and the power output circuit 130 can supply the output voltages through the plurality of the VBUS power output terminals PT1, PT2, . . . , PTn.

Moreover, the PD device 4 according to the third embodiment may include AC coupling capacitors (not shown) coupled to the plurality of the control inputs, and the signal conversion and switching circuit 25 may be coupled to the plurality of the control inputs respectively through the AC coupling capacitors.

In the PD device 4 according to the third embodiment, the DC/DC converter 13 is a synchronous rectification type converter. More specifically, the DC/DC converter 13 includes: a transformer 15; a first MOS transistor Q1 and a current sensing resistor RS each connected in series between the primary-side inductance L1 of the transformer 15 and ground potential; a second MOS transistor M1 connected between the secondary-side inductance L2 of the transformer 15 and the output; and a first capacitor C1 connected between the output and the ground potential.

In the PD device 4 according to the third embodiment, the signal conversion and switching circuit 25 can execute a frequency conversion, a DC level conversion, or an amplitude level conversion, for example.

Moreover, in the PD device 4 according to the third embodiment, the signal conversion and switching circuit 25 may be controlled by the secondary-side controller 16.

In the PD device 4 according to the third embodiment, since the synchronous rectification method is adopted for the DC/DC converter, instead of the diode rectification system, DC/DC power conversion efficiency can be increased, compared with the second embodiment adapting the diode rectification system. Other configurations are the same as those of the first embodiment.

According to the third embodiment, there can be provided the PD device capable of switching with respect to the plurality of apparatuses, and capable of controlling the output voltage value and the available output current value (MAX value).

Fourth Embodiment

Figure 37:
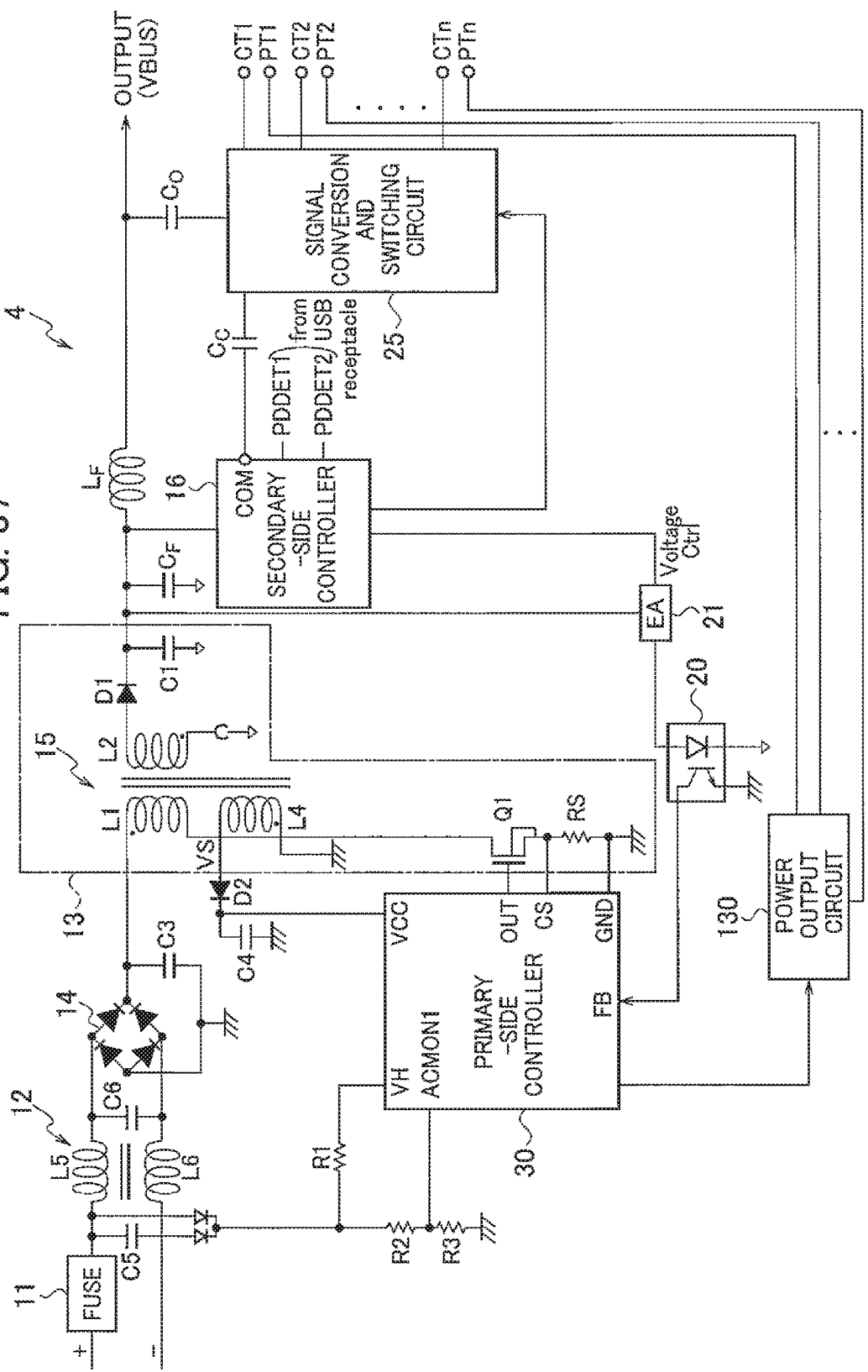
FIG. 37 is a schematic circuit block configuration diagram showing a PD device according to a fourth embodiment.

As shown in FIG. 37, a PD device 4 according to a fourth embodiment includes an AC/DC converter connected to an AC input, the AC/DC converter 300 composed of a fuse 11, a choke coil 12, a diode rectification bridge 14, capacitors C5, C6, C3, instead of the power source supply circuit 10 as in the first embodiment.

Moreover, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 37, the PD device 4 according to the fourth embodiment includes: a DC/DC converter 13 disposed between an input (DC output of the AC/DC converter) and a VBUS output; a primary-side controller 30 configured to control an input current of the DC/DC converter 13; a signal conversion and switching circuit 25 coupled to a plurality of control inputs, the signal conversion and switching circuit 25 configured to execute signal conversion and switching of control input signals of the plurality of the control inputs; an output capacitor $C_O$ connected between the VBUS output and the signal conversion and switching circuit 25; and a secondary-side controller 16 coupled to the signal conversion and switching circuit 25, the secondary-side controller 16 configured to receive the control input signals subjected to the signal conversion and switching executed in the signal conversion and switching circuit 25, and configured to feed back the received control input signals to the primary-side controller 30. In this context, the primary-side controller 30 varies an output voltage value and an available output current value (MAX value) of the DC/DC converter 13 by controlling the input current on the basis of the control input signals fed back from the secondary-side controller 16.

The control input signal selected in the signal conversion and switching circuit 25 is input into a communication terminal COM of the secondary-side controller 16.

Moreover, as shown in FIG. 37, the PD device 4 according to the fourth embodiment may include a power output circuit 130 connected to the primary-side controller 30, the power output circuit 130 configured to supply output voltages to a plurality of VBUS outputs disposed in pairs with the plurality of the control inputs. In this context, the power output circuit 130 may include a plurality of DC/DC converters in the same manner as the configuration shown in FIG. 3.

Moreover, as shown in FIG. 37, there may be included a plurality of control terminals CT1, CT2, . . . , CTn, and a plurality of the control inputs may be coupled to the plurality of the controls terminals CT1, CT2, . . . , CTn. Moreover, a control output signal of the PD device 4 according to the fourth embodiment can be output to an external apparatus through the plurality of the control terminals CT1, CT2, . . . , CTn.

Although PDDET1 and PDDET2 from USB receptacle are described on the secondary-side controller 16, the PDDET1 and PDDET2 may be omitted.

In the PD device 4 according to the fourth embodiment, the DC/DC converter 13 is a diode rectification type converter. More specifically, the DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the output; and a first capacitor C1 connected between the output and the ground potential.

Moreover, the PD device 4 according to the fourth embodiment may include a coupling capacitor $C_C$ configured to couple the secondary-side controller 16 and the signal conversion and switching circuit 25 to each other. Moreover, the secondary-side controller 16 and the signal conversion and switching circuit 25 may be directly connected to each other without through the coupling capacitor $C_C$.

In the PD device 4 according to the fourth embodiment, the signal conversion and switching circuit 25 can execute a frequency conversion, a DC level conversion, or an amplitude level conversion, for example.

Moreover, in the PD device 4 according to the fourth embodiment, the signal conversion and switching circuit 25 may be controlled by the secondary-side controller 16.

According to the fourth embodiment, there can be provided the PD device capable of switching with respect to the plurality of apparatuses, and capable of controlling the output voltage value and the available output current value (MAX value).

Fifth Embodiment

Figure 38:
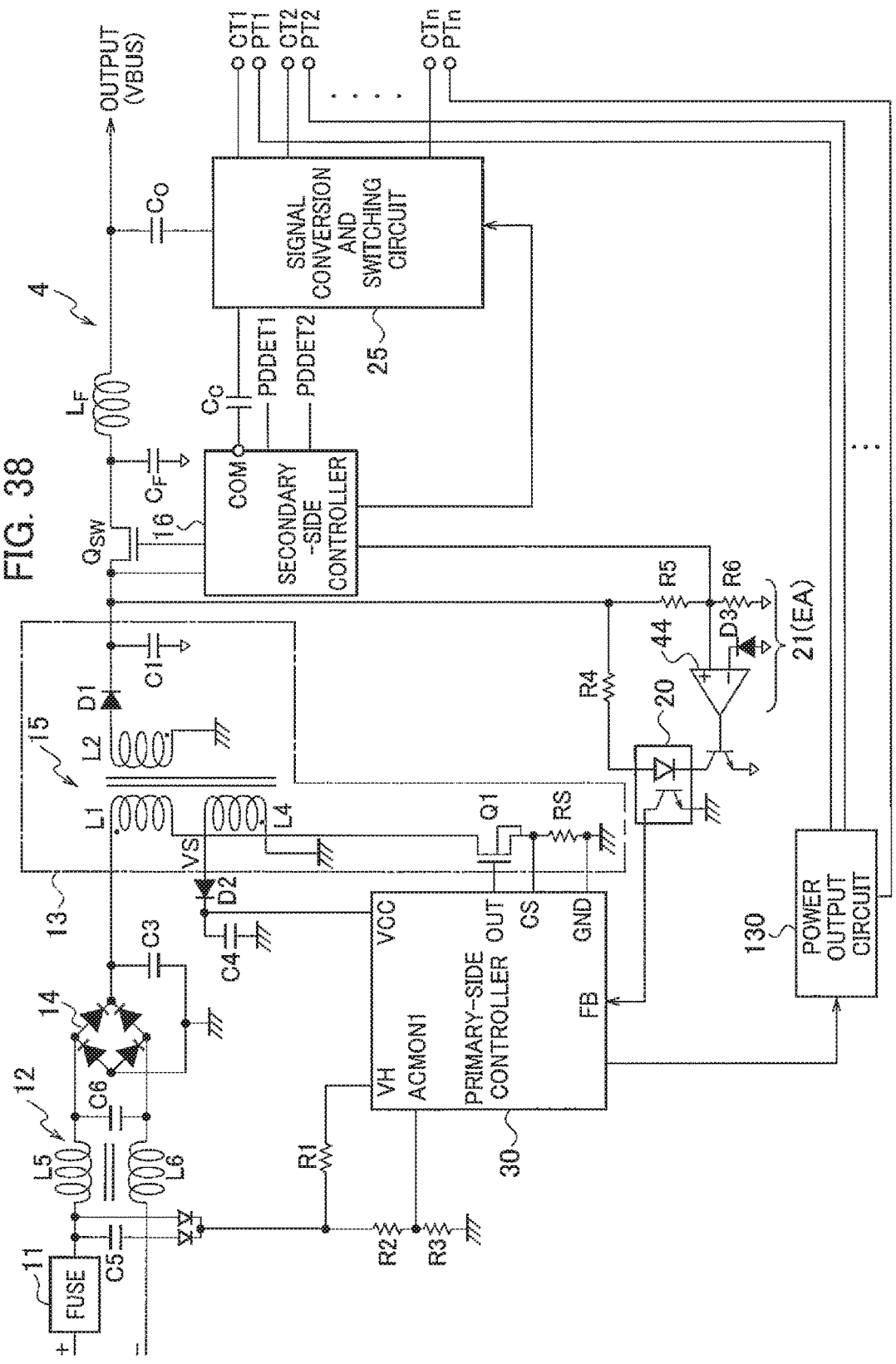
FIG. 38 is a schematic circuit block configuration diagram showing a PD device according to a fifth embodiment.

As shown in FIG. 38, a PD device 4 according to the fifth embodiment includes an AC/DC converter connected to an AC input, the AC/DC converter 300 composed of a fuse 11, a choke coil 12, a diode rectification bridge 14, capacitors C5, C6, C3, instead of the power source supply circuit 10 as in the first embodiment.

Moreover, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 38, the PD device 4 according to the fifth embodiment includes: a DC/DC converter 13 disposed between an input (DC output of the AC/DC converter) and a VBUS output; a primary-side controller 30 configured to control an input current of the DC/DC converter 13; a signal conversion and switching circuit 25 coupled to a plurality of control inputs, the signal conversion and switching circuit 25 configured to execute signal conversion and switching of control input signals of the plurality of the control inputs; an output capacitor $C_O$ connected between the VBUS output and the signal conversion and switching circuit 25; and a secondary-side controller 16 coupled to the signal conversion and switching circuit 25, the secondary-side controller 16 configured to receive the control input signals subjected to the signal conversion and switching executed in the signal conversion and switching circuit 25, and configured to feed back the received control input signals to the primary-side controller 30. In this context, the primary-side controller 30 varies an output voltage value and an available output current value (MAX value) of the DC/DC converter 13 by controlling the input current on the basis of the control input signals fed back from the secondary-side controller 16.

The control input signal selected in the signal conversion and switching circuit 25 is input into a communication terminal COM of the secondary-side controller 16.

Moreover, as shown in FIG. 38, the PD device 4 according to the fifth embodiment may include a power output circuit 130 connected to the primary-side controller 30, the power output circuit 130 configured to supply output voltages to a plurality of VBUS outputs disposed in pairs with the plurality of the control inputs. In this context, the power output circuit 130 may include a plurality of DC/DC converters in the same manner as the configuration shown in FIG. 3.

Moreover, as shown in FIG. 38, there may be included a plurality of control terminals CT1, CT2, . . . , CTn, and a plurality of the control inputs may be coupled to the plurality of the controls terminals CT1, CT2, . . . , CTn. Moreover, a control output signal of the PD device 4 according to the fifth embodiment can be output to an external apparatus through the plurality of the control terminals CT1, CT2, . . . , CTn.

Although PDDET1 and PDDET2 from USB receptacle are described on the secondary-side controller 16, the PDDET1 and PDDET2 may be omitted.

In the PD device 4 according to the fifth embodiment, the DC/DC converter 13 is a diode rectification type converter. More specifically, the DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the output; and a first capacitor C1 connected between the output and the ground potential.

Moreover, as shown in FIG. 38, the PD device 4 according to the fifth embodiment may include the insulation circuit 20 connected to the secondary-side controller 16, the insulation circuit 20 configured to feed back the control input signals to the primary-side controller 30.

Moreover, as shown in FIG. 38, the PD device 4 according to the fifth embodiment may include the error amplifier 21 for error compensation connected to the secondary-side controller 16, the error amplifier 21 configured to feed back the control input signals to the insulation circuit 20. In this context, as shown in FIG. 38, the error amplifier 21 includes discrete components, e.g. a power amplifier 44, a diode D3, and resistors R5 and R6.

Moreover, the PD device 4 according to the fifth embodiment may include a coupling capacitor $C_C$ configured to couple the secondary-side controller 16 and the signal conversion and switching circuit 25 to each other. Moreover, the secondary-side controller 16 and the signal conversion and switching circuit 25 may be directly connected to each other without through the coupling capacitor $C_C$.

In the PD device 4 according to the fifth embodiment, the signal conversion and switching circuit 25 can execute a frequency conversion, a DC level conversion, or an amplitude level conversion, for example.

Moreover, in the PD device 4 according to the fifth embodiment, the signal conversion and switching circuit 25 may be controlled by the secondary-side controller 16.

Moreover, as shown in FIG. 38, the PD device 4 according to the fifth embodiment may include a MOS switch $Q_{SW}$ connected to the output of the DC/DC converter 13 and configured to interrupt an output voltage of the DC/DC converter 13. The output of the DC/DC converter 13 and the power line output (VBUS) can be interrupted by the MOS switch $Q_{SW}$. ON/OFF control for the MOS switch $Q_{SW}$ can be executed by the secondary-side controller 16. Other configurations are the same as those of the second embodiment.

According to the fifth embodiment, there can be provided the PD device capable of switching with respect to the plurality of apparatuses, and capable of controlling the output voltage value and the available output current value (MAX value).

Sixth Embodiment

Figure 39:
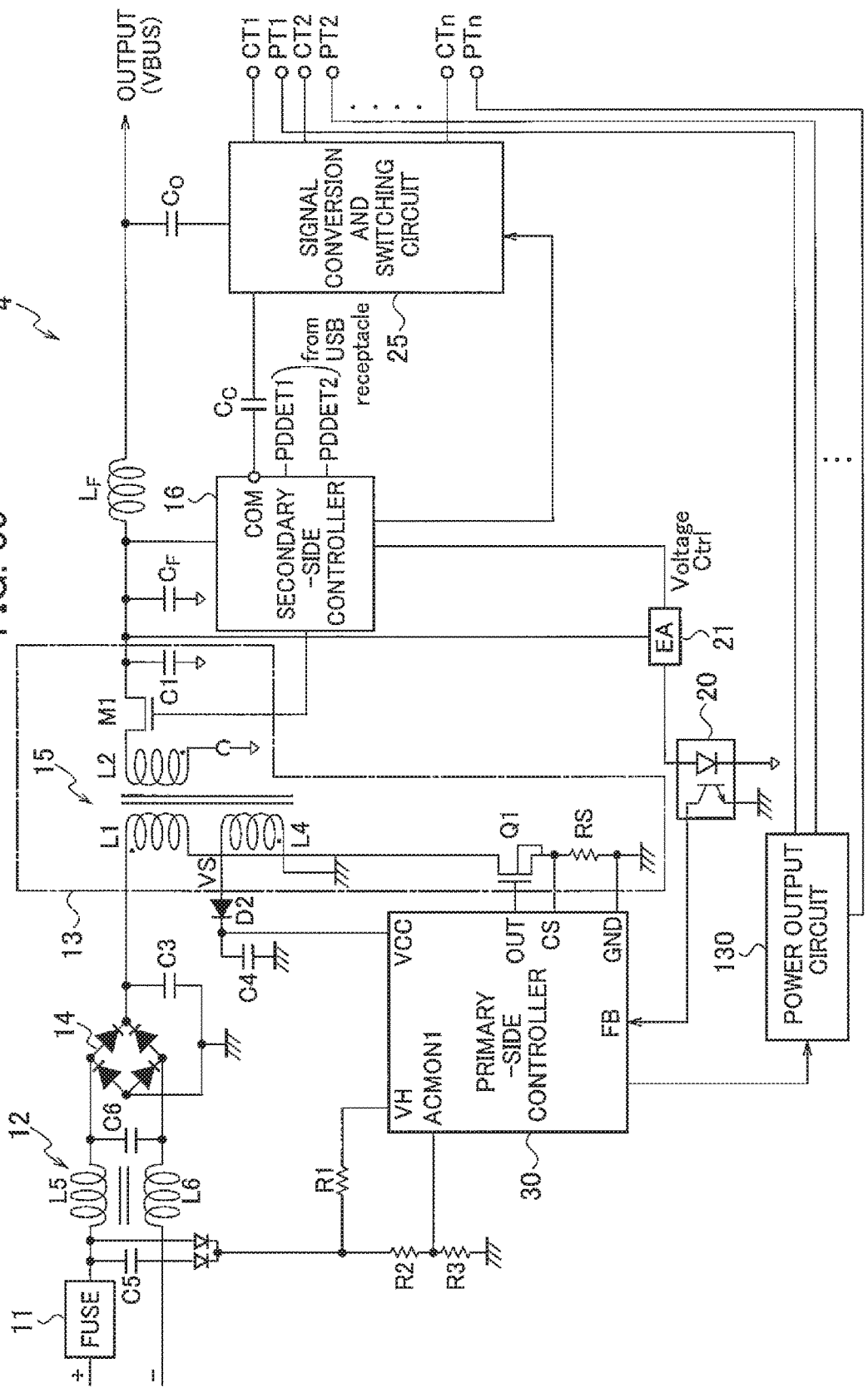
FIG. 39 is a schematic circuit block configuration diagram showing a PD device according to a sixth embodiment.

As shown in FIG. 39, a PD device 4 according to a sixth embodiment includes an AC/DC converter connected to an AC input, the AC/DC converter 300 composed of a fuse 11, a choke coil 12, a diode rectification bridge 14, capacitors C5, C6, C3, instead of the power source supply circuit 10 as in the third embodiment.

Moreover, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 39, the PD device 4 according to the sixth embodiment includes: a DC/DC converter 13 disposed between an input (DC output of the AC/DC converter) and a VBUS output; a primary-side controller 30 configured to control an input current of the DC/DC converter 13; a signal conversion and switching circuit 25 coupled to a plurality of control inputs, the signal conversion and switching circuit 25 configured to execute signal conversion and switching of control input signals of the plurality of the control inputs; an output capacitor $C_O$ connected between the VBUS output and the signal conversion and switching circuit 25; and a secondary-side controller 16 coupled to the signal conversion and switching circuit 25, the secondary-side controller 16 configured to receive the control input signals subjected to the signal conversion and switching executed in the signal conversion and switching circuit 25, and configured to feed back the received control input signals to the primary-side controller 30. In this context, the primary-side controller 30 varies an output voltage value and an available output current value (MAX value) of the DC/DC converter 13 by controlling the input current on the basis of the control input signals fed back from the secondary-side controller 16.

The control input signal selected in the signal conversion and switching circuit 25 is input into a communication terminal COM of the secondary-side controller 16.

Moreover, as shown in FIG. 39, the PD device 4 according to the sixth embodiment may include a power output circuit 130 connected to the primary-side controller 30, the power output circuit 130 configured to supply output voltages to a plurality of VBUS outputs disposed in pairs with the plurality of the control inputs. In this context, the power output circuit 130 may include a plurality of DC/DC converters in the same manner as the configuration shown in FIG. 3.

Moreover, as shown in FIG. 39, there may be included a plurality of control terminals CT1, CT2, . . . , CTn, and a plurality of the control inputs may be coupled to the plurality of the controls terminals CT1, CT2, . . . , CTn. Moreover, a control output signal of the PD device 4 according to the sixth embodiment can be output to an external apparatus through the plurality of the control terminals CT1, CT2, . . . , CTn.

Although PDDET1 and PDDET2 from USB receptacle are described on the secondary-side controller 16, the PDDET1 and PDDET2 may be omitted.

In the PD device 4 according to the sixth embodiment, the DC/DC converter 13 is a synchronous rectification type converter. More specifically, the DC/DC converter 13 includes: a transformer 15; a first MOS transistor Q1 and a current sensing resistor RS each connected in series between the primary-side inductance L1 of the transformer 15 and ground potential; a second MOS transistor M1 connected between the secondary-side inductance L2 of the transformer 15 and the output; and a first capacitor C1 connected between the output and the ground potential.

Moreover, the PD device 4 according to the sixth embodiment may include a coupling capacitor $C_C$ configured to couple the secondary-side controller 16 and the signal conversion and switching circuit 25 to each other. Moreover, the secondary-side controller 16 and the signal conversion and switching circuit 25 may be directly connected to each other without through the coupling capacitor $C_C$.

In the PD device 4 according to the sixth embodiment, the signal conversion and switching circuit 25 can execute a frequency conversion, a DC level conversion, or an amplitude level conversion, for example.

Moreover, in the PD device 4 according to the sixth embodiment, the signal conversion and switching circuit 25 may be controlled by the secondary-side controller 16.

In the PD device 4 according to the sixth embodiment, since the synchronous rectification method is adopted for the DC/DC converter, instead of the diode rectification system, and thereby DC/DC power conversion efficiency can be increased, compared with the second, fourth, and fifth embodiments adapting the diode rectification system. Other configurations are the same as those of the third embodiment.

According to the sixth embodiment, there can be provided the PD device capable of switching with respect to the plurality of apparatuses, and capable of controlling the output voltage value and the available output current value (MAX value).

Seventh Embodiment

Figure 40:
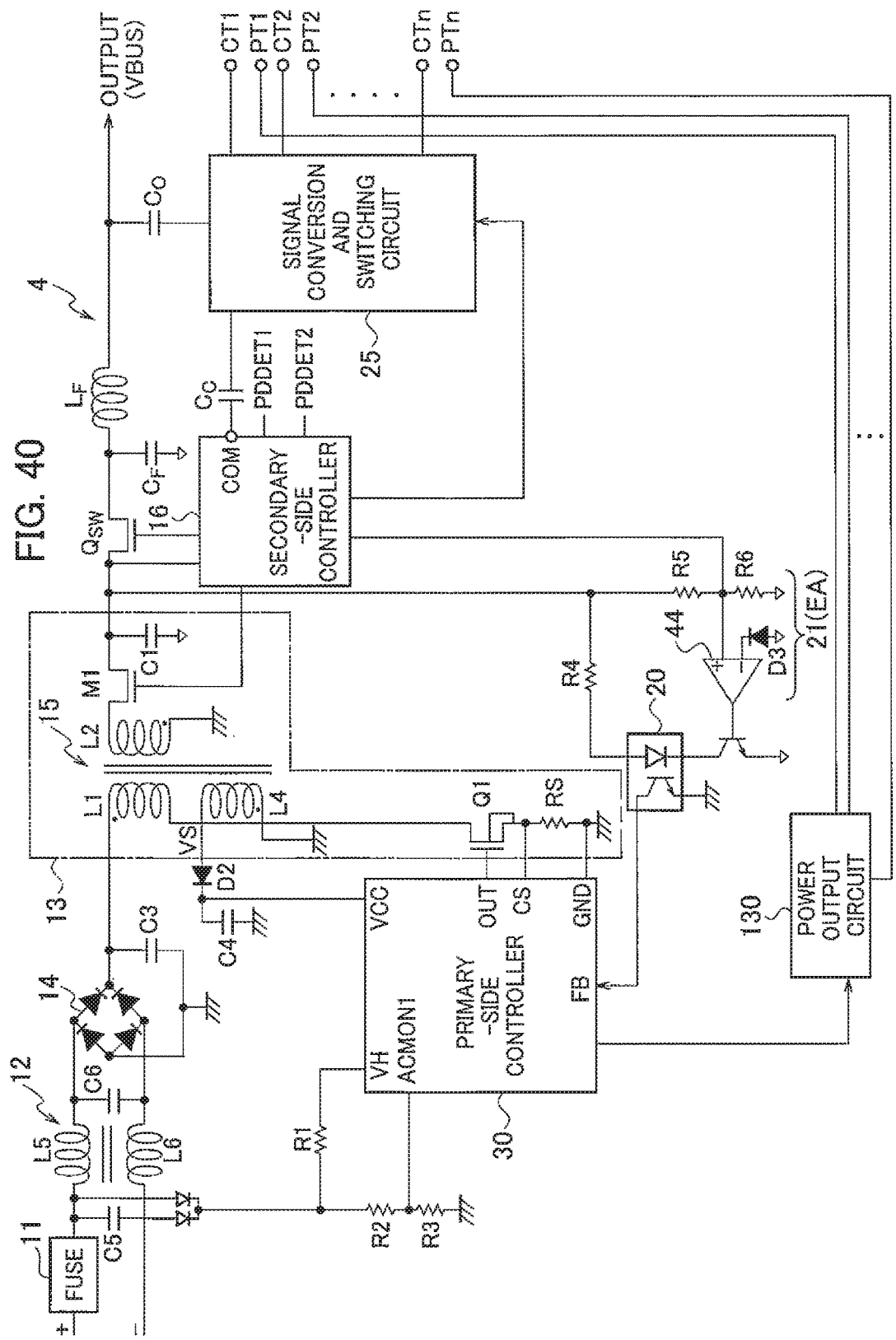
FIG. 40 is a schematic circuit block configuration diagram showing a PD device according to a seventh embodiment.

As shown in FIG. 40, a PD device 4 according to a seventh embodiment includes an AC/DC converter connected to an AC input, the AC/DC converter 300 composed of a fuse 11, a choke coil 12, a diode rectification bridge 14, capacitors C5, C6, C3, instead of the power source supply circuit 10 as in the third embodiment, in the same manner as the sixth embodiment.

Moreover, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 40, the PD device 4 according to the seventh embodiment includes: a DC/DC converter 13 disposed between an input (DC output of the AC/DC converter) and a VBUS output; a primary-side controller 30 configured to control an input current of the DC/DC converter 13; a signal conversion and switching circuit 25 coupled to a plurality of control inputs, the signal conversion and switching circuit 25 configured to execute signal conversion and switching of control input signals of the plurality of the control inputs; an output capacitor $C_O$ connected between the VBUS output and the signal conversion and switching circuit 25; and a secondary-side controller 16 coupled to the signal conversion and switching circuit 25, the secondary-side controller 16 configured to receive the control input signals subjected to the signal conversion and switching executed in the signal conversion and switching circuit 25, and configured to feed back the received control input signals to the primary-side controller 30. In this context, the primary-side controller 30 varies an output voltage value and an available output current value (MAX value) of the DC/DC converter 13 by controlling the input current on the basis of the control input signals fed back from the secondary-side controller 16.

The control input signal selected in the signal conversion and switching circuit 25 is input into a communication terminal COM of the secondary-side controller 16.

Moreover, as shown in FIG. 40, the PD device 4 according to the seventh embodiment may include a power output circuit 130 connected to the primary-side controller 30, the power output circuit 130 configured to supply output voltages to a plurality of VBUS outputs disposed in pairs with the plurality of the control inputs. In this context, the power output circuit 130 may include a plurality of DC/DC converters in the same manner as the configuration shown in FIG. 3.

Moreover, as shown in FIG. 40, there may be included a plurality of control terminals CT1, CT2, . . . , CTn, and a plurality of the control inputs may be coupled to the plurality of the controls terminals CT1, CT2, . . . , CTn. Moreover, a control output signal of the PD device 4 according to the seventh embodiment can be output to an external apparatus through the plurality of the control terminals CT1, CT2, . . . , CTn.

Although PDDET1 and PDDET2 are described on the secondary-side controller 16, the PDDET1 and PDDET2 may be omitted.

In the PD device 4 according to the seventh embodiment, the DC/DC converter 13 is a synchronous rectification type converter. More specifically, the DC/DC converter 13 includes: a transformer 15; a first MOS transistor Q1 and a current sensing resistor RS each connected in series between the primary-side inductance L1 of the transformer 15 and ground potential; a second MOS transistor M1 connected between the secondary-side inductance L2 of the transformer 15 and the output; and a first capacitor C1 connected between the output and the ground potential.

Moreover, as shown in FIG. 40, the PD device 4 according to the seventh embodiment may include the insulation circuit 20 connected to the secondary-side controller 16, the insulation circuit 20 configured to feed back the control input signals to the primary-side controller 30.

Moreover, as shown in FIG. 40, the PD device 4 according to the seventh embodiment may include the error amplifier 21 for error compensation connected to the secondary-side controller 16 and configured to feed back the control input signals to the insulation circuit 20. In this context, as shown in FIG. 40, the error amplifier 21 includes discrete components, e.g. a power amplifier 44, a diode D3, and resistors R5 and R6.

Moreover, the PD device 4 according to the seventh embodiment may include a coupling capacitor $C_C$ configured to couple the secondary-side controller 16 and the signal conversion and switching circuit 25 to each other. Moreover, the secondary-side controller 16 and the signal conversion and switching circuit 25 may be directly connected to each other without through the coupling capacitor $C_C$.

In the PD device 4 according to the seventh embodiment, the signal conversion and switching circuit 25 can execute a frequency conversion, a DC level conversion, or an amplitude level conversion, for example.

Moreover, in the PD device 4 according to the seventh embodiment, the signal conversion and switching circuit 25 may be controlled by the secondary-side controller 16.

In the PD device 4 according to the seventh embodiment, since the synchronous rectification method is adopted for the DC/DC converter, instead of the diode rectification system, and thereby DC/DC power conversion efficiency can be increased, compared with the second, fourth, and fifth embodiments adapting the diode rectification system.

Moreover, as shown in FIG. 40, the PD device 4 according to the seventh embodiment may include a MOS switch $Q_{SW}$ connected to the output of the DC/DC converter 13 and configured to interrupt an output voltage of the DC/DC converter 13. The output of the DC/DC converter 13 and the power line output (VBUS) can be interrupted by the MOS switch $Q_{SW}$. ON/OFF control for the MOS switch $Q_{SW}$ can be executed by the secondary-side controller 16. Other configurations are the same as those of the sixth embodiment.

According to the seventh embodiment, there can be provided the PD device capable of switching with respect to the plurality of apparatuses, and capable of controlling the output voltage value and the available output current value (MAX value).

Eighth Embodiment

Figure 41A:
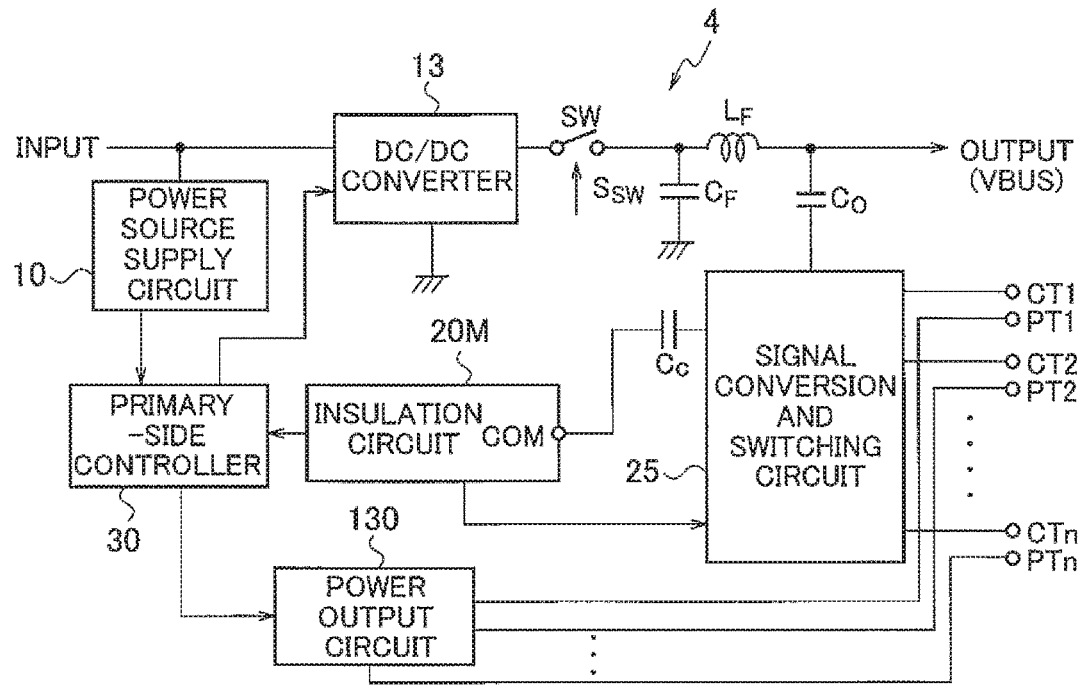
FIG. 41A is a schematic circuit block configuration diagram showing a PD device according to an eighth embodiment.

As shown in FIG. 41A, a PD device 4 according to the eighth embodiment includes: a DC/DC converter 13 disposed between an input and a VBUS output; a primary-side controller 30 configured to control an input current of the DC/DC converter 13; a signal conversion and switching circuit 25 coupled to a plurality of control inputs, the signal conversion and switching circuit 25 configured to execute signal conversion and switching of control input signals of the plurality of the control inputs; an output capacitor $C_O$ connected between the VBUS output and the signal conversion and switching circuit 25; and an insulation circuit 20M coupled to the signal conversion and switching circuit 25, the insulation circuit 20M configured to receive the control input signals subjected to the signal conversion and switching executed in the signal conversion and switching circuit 25, and configured to feed back the received control input signals to the primary-side controller 30. In this context, the primary-side controller 30 varies an output voltage value and an available output current value (MAX value) of the DC/DC converter 13 by controlling the input current on the basis of the control input signals fed back from the insulation circuit 20M.

In this context, the control input signal switched in the signal conversion and switching circuit 25 is input into a communication terminal COM of the insulation circuit 20M.

The plurality of the control inputs may be directly connected to the signal conversion and switching circuit 25.

Moreover, the signal conversion and switching circuit 25 can be controlled by the insulation circuit 20M.

Moreover, as shown in FIG. 41A, the PD device 4 according to the eighth embodiment may include a power output circuit 130 connected to the primary-side controller 30, the power output circuit 130 configured to supply output voltages to a plurality of VBUS outputs disposed in pairs with the plurality of the control inputs. In this context, the power output circuit 130 may include a plurality of DC/DC converters in the same manner as the configuration shown in FIG. 3.

Moreover, as shown in FIG. 41A, there may be included a plurality of control terminals CT1, CT2, . . . , CTn, and a plurality of the control inputs may be coupled to the plurality of the controls terminals CT1, CT2, . . . , CTn. Moreover, a control output signal of the PD device 4 according to the eighth embodiment can be output to an external apparatus through the plurality of the control terminals CT1, CT2, . . . , CTn.

Moreover, as shown in FIG. 41A, the secondary-side controller and the error amplifier are removed from the PD device 4 according to the eighth embodiment.

Moreover, the PD device 4 according to the eighth embodiment may include a coupling capacitor $C_C$ configured to couple the insulation circuit 20M and the signal conversion and switching circuit 25 to each other. Moreover, between the insulation circuit 20M and the signal conversion and switching circuit 25 may be directly connected without through the coupling capacitor $C_C$. A capacitor, a photo coupler, a transformer, etc. is applicable to the insulation circuit 20M. Moreover, as usage, a bidirectional transformer having an insulated driver, a bilateral device, etc. may also be applied thereto.

In the PD device 4 according to the eighth embodiment, the signal conversion and switching circuit 25 can execute a frequency conversion, a DC level conversion, or an amplitude level conversion, for example.

Moreover, in the PD device 4 according to the eighth embodiment, the signal conversion and switching circuit 25 may be controlled by the insulation circuit 20 or the primary-side controller 30. Other configurations are the same as those of the first embodiment.

Modified Example

Figure 41B:
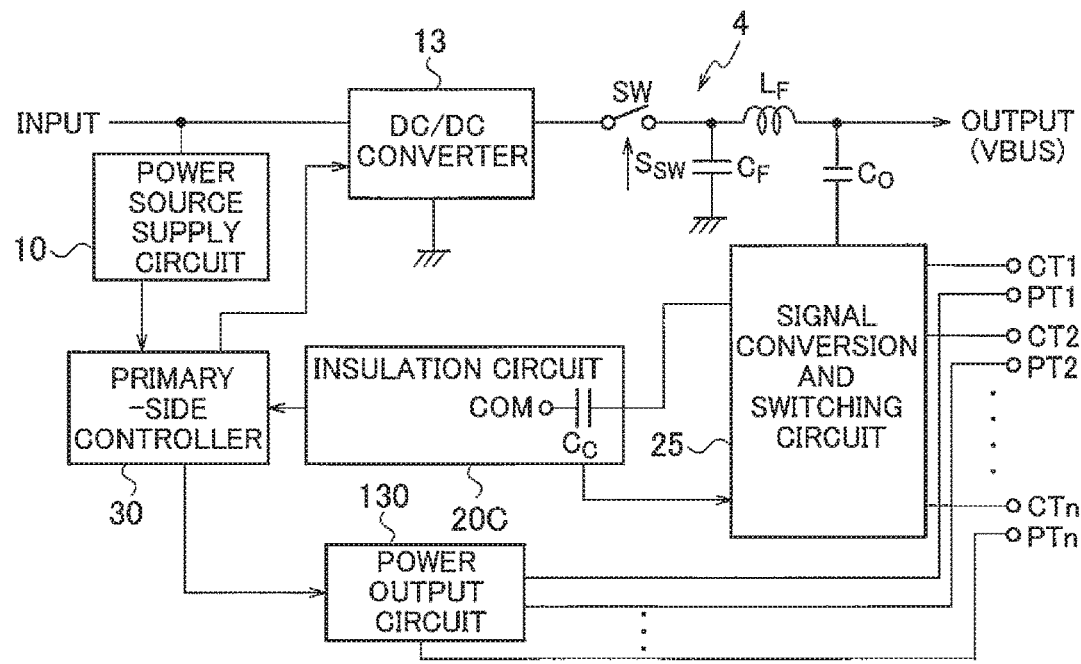
FIG. 41B is a schematic circuit block configuration diagram showing a PD device according to a modified example of the eighth embodiment.

As shown in FIG. 41B, the PD device 4 according to a modified example of the eighth embodiment includes: a DC/DC converter 13 disposed between an input and a VBUS output; a primary-side controller 30 configured to control an input current of the DC/DC converter 13; a signal conversion and switching circuit 25 coupled to a plurality of control inputs, the signal conversion and switching circuit 25 configured to execute signal conversion and switching of control input signals of the plurality of the control inputs; an output capacitor $C_O$ connected between the VBUS output and the signal conversion and switching circuit 25; and an insulation circuit 20M coupled to the signal conversion and switching circuit 25, the insulation circuit 20M configured to receive the control input signals subjected to the signal conversion and switching executed in the signal conversion and switching circuit 25, and configured to feed back the received control input signals to the primary-side controller 30. In the present example, the primary-side controller 30 varies an output voltage value and an available output current value (MAX value) of the DC/DC converter 13 by controlling the input current on the basis of the control input signals fed back from the insulation circuit 20M.

In the present example, the control input signal switched in the signal conversion and switching circuit 25 is input into a communication terminal COM of the insulation circuit 20C.

Moreover, as shown in FIG. 41B, there may be included a plurality of control terminals CT1, CT2, ..., CTn, and a plurality of the control inputs may be coupled to the plurality of the controls terminals CT1, CT2, ..., CTn. Moreover, a control output signal of the PD device 4 according to the modified example of the eighth embodiment can be output to an external apparatus through the plurality of the control terminals CT1, CT2, ..., CTn.

Moreover, as shown in FIG. 41B, the secondary-side controller and the error amplifier are removed from the PD device 4 according to the modified example of the eighth embodiment.

Moreover, as shown in FIG. 41B, the coupling capacitor Cc configured to couple the insulation circuit 20C and the signal conversion and switching circuit 25 to each other is contained in the insulation circuit 20C, in the PD device 4 according to the modified example of the eighth embodiment. Other configurations are the same as those of the eighth embodiment.

According to the eighth embodiment and its modified examples, there can be provided the PD device capable of switching with respect to the plurality of apparatuses, and capable of controlling the output voltage value and the available output current value (MAX value).

(MOS Switch)

Figure 42:
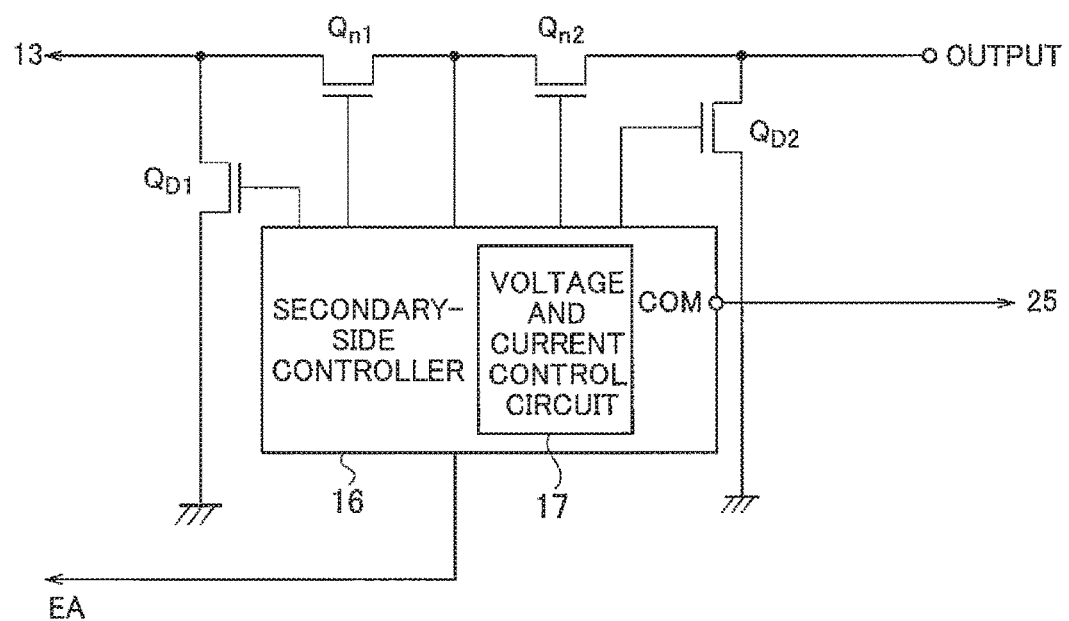
FIG. 42 is a schematic circuit block configuration diagram showing a metal oxide semiconductor (MOS) switch applied to the PD device according to the embodiments.

As shown in FIG. 42, a schematic circuit block configuration example of a switch SW applicable to the PD device 4 according to the first or eighth embodiment, or a MOS switch $Q_{SW}$ applicable to the PD device according to the second, third, fifth or seventh embodiment includes: two n-channel MOSFETs $Q_{n1}$ and $Q_{n2}$ connected to each other in series; and MOSFETs $Q_{D1}$ and $Q_{D2}$ for discharging respectively connected to both ends of the n channel MOSFETs $Q_{n1}$ and $Q_{n2}$ connected to each other in series.

In the PD device 4 according to the first to seventh embodiments, each gate of the two n-channel MOSFETs $Q_{n1}$ and $Q_{n2}$ connected to each other in series is connected to the secondary-side controller 16, and ON/OFF of MOSFETs $Q_{n1}$ and $Q_{n2}$ is controlled by the secondary-side controller 16. A voltage and current control circuit 17 is contained in the secondary-side controller 16, and the control input signal is input into the communication terminal COM of the secondary-side controller 16. Moreover, in the PD device 4 according to the eighth embodiment, gates of the two n channel MOSFETs $Q_{n1}$ and $Q_{n2}$ connected in series to each other can be controlled by the insulation circuits 20M and 20C or the primary-side controller 30.

(AC Adapter/AC Charger)

The PD device 4 according to the first to eighth embodiments can be contained in AC adapters/AC chargers 3, as shown in FIGS. 43 to 48.

Figure 43A:
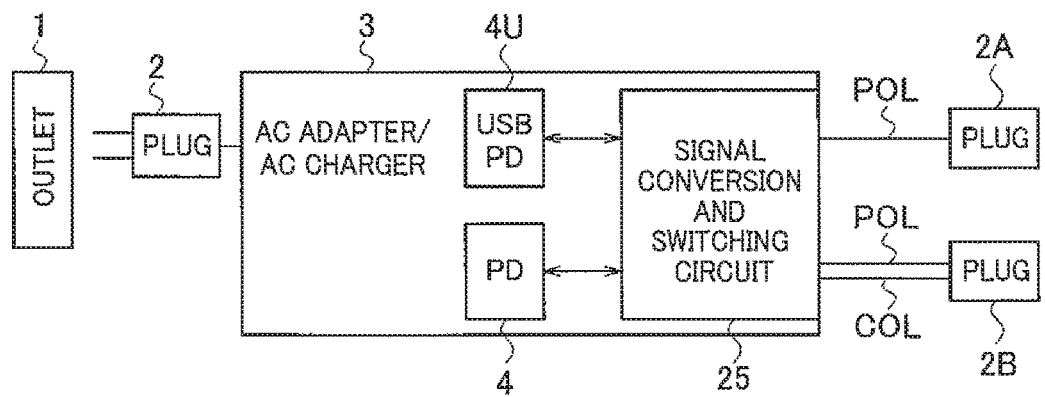
FIG. 43A shows an example of connecting a USB PD and the PD device (PD) according to the embodiments in an AC adapter/AC charger with external plugs, in an example of wire connection for connecting the AC adapter/AC charger to a plug capable of being connected to an outlet, using a cable.
Figure 43B:
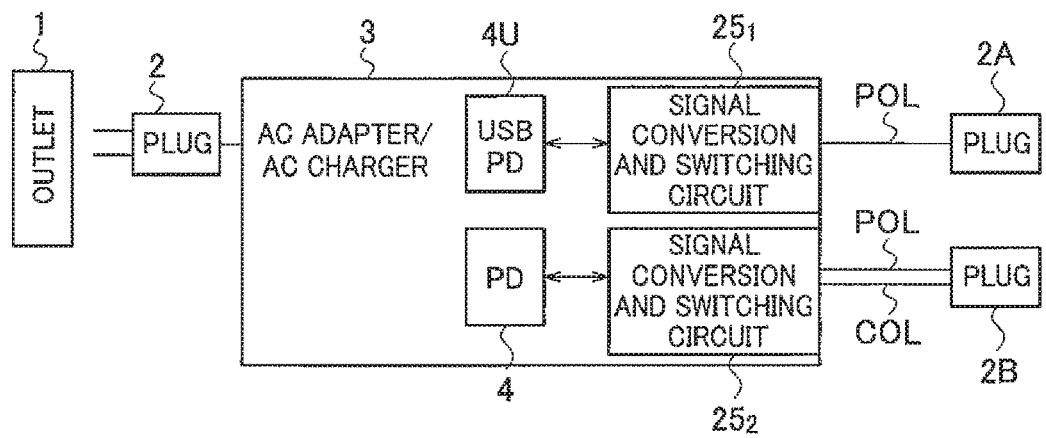
FIG. 43B shows another example of connecting the USB PD and the PD device (PD) according to the embodiments in the AC adapter/AC charger with external plugs, in the example of wire connection for connecting the AC adapter/AC charger to the plug capable of being connected to the outlet, using the cable.

In examples of wire connection for connecting a plug 2 capable of being connected to an outlet 1 to the AC adapter/AC charger 3 using a cable, FIG. 43A shows an example of connecting the signal conversion and switching circuit 25 in the AC adapter/AC charger 3 to external plugs 2A and 2B, and FIG. 43B shows another example thereof.

In FIG. 43A, a control input signal of USB PD 4U and a control input signal of the PD device (PD) 4 according to the embodiments can be switched by the signal conversion and switching circuit 25. The signal conversion and switching circuit 25 can be contained in the PD device (PD) 4.

In FIG. 43A, the signal conversion and switching circuit 25 and the plug 2A are connected to each other by a power line POL, and the signal conversion and switching circuit 25 and the plug 2B are connected to each other by a power line POL and a communication dedicated line COL.

Each of the USB PD 4U and the PD device (PD) 4 can be bidirectionally connected to the signal conversion and switching circuit 25, as shown in FIG. 43A. In FIG. 43B, the control input signal of the USB PD 4U and the control input signal of the PD device (PD) 4 according to the embodiments can be switched by a plurality of signal conversion and switching circuits $25_1$ and $25_2$. The signal conversion and switching circuits $25_1$ and $25_2$ can be respectively contained in the USB PD 4U and the PD device (PD) 4.

In FIG. 43B, the signal conversion and switching circuit $25_1$ and the plug 2A are connected to each other by a power line POL, and the signal conversion and switching circuit 252 and the plug 2B are connected to each other by a power line POL and a communication dedicated line COL.

The USB PD 4U and the PD device (PD) 4 can be bidirectionally and respectively connected to the signal conversion and switching circuits $25_1$ and $25_2$, as shown in FIG. 43B.

One or a plurality of the signal conversion and switching circuits 25 can be contained in the AC adapter/AC charger 3. In the AC adapter/AC charger 3 simultaneously including the USB PD 4U and the PD device (PD) 4, the number of extraction of the outputs can be variously selected, through such a signal conversion and switching circuit operation. For example, it is possible to set a ratio of the number of extraction in the USB PD 4U and the PD device (PD) 4 as 1:N, 1:1, or N:1, where N is an integer greater than or equal to 2.

Figure 44A:
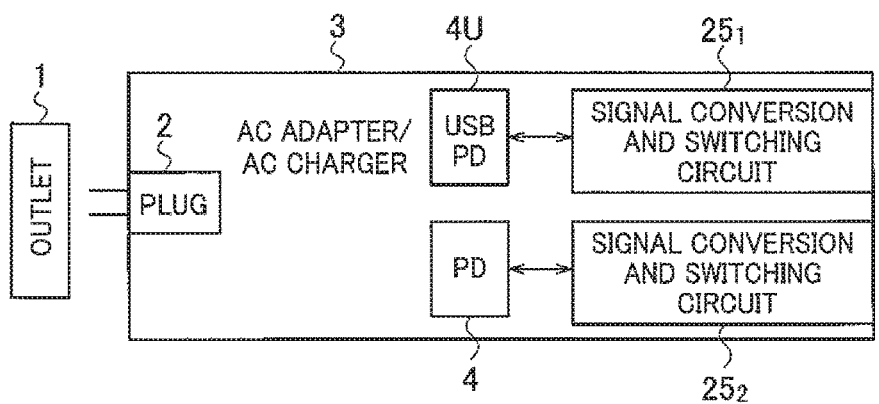
FIG. 44A shows an example of including the USB PD and the PD device (PD) according to the embodiments in the AC adapter/AC charger, in an example of containing a plug capable of being connected to the outlet in the AC adapter/AC charger.
Figure 44B:
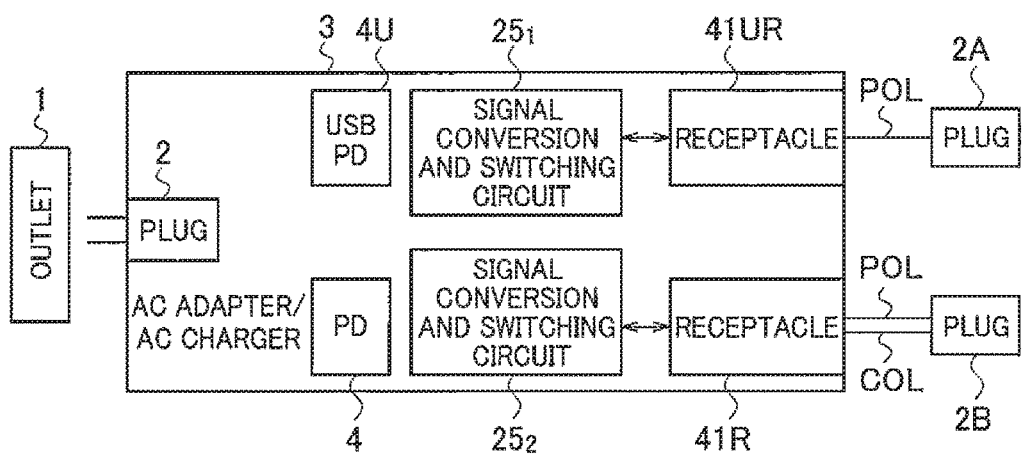
FIG. 44B shows an example of connecting receptacles contained in the AC adapter/AC charger to the external plugs, in the example of containing the plug capable of being connected to the outlet in the AC adapter/AC charger.

In examples of containing the plug 2 capable of being connected to the outlet 1 in the AC adapter/AC charger 3, FIG. 44A shows an example of including the USB PD 4U and the PD device (PD) 4 according to the embodiments=in the AC adapter/AC charger 3, and FIG. 44B shows an example of connecting external plugs 2A, 2B to receptacles 41UR, 41R contained in the AC adapter/AC charger 3.

In FIG. 44A, the control input signal of the USB PD 4U and the control input signal of the PD device (PD) 4 can be switched by the signal conversion and switching circuits $25_1$ and $25_2$. The signal conversion and switching circuits $25_1$ and $25_2$ can be respectively contained in the USB PD 4U and the PD device (PD) 4.

The USB PD 4U and the PD device (PD) 4 can be bidirectionally connected to the signal conversion and switching circuits $25_1$ and $25_2$, as shown in FIG. 44A.

In FIG. 44B, the control input signal of the receptacle 41UR used for the USB PD 4U and the control input signal of the receptacle 41R used for the PD device (PD) 4 can be switched by the plurality of the signal conversion and switching circuits $25_1$ and $25_2$.

The receptacle 41UR and the plug 2A are connected to each other by the power line POL. The receptacle 41R and the plug 2B are connected to each other by the power line POL and the communication dedicated line COL.

The signal conversion and switching circuits $25_1$ and $25_2$ can be respectively and bidirectionally connected to the receptacles 41UR, 41R, as shown in FIG. 44B.

Figure 45A:
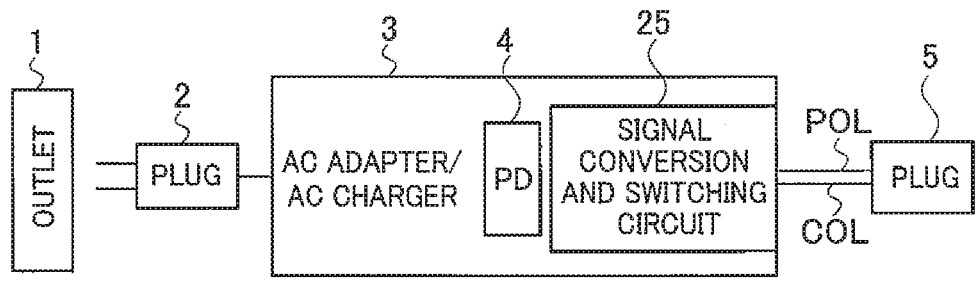
FIG. 45A shows an example of connecting the PD in an AC adapter/AC charger to an external plug, in an example of wire connection for connecting the AC adapter/AC charger to a plug capable of being connected to an outlet using a cable.

As shown in FIG. 45A, the AC adapter/AC charger 3 containing the PD device (PD) 4 according to the embodiments can be connected to the plug 2 connectable to the outlet 1 using a cable, and can be connected to the plug 5 disposed an outside of the AC adapter/AC charger 3. The signal conversion and switching circuit 25 and the plug 5 are connected to each other by the power line POL and the communication dedicated line COL. In FIG. 45A, the control input signal of the PD device (PD) 4 can be switched by the signal conversion and switching circuit 25. The signal conversion and switching circuit 25 can be contained in the PD device (PD) 4.

Figure 45B:
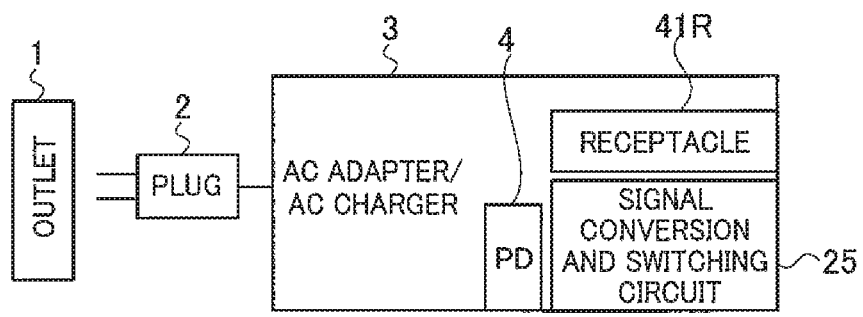
FIG. 45B shows an example of including a receptacle in the AC adapter/AC charger, in the example of wire connection for connecting the AC adapter/AC charger to the plug capable of being connected to the outlet using the cable.

Moreover, as shown in FIG. 45B, the AC adapter/AC charger 3 containing the PD device according to the embodiments can be connected to the plug 2 connectable to the outlet 1 using a cable, and may include the receptacle 41R used for the PD device (PD) 4 and the signal conversion and switching circuit 25. In FIG. 45B, the control input signal of the receptacle 41R for the PD device (PD) 4 can be switched by the signal conversion and switching circuit 25.

Figure 45C:
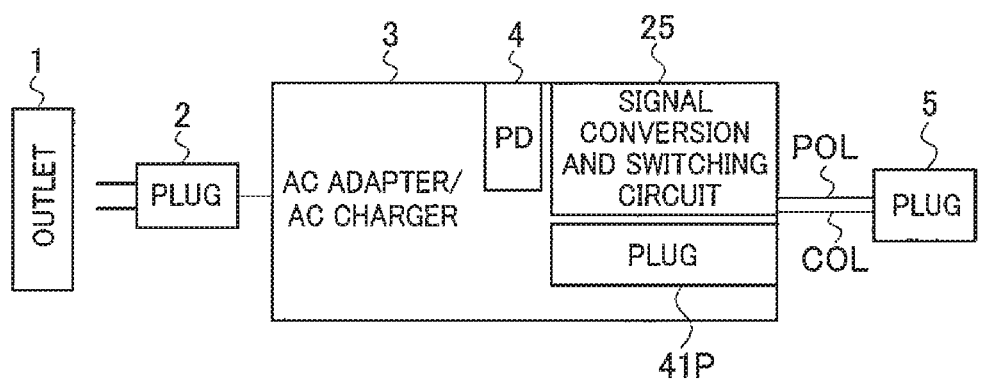
FIG. 45C shows an example of connecting a plug contained in the AC adapter/AC charger to the external plug, in the example of wire connection for connecting the AC adapter/AC charger to the plug capable of being connected to the outlet using the cable.

Moreover, as shown in FIG. 45C, the AC adapter/AC charger 3 containing the PD device according to the embodiments can be connected to the plug 2 connectable to the outlet 1 using a cable, and may include a plug 41P. The plug 41P can be connected to the plug 5 disposed at the outside thereof. The plug 41P and the plug 5 are connected to each other by the power line POL and the communication dedicated line COL. In FIG. 45C, the control input signal of the plug 41P for the PD device (PD) 4 can be switched by the signal conversion and switching circuit 25.

Figure 46A:
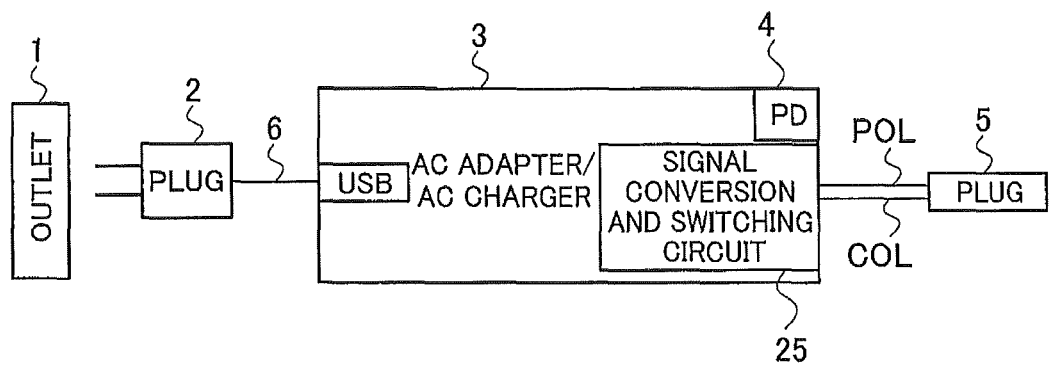
FIG. 46A shows an example of connecting the PD in the AC adapter/AC charger to the external plug, in an example of wire connection for connecting the AC adapter/AC charger to the plug capable of being connected to the outlet using a USB PD cable.

Moreover, as shown in FIG. 46A, the AC adapter/AC charger 3 containing the PD device (PD) 4 according to the embodiments can be connected to the plug 2 connectable to the outlet 1 using a USB PD cable 6, and can also be connected to the plug 5 disposed at the outside of the AC adapter/AC charger 3. The signal conversion and switching circuit 25 and the plug 5 are connected to each other by the power line POL and the communication dedicated line COL. In FIG. 46A, the control input signal of the PD device (PD) 4 can be switched by the signal conversion and switching circuit 25. The signal conversion and switching circuit 25 can be contained in the PD device (PD) 4.

Figure 46B:
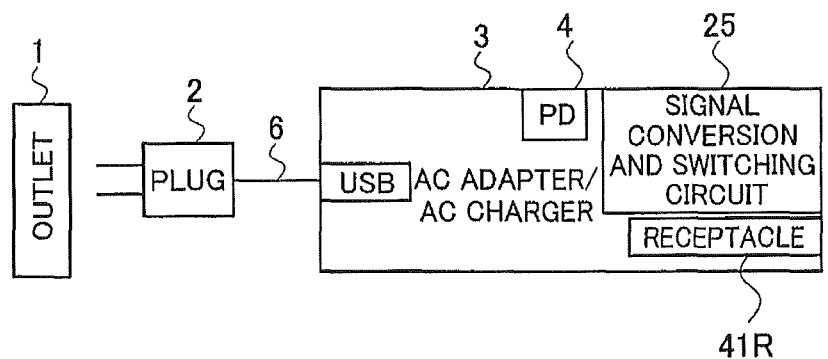
FIG. 46B shows an example of including a receptacle in the AC adapter/AC charger, in the example of wire connection for connecting the AC adapter/AC charger to the plug capable of being connected to the outlet using the USB PD cable.

Moreover, as shown in FIG. 46B, the AC adapter/AC charger 3 containing the PD device according to the embodiments can be connected to the plug 2 connectable to the outlet 1 using the USB PD cable 6, and may also include a receptacle 41R. In FIG. 46B, the control input signal of the receptacle 41R for the PD device (PD) 4 can be switched by the signal conversion and switching circuit 25.

Figure 46C:
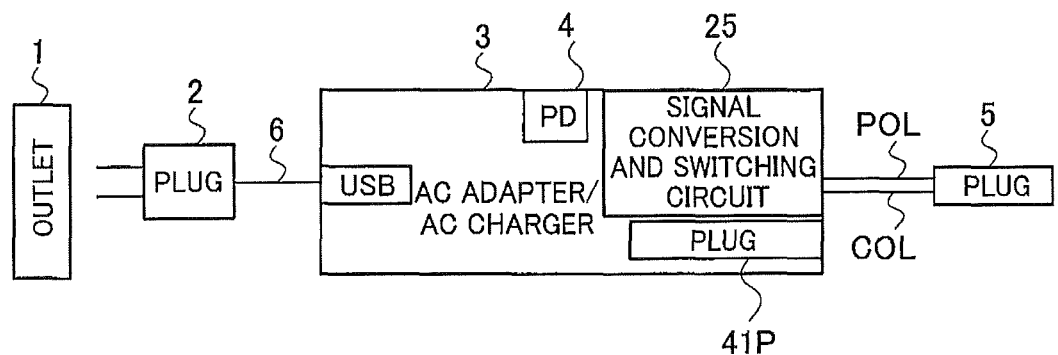
FIG. 46C shows an example of connecting a plug contained in the AC adapter/AC charger to the external plug, in the example of wire connection for connecting the AC adapter/AC charger to the plug capable of being connected to the outlet using the USB PD cable.

Moreover, as shown in FIG. 46C, the AC adapter/AC charger 3 containing the PD device according to the embodiments may be connected to the plug 2 connectable to the outlet 1 using the USB PD cable 6, and may also include a plug 41P. The plug 41P can be connected to the plug 5 disposed at the outside thereof. The plug 41P and the plug 5 are connected to each other by the power line POL and the communication dedicated line COL. In FIG. 46C, the control input signal of the plug 41P for the PD device (PD) 4 can be switched by the signal conversion and switching circuit 25.

Figure 47A:
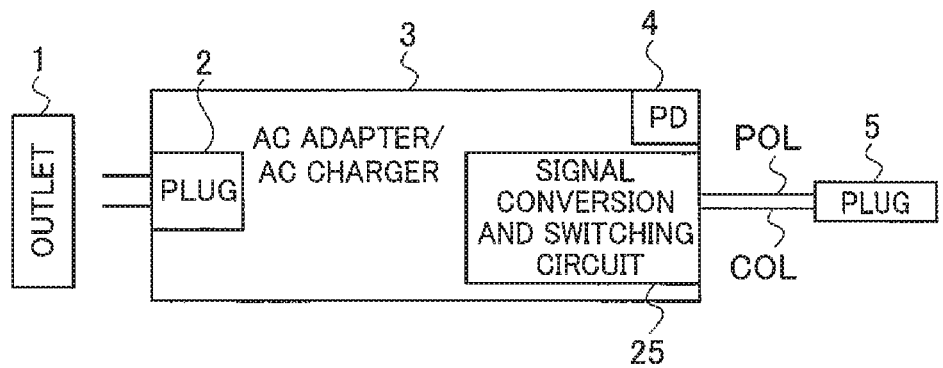
FIG. 47A shows an example of connecting the PD in the AC adapter/AC charger to the external plug, in an example of containing the plug capable of being connected to the outlet in the AC adapter/AC charger.
Figure 47B:
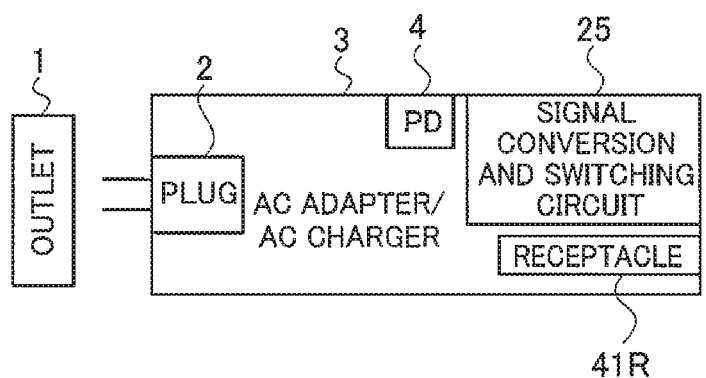
FIG. 47B shows an example of including the receptacle in the AC adapter/AC charger, in the example of containing the plug capable of being connected to the outlet in the AC adapter/AC charger.
Figure 47C:
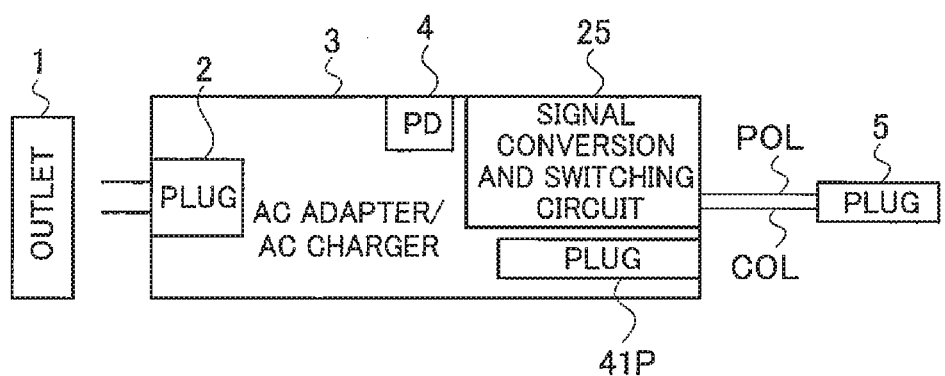
FIG. 47C shows an example of connecting the plug contained in the AC adapter/AC charger to the external plugs, in the example of containing the plug capable of being connected to the outlet in the AC adapter/AC charger.

Moreover, the plug 2 connectable to the outlet 1 may be contained in the AC adapter/AC charger 3 including the PD device according to the embodiments, as shown in FIGS. 47A to 47C.

As shown in FIG. 47A, the AC adapter/AC charger 3 containing the PD device (PD) 4 according to the embodiments and the plug 2 can be connected to the plug 5 disposed at the outside thereof. The signal conversion and switching circuit 25 and the plug 5 are connected to each other by the power line POL and the communication dedicated line COL. In FIG. 47A, the control input signal of the PD device (PD) 4 can be switched by the signal conversion and switching circuit 25. The signal conversion and switching circuit 25 can be contained in the PD device (PD) 4.

Moreover, the AC adapter/AC charger 3 containing the PD device according to the embodiments and the plug 2 may include the receptacle 41R, as shown in FIG. 47B. In FIG. 47B, the control input signal of the receptacle 41R for the PD device (PD) 4 can be switched by the signal conversion and switching circuit 25.

Moreover, the AC adapter/AC charger 3 containing the PD device according to the embodiments and the plug 2 may include the plug 41P, as shown in FIG. 47C. The plug 41P can be connected to the plug 5 disposed at the outside thereof. The plug 41P and the plug 5 are connected to each other by the power line POL and the communication dedicated line COL.

In FIG. 47C, the control input signal of the plug 41P for the PD device (PD) 4 can be switched by the signal conversion and switching circuit 25.

Figure 48A:
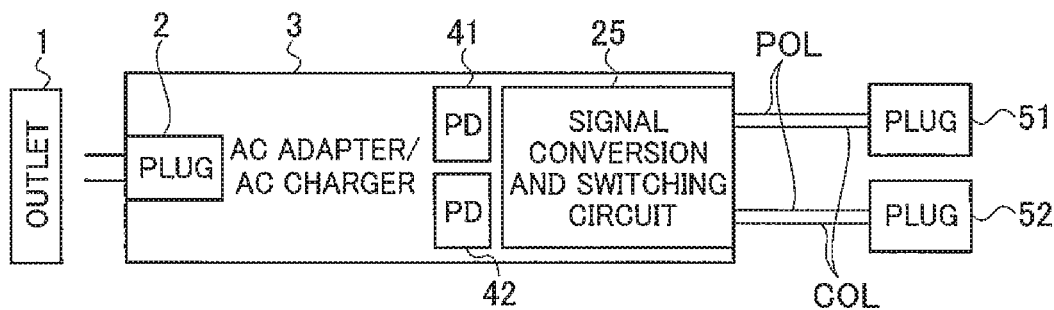
FIG. 48A shows an example of respectively connecting a plurality of the PDs in the AC adapter/AC charger to a plurality of the external plugs, in an example of containing the plug capable of being connected to the outlet in the AC adapter/AC charger.
Figure 48B:
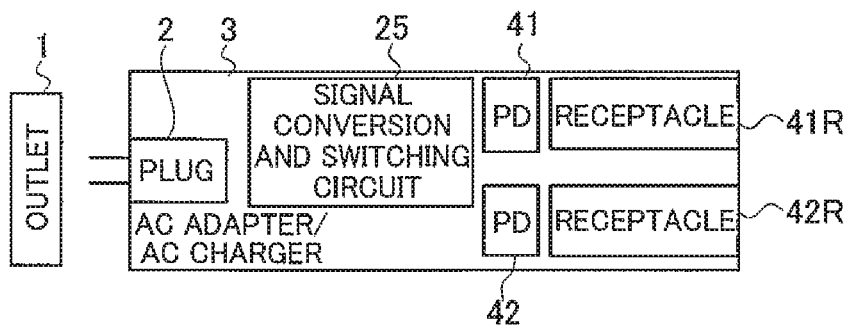
FIG. 48B shows an example of including a plurality of the receptacles in the AC adapter/AC charger, in the example of containing the plug capable of being connected to the outlet in the AC adapter/AC charger.
Figure 48C:
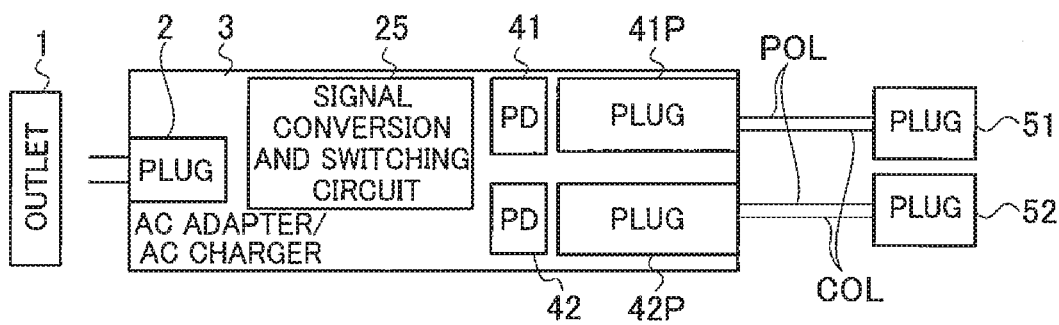
FIG. 48C shows an example of respectively connecting a plurality of the plugs contained in the AC adapter/AC charger to a plurality of the external plugs, in the example of containing the plug capable of being connected to the outlet in the AC adapter/AC charger.

A plurality of the PD devices according to the embodiments can be contained in the AC adapter/AC charger 3, as shown in FIGS. 48A to 48C. Moreover, the plug 2 connectable to the outlet 1 is also contained therein.

As shown in FIG. 48A, the AC adapter/AC charger 3 containing a plurality of the PD devices (PD) 41 and 42 according to the embodiments and the plug 2 can be respectively connected to a plurality of the plugs 51 and 52 disposed at the outside thereof. The signal conversion and switching circuit 25 and the plugs 51 and 52 are connected to each other respectively by the power line POL and the communication dedicated line COL. In FIG. 48A, the control input signals of the PD devices (PD) 41 and 42 can be switched by the signal conversion and switching circuit 25. The signal conversion and switching circuit 25 can be contain in the PD devices (PD) 41 and 42.

Moreover, the AC adapter/AC charger 3 containing the plurality of the PD devices (PD) 41 and 42 according to the embodiments, and the plug 2 may include receptacles 41R and 42R, as shown in FIG. 48B. In FIG. 48B, the control input signals of the receptacles 41R and 42R for the PD devices (PD) 41 and 42 can be switched by the signal conversion and switching circuit 25.

Moreover, the AC adapter/AC charger 3 containing the plurality of the PD devices (PD) 41 and 42 according to the embodiments and the plug 2 may include plugs 41P and 42P, as shown in FIG. 48C. The plugs 41P and 42P can be respectively connected to the plugs 51 and 52 disposed at the outside thereof. The plugs 41P and 42P and the plugs 51 and 52 are respectively connected to each other by the power line POL and the communication dedicated line COL. In FIG. 48C, the control input signals of the plugs 41P and 42P for the PD devices (PD) 41 and 42 can be switched by the signal conversion and switching circuit 25.

(Electronic Apparatus)

As shown in FIGS. 49 to 50, the PD device according to the first to eighth embodiments can be contained in an electronic apparatus 7. As an electronic apparatus, there are applicable various apparatus, e.g. monitors, external hard disk drives, set top boxes, laptop PCs, tablet PCs, smartphones, battery charger systems, personal computers (PCs), docking stations, display apparatuses, printers, cleaners, refrigerators, facsimiles, telephones, car navigation systems, car computers, television sets, spectacles, head-mounted displays, fans, air-conditioners, laser displays, or wall outlets, for example.

Figure 49A:
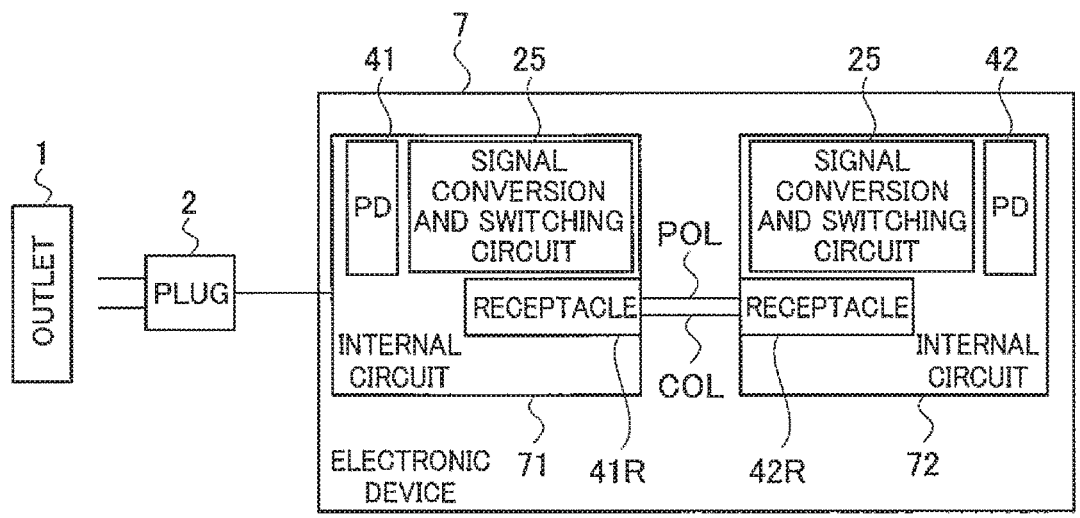
FIG. 49A shows in particular an example of including a plurality of internal circuits containing the USB PD device therein in an electronic apparatus, having a plurality of signals using the USB PD, in an example of wire connection for connecting the electronic apparatus to the plug capable of being connected to the outlet using the cable.

FIG. 49A shows an example of including internal circuits 71 and 72 respectively containing the PD devices 41 and 42 and the receptacles 41R and 42R in electronic apparatus 7, in an example of wire connection for connecting the electronic apparatus 7 to the plug 2 capable of being connected to the outlet 1 using a cable.

Figure 49B:
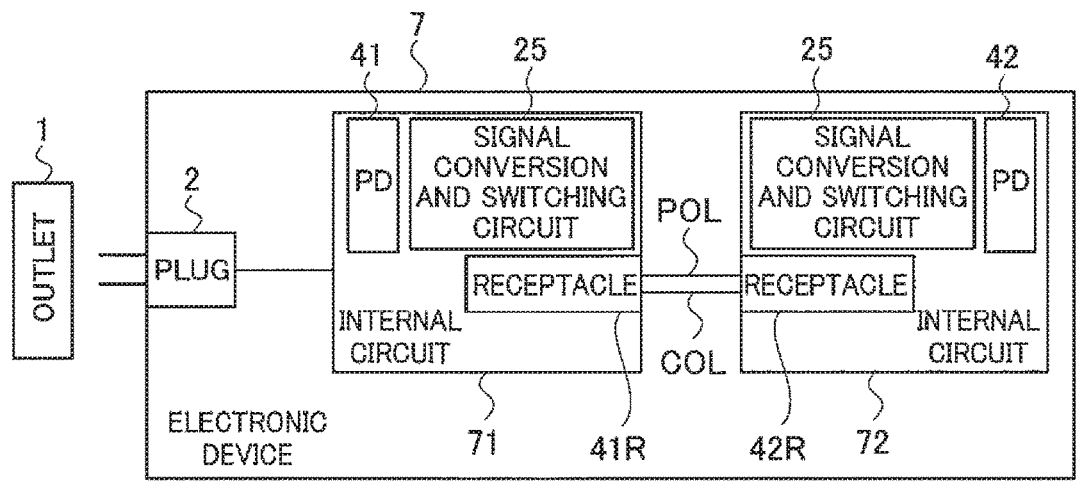
FIG. 49B shows the example of wire connection in which the electronic apparatus is connected to the plug connectable to the outlet using the cable, and shows in particular an example in which the plug connectable to the outlet is included in the electronic apparatus, the plurality of the internal circuits which include the USB PD therein are included in the electronic apparatus, having the plurality of the signals using the USB PD.

Moreover, FIG. 49B shows an example of containing the plug 2 connectable to the outlet 1 in the electronic apparatus 7, and also including internal circuits 71 and 72 respectively containing the PD devices 41 and 42 and the receptacles 41R and 42R in the electronic apparatus 7.

In FIGS. 49A and 49B, the receptacles 41R and 42R are connected to each other by the power line POL and the communication dedicated line COL. In FIGS. 49A and 48B, the control input signals of the receptacles 41R and 42R for the PD devices (PD) 41 and 42 can be switched by the signal conversion and switching circuit 25.

Figure 50A:
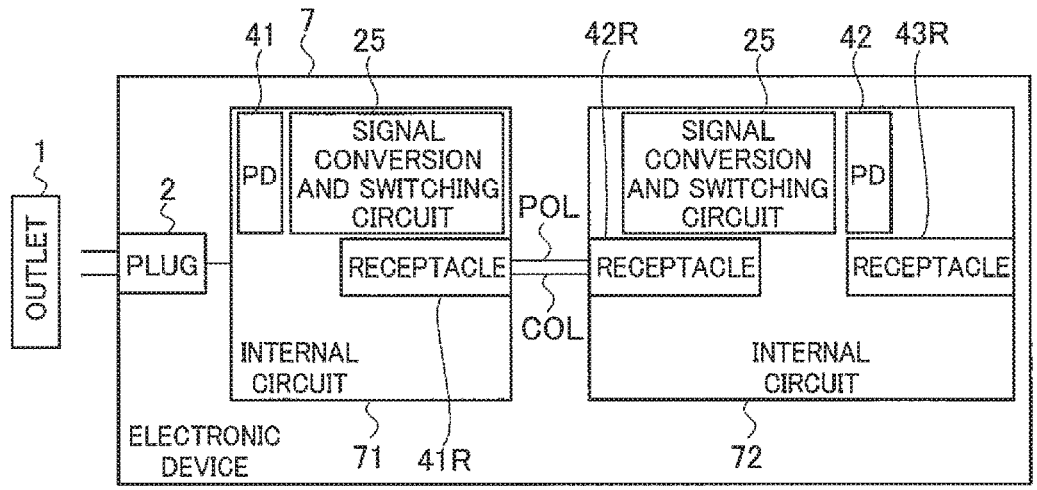
FIG. 50A shows in particular an example of including the USB PD connected to the outside in one internal circuit, in an example in which the plug capable of being connected to the outlet is included in the electronic apparatus, and the plurality of the internal circuits containing the USB PD device therein are included in the electronic apparatus, having the plurality of the signals using the USB PD device.

FIG. 50A shows an example of including the receptacle 43R connected to the outside thereof in one internal circuit 72, in an example of containing the plug 2 connectable to the outlet 1 in the electronic apparatus 7, and also including internal circuits 71, 72 respectively containing the PD devices 41, 42 and the receptacles 41R, 42R in the electronic apparatus 7.

Figure 50B:
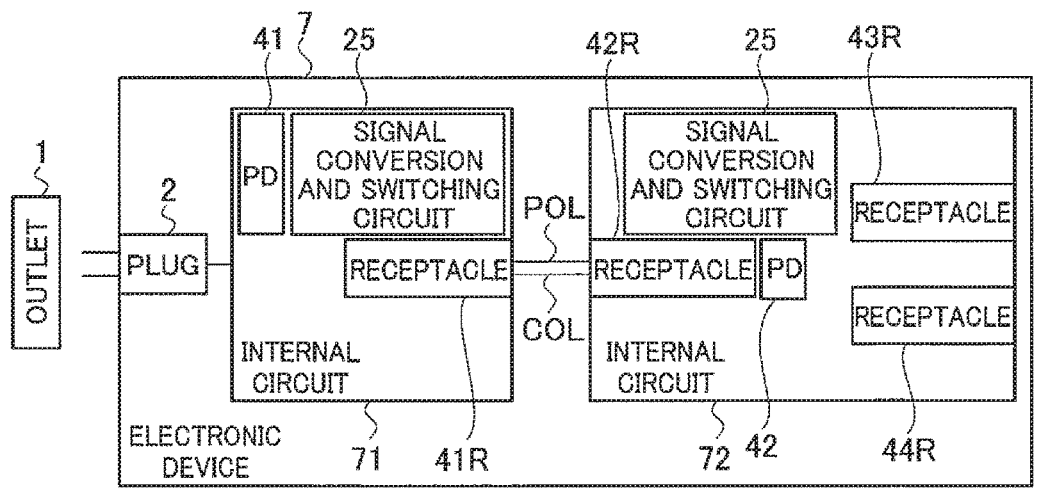
FIG. 50B shows in particular an example of including a plurality of the USB PD devices connected to the outside in one internal circuit, in the example in which the plug capable of being connected to the outlet is included in the electronic apparatus, the plurality of the internal circuits containing the USB PD device therein are included in the electronic apparatus, having the plurality of the signals using the USB PD device.

Moreover, FIG. 50B shows an example of including a plurality of the receptacles 43R, 44R connected to the outside thereof in one internal circuit 72, in an example of containing the plug 2 connectable to the outlet 1 in the electronic apparatus 7, and also including internal circuits 71, 72 respectively containing the PD devices 41, 42 and the receptacles 41R, 42R in the electronic apparatus 7.

Also in FIGS. 50A and 50B, the receptacles 41R and 42R can be connected to each other by the power line POL and the communication dedicated line COL. Moreover, in FIGS. 50A and 50B, the control input signals of the receptacles 41R and 42R for the PD devices (PD) 41 and 42 can be switched by the signal conversion and switching circuit 25.

(Protection Function)

Figure 51A:
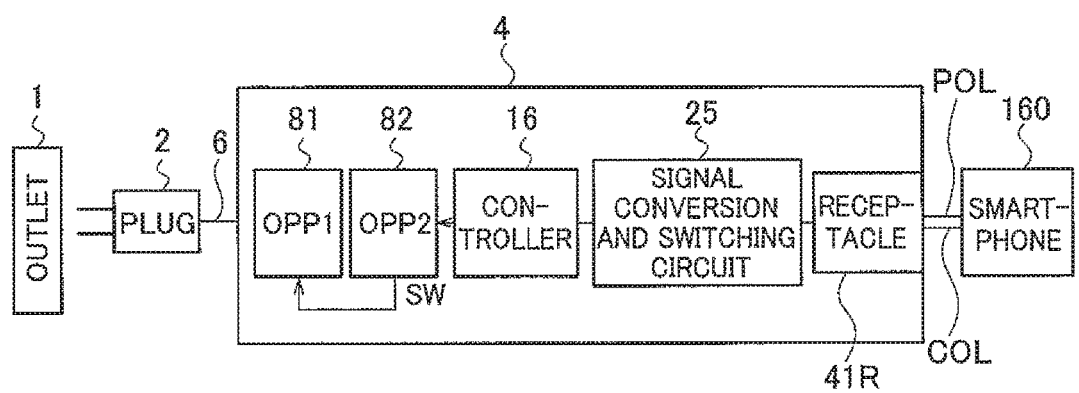
FIG. 51A is an explanatory diagram of a protection function of the USB PD device according to the embodiments in the case where a smartphone is used as a connecting target.
Figure 51B:
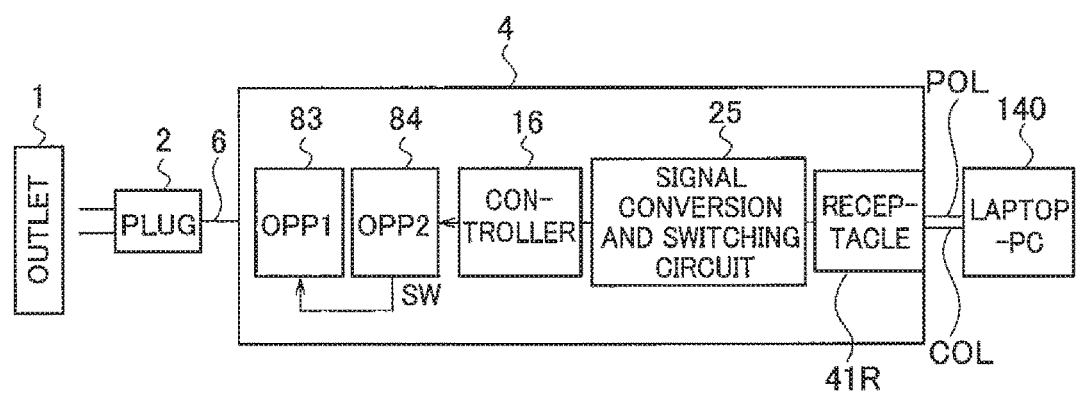
FIG. 51B is an explanatory diagram of a protection function of the USB PD device according to the embodiments in the case where a laptop PC is used as a connecting target.

FIG. 51A shows an explanatory diagram of a protection function for the PD device 4 according to the embodiments in a case of using a smartphone 160 as a connecting target, and FIG. 51B shows an explanatory diagram of the protection function for the PD device 4 according to the embodiments in a case of using a laptop PC 140 as a connecting target.

As shown in FIGS. 51A and 52B, the PD device 4 according to the embodiments may include: a primary-side OverPower Protecting circuit (OPP1) (81, 83); and a secondary-side OverPower Protecting circuit (OPP2) (82, 84) connected to the primary-side overpower protecting circuit (OPP1) (81, 83). The primary-side overpower protecting circuit (OPP1) (81, 83) is connected to a primary-side controller (not shown). Moreover, the primary-side overpower protecting circuit (OPP1) (81, 83) may be contained in the primary-side controller. The secondary-side overpower protecting circuit (OPP2) (82, 84) is connected to the secondary-side controller 16.

Moreover, as shown in FIGS. 51A and 51B, the receptacle 41R and the connecting target (e.g., the smartphone 160 and the laptop PC 140) are connected to each other by the power line POL and the communication dedicated line COL. The signal conversion and switching circuit 25 is connected between the secondary-side controller 16 and the receptacle 41R, and the control input signal of the receptacle 41R for the PD device (PD) (41, 42) can be switched by the signal conversion and switching circuit 25.

In accordance with target equipment (target sets) connected to the receptacle 41R, electric power information and communication control information in the receptacle 41R are transmitted to the secondary-side overpower protecting circuit (OPP2) (82, 84) from the secondary-side controller 16, and then the secondary-side overpower protecting circuit (OPP2) (82, 84) transmits the aforementioned electric power information and communication control information to the primary-side overpower protecting circuit (OPP1) (81, 83). Consequently, an overcurrent detecting set value can be changed in accordance with the target equipment (target sets) connected to the receptacle 41R, thereby executing power change of the DC/DC converter 13.

Any of the primary-side overpower protecting circuit (OPP1) 81 and the secondary-side overpower protecting circuit (OPP2) 82 may determine whether the electric power information and communication control information in the receptacle 41R exceeds the overcurrent detecting set value.

If it is determined that the electric power information and communication control information in the receptacle 41R exceed the overcurrent (overpower) detecting set value, the primary-side overpower protecting circuit (OPP1) (81, 83)

transmits an overcurrent (overpower) protecting control signal to the primary-side controller (not shown), thereby executing the change for controlling the electric power in the DC/DC converter 13.

Various functions, e.g. Over Current Protection (OCP), Over Power Protection (OPP), Over Voltage Protection (OVP), Over Load Protection (OLP), and Thermal Shut Down (TSD), are applicable to the PD device 4 according to the embodiments.

The PD device 4 according to the embodiments includes a sensor (SENSOR) protection function for executing protection corresponding to the characteristics of a certain sensor element connected to the primary-side controller (not shown), for example.

When the overcurrent (overpower) detecting set value is changed in the PD device 4 according to the embodiments, the electric power information and communication control information in the receptacle 41R are transmitted to the primary-side overpower protecting circuit (OPP1) (81, 83) through the secondary-side controller 16 and the secondary-side overpower protecting circuit (OPP2) (82, 84), as mentioned above. Consequently, an overcurrent detecting set value can be changed in accordance with the target equipment (target sets) connected to the receptacle 41R, thereby executing power change of the DC/DC converter 13.

Moreover, when the overcurrent (overpower) detecting set value is changed in the PD device 4 according to the embodiments, the electric power information and communication control information in the receptacle 41R may be directly transmitted to the primary-side overpower protecting circuit (OPP1) (81, 83) from the secondary-side controller 16, thereby directly changing the set value in the primary-side overpower protecting circuit (OPP1) (81, 83).

Moreover, the electric power information may be directly transmitted to the primary-side overpower protecting circuit (OPP1) (81, 83) from the outside of the PD device 4 according to the embodiments.

Thus, according to the PD device 4 according to the embodiments, it is possible to change the PD level in accordance with the target equipment (target sets) connected to the receptacle 41R, in the primary-side overpower protecting circuit (OPP1) (81, 83). Consequently, a destruction of the target equipment (target sets) can be prevented under an abnormal state.

When using a smartphone 160 as a connecting target, with respect to the smartphone 160 (the amount of power 5V·1 A=5 W), if the electric power information and communication control information of 7 W is transmitted to the secondary-side overpower protecting circuit (OPP2) 82 from the secondary-side controller 16, for example, the electric power information and communication control information of 7 W is transmitted to the primary-side overpower protecting circuit (OPP1) 81 from the secondary-side overpower protecting circuit (OPP2) 82, and then the overcurrent (overpower) detecting set value is changed (SW) from 7 W up to 10 W in the primary-side overpower protecting circuit (OPP1) 81. Consequently, the electric power up to 10 W can be transmitted, in the DC/DC converter in the PD device 4 according to the embodiments.

When using a laptop PC 140 as a connecting target, with respect to the laptop PC 140 (the amount of power 20V·3 A=60 W), if the electric power information and communication control information of 80 W is transmitted to the secondary-side overpower protecting circuit (OPP2) 84 from the secondary-side controller 16, for example, the electric power information and communication control information of 80 W is transmitted to the primary-side overpower protecting circuit (OPP1) 83 from the secondary-side overpower protecting circuit (OPP2) 84, and then the overcurrent (overpower) detecting set value is changed (SW) from 80 W up to 100 W in the primary-side overpower protecting circuit (OPP1) 83. Consequently, the electric power up to 100 W can be transmitted, in the DC/DC converter in the PD device 4 according to the embodiments.

(Receptacle/Plug)

Figure 52:
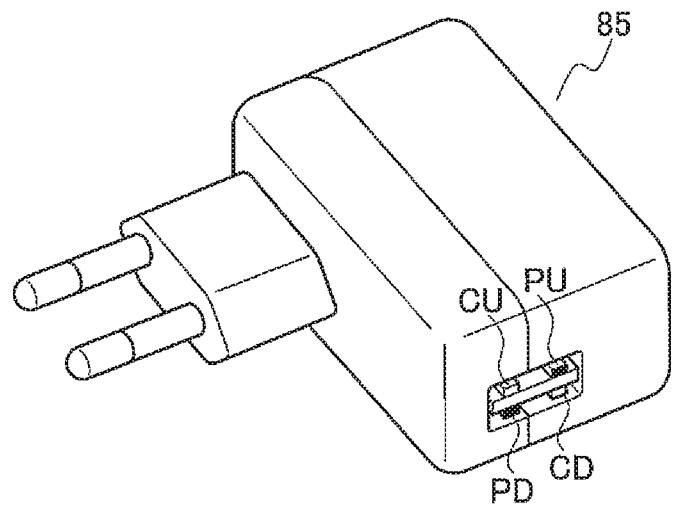
FIG. 52 shows a schematic bird's-eye view structure example of a PD device, in which a receptacle is mounted, according to the embodiments, applicable to the AC adapter, the AC charger, and the electronic apparatus.
Figure 55:
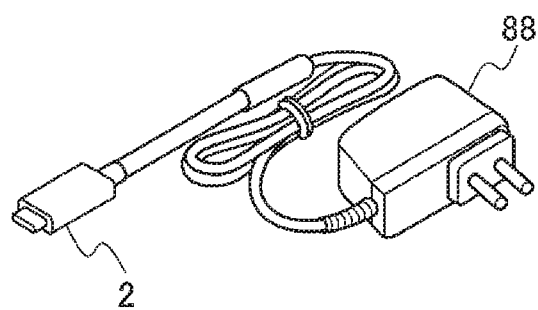
FIG. 55 shows a schematic bird's-eye view structure example of a PD device, in which a plug is mounted, according to the embodiments, applicable to the AC adapter, the AC charger, and the electronic apparatus.

As shown in FIG. 52, the PD device 85 according to the embodiments applicable to the AC adapter, the AC charger, the electronic apparatus, and the docking station in which the receptacle is mounted can be connected an outlet having AC power sources 100V-115V, and a plug connected to the power line POL and the communication dedicated line COL can be inserted thereinto. An example of a plug structure is shown in FIG. 21A or 55.

The power line POL can be connected to any of an upper-side power terminal PU and a lower-side power terminal PD of the receptacle, and the communication dedicated line COL can be connected to any of an upper-side communication terminal CU and a lower-side communication terminal CD of the receptacle.

The electric power information can be transmitted through the power line POL, and the communication control information can be transmitted through the communication dedicated line COL. As shown in FIG. 52, The PD device 85 applicable to the AC adapter, the AC charger, and the electronic apparatus in which the PD device according to the embodiments is mounted can be connected to any of the power terminals PU, PD and the communication terminals CU, CD, and there is no need to select the upper or lower side (front or back two surfaces) of the corresponding plug, and therefore convenience in use is effective. In the embodiments, an upper-side power terminal PU and a lower-side power terminal PD of the receptacle respectively correspond to an upper-side VBUS terminal and a lower-side VBUS terminal of the receptacle 41R (42R) shown in FIGS. 18 and 19. Moreover, an upper-side communication terminal CU and a lower-side communication terminal CD of the receptacle respectively correspond to an upper-side communication terminal CC1 (CC2) and a lower-side communication terminal CC1 (CC2) of the receptacle 41R (42R) shown in FIGS. 18 and 19. Note that an illustration of other terminals is omitted, for the purpose of simplified displaying.

Figure 53:
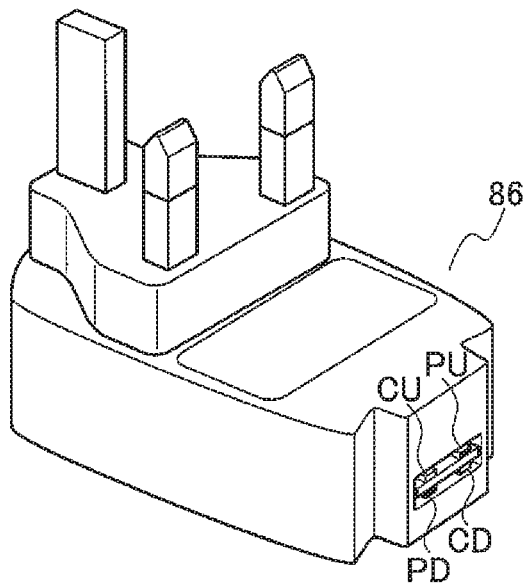
FIG. 53 shows a schematic bird's-eye view structure example of a PD device, in which a receptacle is mounted, according to the embodiments, applicable to the AC adapter, the AC charger, and the electronic apparatus.

Moreover, as shown in FIG. 53, the PD device 86 according to the embodiments applicable to the AC adapter, the AC charger, the electronic apparatus, and the docking station in which the receptacle is mounted can be connected an outlet having AC power sources 230V, and a plug connected to the power line POL and the communication dedicated line COL can be inserted thereinto. An example of a plug structure is shown in FIG. 21A or 55.

Figure 54:
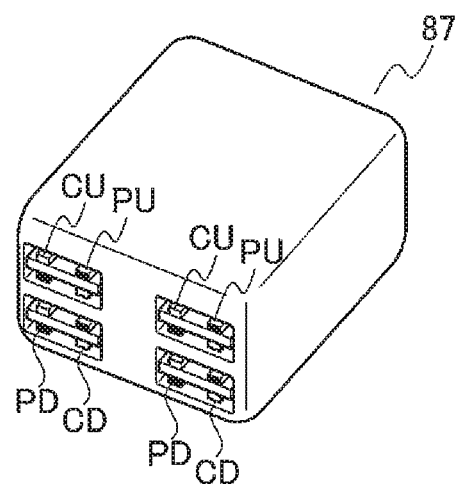
FIG. 54 shows a schematic bird's-eye view structure example of a PD device, in which a plurality of receptacles are mounted, according to the embodiments, applicable to the AC adapter, the AC charger, and the electronic apparatus.

Moreover, as shown in FIG. 54, the PD device 87 according to the embodiments applicable to the AC adapter, the AC charger, and the electronic apparatus in which the receptacle is mounted can be connected an outlet having AC power sources 100V-115V, and a plurality of plugs connected to the power line POL and the communication dedicated line COL can be inserted thereinto. An example of a plug structure is shown in FIG. 21A or 55.

One or a plurality of signal conversion and switching circuits can be contained in the AC adapter, the AC charger, the electronic apparatus, and the docking station. By such a signal conversion circuit and switching operation, the number of extraction of the outputs of the PD devices 85, 86, and 87 can be variously selected. For example, it is possible to set a ratio of the number of extraction as 1:N, 1:1, or N:1, where N is an integer greater than or equal to 2. Moreover, it is also possible to use in conjunction with the USB PD receptacle.

Moreover, as shown in FIG. 55, the PD device 88 according to the embodiments applicable to the AC adapter, the AC charger, and the electronic apparatus in which the plug 2 is mounted can be connected an outlet having AC power sources 100V-115V, and an outlet having AC power sources 230V. The plug 2 is synonymous with configurations shown in FIGS. 43A and 43B, 44B, 45A and 45C, 46A and 46C, 47A and 47C, and 48A and 48C. Moreover, the plug 2 may be applicable also to the USB PD.

(A plurality of Connecting Targets)

Figure 56:
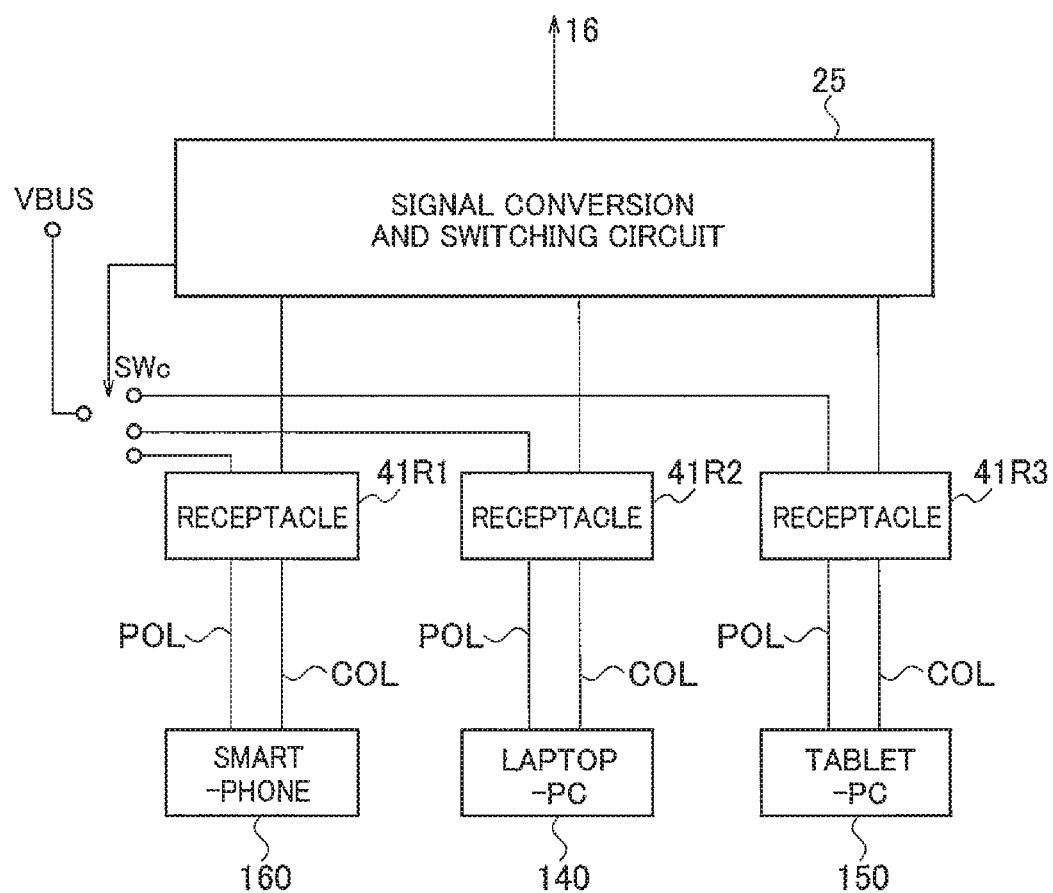
FIG. 56 is a schematic circuit block configuration diagram showing the PD device according to the embodiments connected to a plurality of connecting targets through a plurality of the receptacles.

FIG. 56 shows a schematic circuit block configuration of the PD device according to the embodiments connected to a plurality of connecting targets through a plurality of the receptacles. In FIG. 56, the signal conversion and switching circuit 25 connected with a secondary-side controller (not shown) is connected to a smartphone 160, a laptop PC 140, and a tablet PC 150 which are connecting targets respectively through the receptacles 41R1, 41R2, and 41R3. The power line POL and the communication dedicated line COL are connected to between the receptacles 41R1, 41R2, and 41R3 and the smartphone 160, the laptop PC 140, and the tablet PC 150. The power line POL is controlled to be switched by a switch $SW_C$ controllable by the signal conversion and switching circuit 25, and is connected to the power line output (VBUS). A control input signal from the smartphone 160, the laptop PC 140, and the tablet PC 150 to the PD device 4, and a control output signal from the PD device according to the embodiments to the smartphone 160, the laptop PC 140, and the tablet PC 150 can be transmitted on the communication dedicated line COL.

Figure 57:
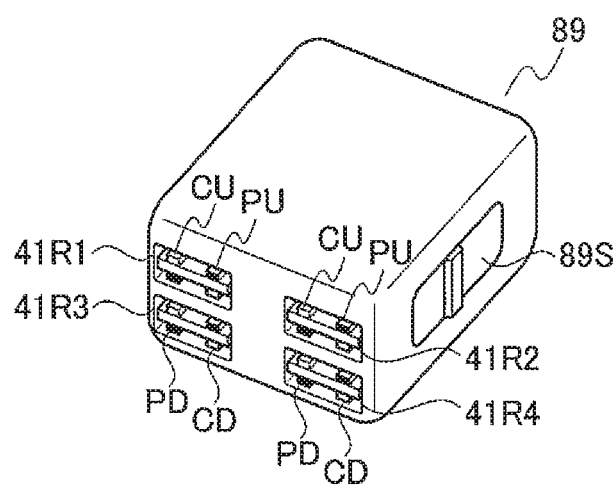
FIG. 57 shows a schematic bird's-eye view structure example of a PD device, in which a plurality of receptacles and a switch are mounted, according to the embodiments, applicable to the AC adapter, the AC charger, and the electronic apparatus.

FIG. 57 shows a schematic bird's-eye view structure example of the PD device 89 according to the embodiments applicable to the AC adapter, the AC charger, the electronic apparatus, and the docking station in which a plurality of receptacles 41R1, 41R2, 41R3, and 41R4 are mounted. In an example of FIG. 57, four receptacles 41R1, 41R2, 41R3, and 41R4 can be connected thereto, and can be manually switched by a switch 89S. The receptacles 41R1, 41R2, and 41R3 shown in FIG. 57 respectively correspond to the receptacles 41R1, 41R2, and 41R3 shown in FIG. 56. Moreover, although the example of providing four pieces of the receptacles 41R1, 41R2, 41R3, and 41R4 is shown in FIG. 57, it is also adaptable to an arbitrary number of pieces, e.g. two pieces, or six pieces, of the receptacles.

(USB PD Communications)

Figure 58A:
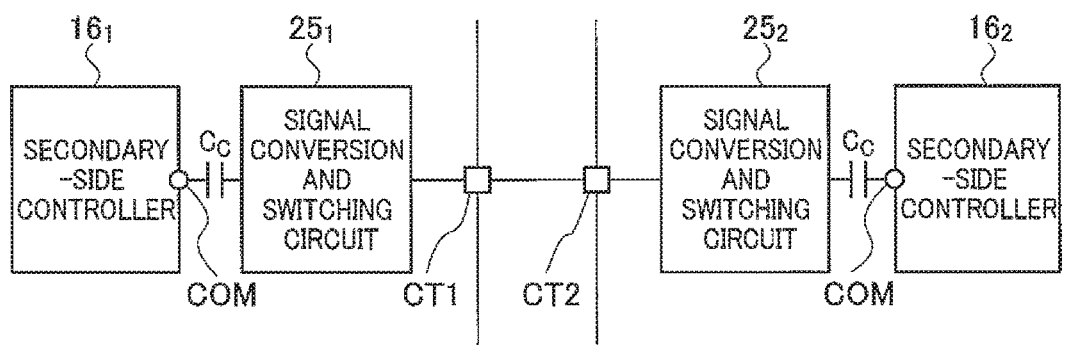
FIG. 58A is a schematic circuit block configuration diagram for explaining an example of using control input output signals for a USB-PD communication between a plurality of the PD devices according to the embodiments.
Figure 58B:
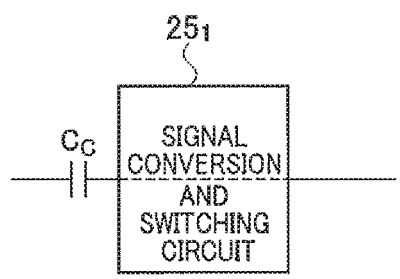
FIG. 58B is a schematic circuit block configuration diagram showing a case where the control input output signals are passed through an inside of the signal conversion and switching circuit in FIG. 58A.

FIG. 58A shows a schematic circuit block configuration for explaining an example of using control input output signals for a USB PB communications between a plurality of the PD devices according to the embodiments. FIG. 58B shows a schematic circuit block configuration showing a case where the control input output signal passes through in the inside of the signal conversion and switching circuit, in FIG. 58A.

In the first PD device, as shown in FIG. 58A, the secondary-side controller $16_1$ is connected to the signal conversion and switching circuit $25_1$ through the coupling capacitor $C_C$, and the signal conversion and switching circuit $25_1$ is connected to the control terminal CT1. An Illustration of other configurations are omitted.

In the second PD device, as shown in FIG. 58A, the secondary-side controller $16_2$ is connected to the signal conversion and switching circuit $25_2$ through the coupling capacitor $C_C$, and the signal conversion and switching circuit $25_2$ is connected to the control terminal CT2. An Illustration of other configurations are omitted. In addition, the signal conversion and switching circuits $25_1$ and $25_2$ may be respectively connected to the control terminals CT1 and CT2 through the AC coupling capacitors. Moreover, an output capacitor $C_O$ is connected between the power line POL (VBUS output) and the signal conversion and switching circuits $25_1$ and $25_2$ (illustration is omitted).

In the USB PD communications, the control terminals CT1 and CT2 are connected to each other by the power line POL.

When the control input output signal is used for the USB PD communications between the first PD device and the second PD device, it may be configured so that the control input output signal may pass through in the inside of the signal conversion and switching circuit $25_1$, as shown in FIG. 58B.

(PD System)

In the PD system to which the PD device according to the embodiments can be applied, a source of electric power can be switched without changing a direction of the cable. For example, electric charging of a battery in a laptop PC from external devices and power transmission from a battery or an internal PD device in the laptop PC to external devices (e.g., display etc.) can be achieved without replacement of the cable.

Moreover, power transmission and half-duplex data communications can be realized between two units through the power line POL and the communication dedicated line COL.

In the PD system to which the PD device according to the embodiments can be applied, DC power delivery (DC PD) (DC output VBUS) and data communications can be transmitted between the battery charger system and the laptop PC by using the power line POL and the communication dedicated line COL. In this context, the PD device according to the embodiments is mounted in the battery charger system and the laptop PC.

In the PD system to which the PD device according to the embodiments can be applied, the DC power delivery (DC output VBUS) and the data communications can be transmitted by using the power line POL and the communication dedicated line COL, between the smartphone and the laptop PC. In this context, the PD device according to the embodiments is mounted in the smartphone and the laptop PC.

Figure 59:
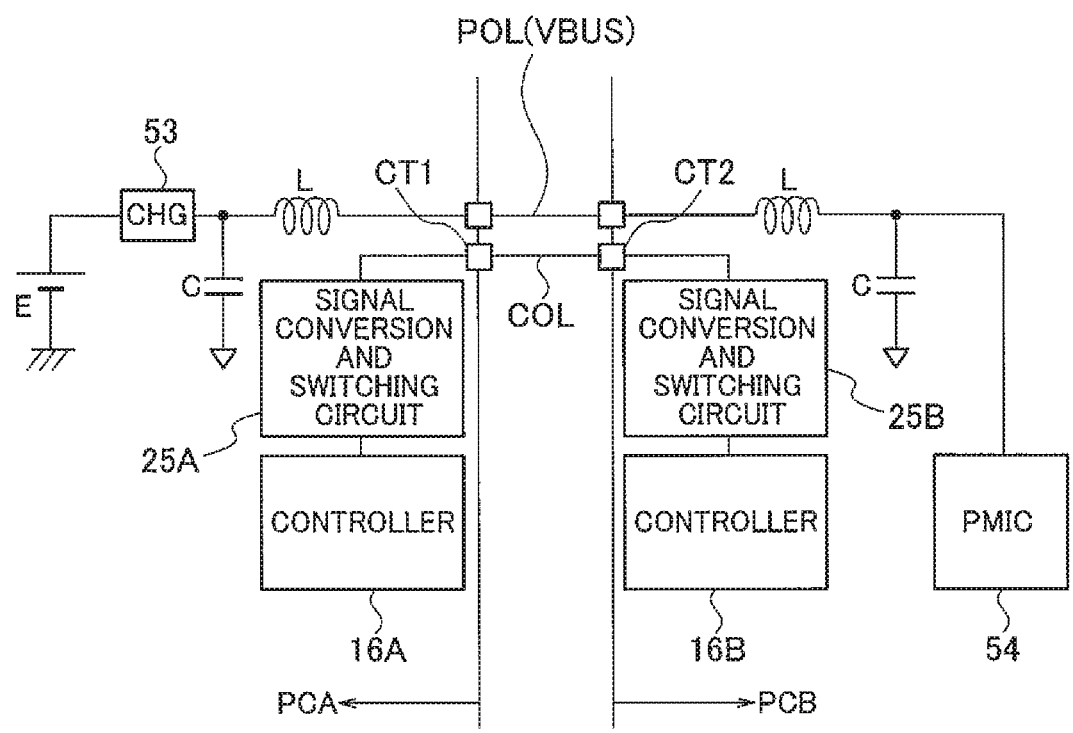
FIG. 59 is a schematic block configuration diagram for explaining the data communications and the PD between two PCs, in the PD system to which the PD device according to the embodiments can be applied.

FIG. 59 shows a schematic block configuration for explaining the data communications and the electric power supply between two personal computers (PCs) PCA and PCB, in the PD system to which the PD device according to the embodiments can be applied. In FIG. 59, illustration of the DC/DC converters are omitted, but the secondary-side controllers 16A and 16B, and the signal conversion and switching circuits 25A and 25B are shown. The PD devices according to the embodiments are respectively mounted in the personal computers (PCs) PCA and PCB. In addition, the secondary-side controllers 16A and 16B and the signal conversion and switching circuits 25A and 25B are respectively and directly connected to each other. Moreover, the secondary-side controllers 16A and 16B and the signal conversion and switching circuits 25A and 25B may be respectively connected to each other through the coupling capacitors $C_C$. Moreover, an output capacitor $C_O$ is connected between the power line POL (VBUS output) and the signal conversion and switching circuits 25A and 25B (illustration is omitted).

The personal computers (PC) PCA and PCB are connected to each other through the power line POL and the communication dedicated line COL. The communication dedicated line COL is connected between the control terminals CT1 and CT2.

As shown in FIG. 59, the control terminal CT1 is connected to the controller 16A through the signal conversion and switching circuit 25A, and the control terminal CT2 is connected to the controller 16B through the signal conversion and switching circuit 25B. Moreover, the signal conversion and switching circuits 25A and 25B, and the control terminals CT1 and CT2 may be respectively connected to each other through the AC coupling capacitors Ct. Moreover, a battery E and a battery charger IC (CHG) 53 connected to the battery E is mounted in the personal computer (PC) PCA, and a Power Management IC (PMIC) 54 is mounted in the personal computer (PC) PCB.

In the PD system to which the PD device according to the embodiments can be applied, electric charging of the battery E from the personal computer PCB to the personal computer PCA, and power transmission of the battery E from the personal computer PCA to the personal computer PCB can achieved without replacement of any cable, for example.

Moreover, the secondary-side controllers 16A and 16B are respectively connected to the communication dedicated lines COL through the signal conversion and switching circuits 25A and 25B, thereby realizing half-duplex data communications between the personal computers (PCs) PCA and PCB. In this context, the carrier frequency is approximately 23.2 MHz, for example, and the FSK modulation/demodulation frequency is approximately 300 kbps, for example. In this context, the Bit Error Rate (BER) is approximately $1 \times 10^{-6}$, and an LSI for built-in self tests (BIST) may be included therein, for example.

Figure 60A:
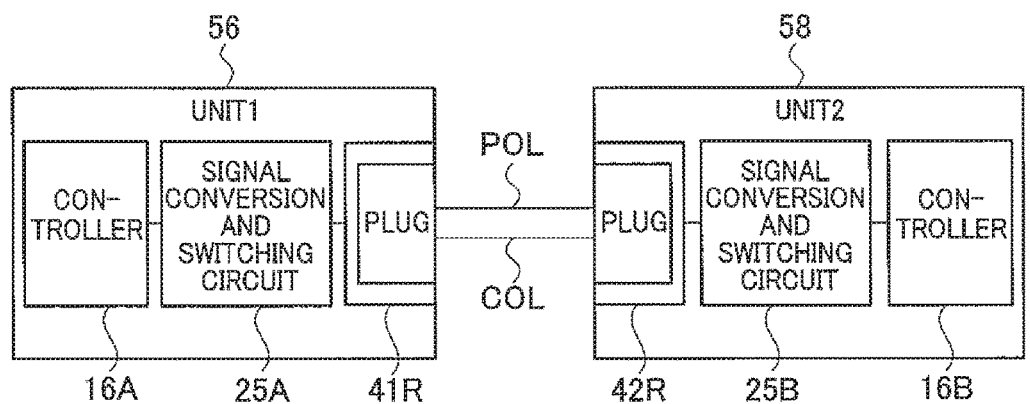
FIG. 60A is a schematic block configuration diagram for explaining the data communications and the power delivery between two units, in the PD system to which the PD device according to the embodiments can be applied.

FIG. 60A shows a schematic block configuration for explaining the data communications and the electric power supply between two units 56 and 58, in the PD system to which the PD device according to the embodiments can be applied.

The two units 56 and 58 are connected to each other by the power line POL and the communication dedicated line COL. The power line POL and the communication dedicated line COL is plug-connected to the receptacles 41R and 42R contained in the two units 56 and 58.

The two units 56 and 58 are arbitrary electronic apparatuses in which the PD devices according to the embodiments are respectively mounted. In FIG. 60A, illustration of the DC/DC converters are omitted, but the secondary-side controllers 16A and 16B, and the signal conversion and switching circuits 25A and 25B are shown. In addition, the secondary-side controllers 16A and 16B and the signal conversion and switching circuits 25A and 25B are respectively and directly connected to each other. Moreover, the secondary-side controllers 16A and 16B and the signal conversion and switching circuits 25A and 25B may be respectively connected to each other through the coupling capacitors $C_C$. Moreover, an output capacitor $C_O$ is connected between the power line POL (VBUS output) and the signal conversion and switching circuits 25A and 25B (illustration is omitted).

Figure 60B:
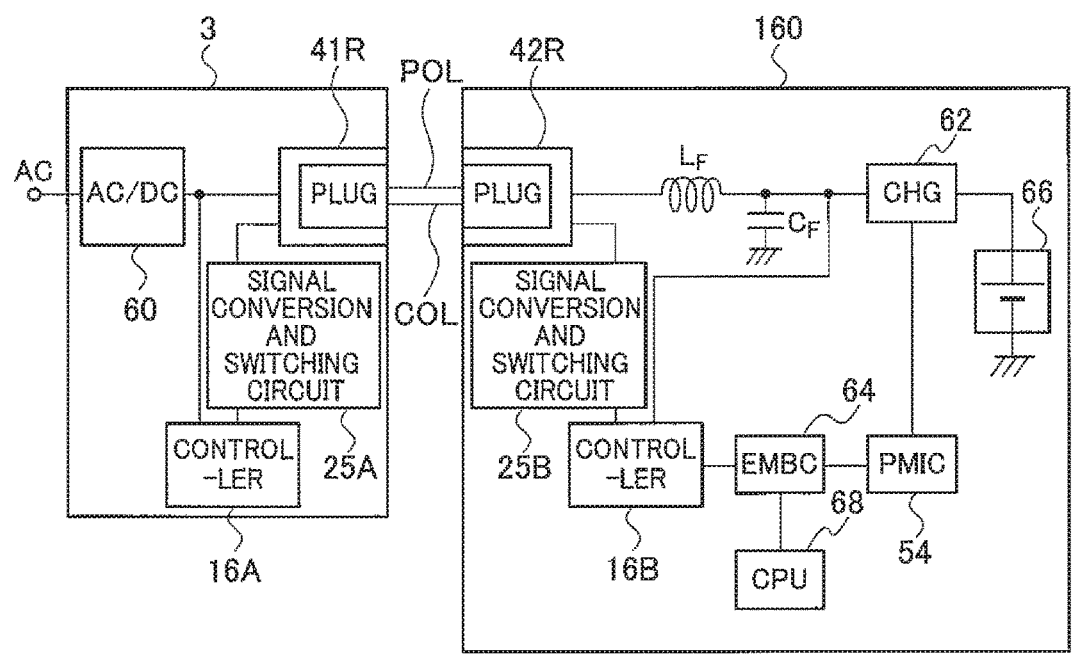
FIG. 60B is a schematic block configuration diagram showing a PD system including an AC adapter and a smartphone each containing the PD device according to the embodiments.

FIG. 60B shows a schematic block configuration of a PD system including an AC adapter/AC charger 3 and a smartphone 160 each which contains the PD device according to the embodiments.

The AC adapter/AC charger 3 and the smartphone 160 are connected to each other by the power line POL and the communication dedicated line COL. The power line POL and the communication dedicated line COL are plug-connected to the receptacles 41R and 42R respectively contained in the AC adapter 3 and the smartphone 160.

The PD devices according to the embodiments are respectively mounted in the AC adapter/AC charger 3 and the smartphone 160. In FIG. 60B, illustration of the DC/DC converters are omitted, but the secondary-side controllers 16A and 16B, and the signal conversion and switching circuits 25A and 25B are shown.

The AC adapter/AC charger 3 includes the AC/DC converter 60, the secondary-side controller 16A, and the signal conversion and switching circuit 25A. The smartphone 160 includes the secondary-side controller 16B, the signal conversion and switching circuit 25B, an embedded type controller (EMBC) 64, a CPU 68, a PMIC 54, a battery 66, and a battery charger IC (CHG) 62. The coupling capacitors $C_C$ may be respectively provided between the secondary-side controllers 16A and 16B and the signal conversion and switching circuits 25A and 25B. Moreover, an output capacitor $C_O$ is connected between the power line POL (VBUS output) and the signal conversion and switching circuits 25A and 25B (illustration is omitted). Moreover, the AC coupling capacitors Ct may be respectively provided between the signal conversion and switching circuits 25A and 25B and the receptacles 41R and 42R.

In the PD system to which the PD device according to the embodiments can be applied, electric charging of the battery 66 in the smartphone 160 from the AC adapter/AC charger 3, and power transmission to the external device from the battery 66 in the smartphone 160 can be achieved without replacement of the cable, for example.

Figure 61:
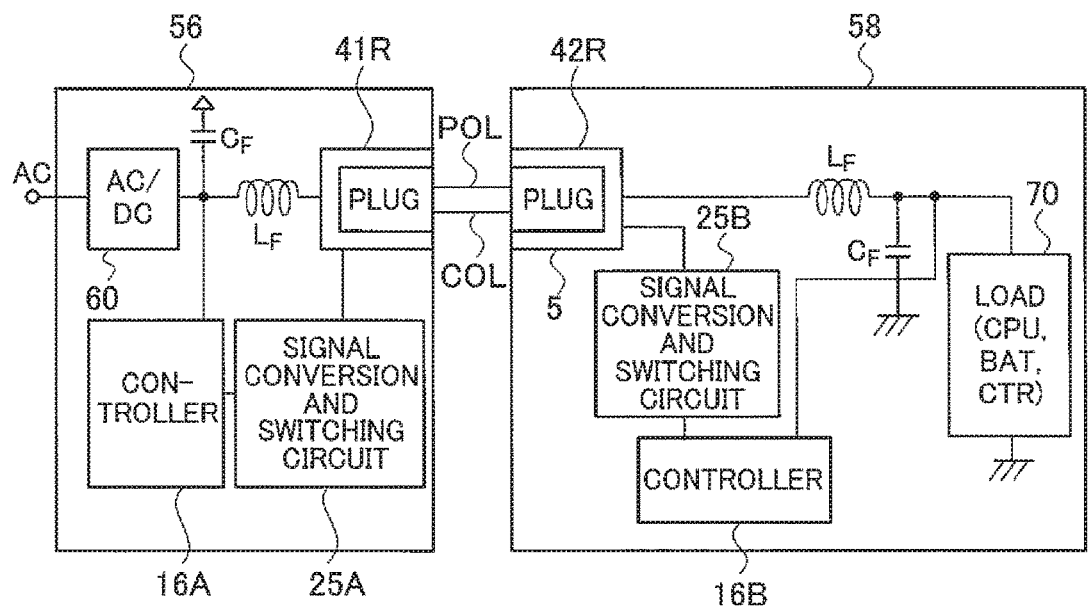
FIG. 61 is a schematic block configuration diagram of a PD system including two units each containing the PD device according to the embodiments.

FIG. 61 shows a schematic block configuration of a PD system including two units 56 and 58 each containing the PD device according to the embodiments.

The two units 56 and 58 are connected to each other by the power line POL and the communication dedicated line COL. The power line POL and the communication dedicated line COL is plug-connected to the receptacles 41R and 42R contained in the two units 56 and 58.

The PD devices according to the embodiments are respectively mounted in the two units 56 and 58. In FIG. 61, illustration of the DC/DC converters are omitted, but the secondary-side controllers 16A and 16B, and the signal conversion and switching circuits 25A and 25B are shown. Moreover, an output capacitor $C_O$ is connected between the power line POL (VBUS output) and the signal conversion and switching circuits 25A and 25B (illustration is omitted).

The unit 56 includes the AC/DC converter 60, the secondary-side controller 16A, and the signal conversion and switching circuit 25A, and the unit 58 includes the secondary-side controller 16B, the signal conversion and switching circuit 25B, and a load 70. In this context, the load 70 can be composed of a CPU, a battery BAT, a controller CTR, etc. The coupling capacitors may be respectively provided between the secondary-side controllers 16A and 16B and the signal conversion and switching circuits 25A and 25B. Moreover, the AC coupling capacitors Ct may be respectively provided between the signal conversion and switching circuits 25A and 25B and the receptacles 41R and 42R.

In the PD system to which the PD device according to the embodiments can be applied, power transmission from the unit 56 to the unit 58, and power transmission to external devices from the unit 58 can be achieved without replacement of the cable, for example.

Moreover, the secondary-side controllers 16A and 16B are respectively connected to the communication dedicated lines COL through the signal conversion and switching circuits 25A and 25B, thereby realizing half-duplex data communications between the units 56 and 58.

Figure 62:
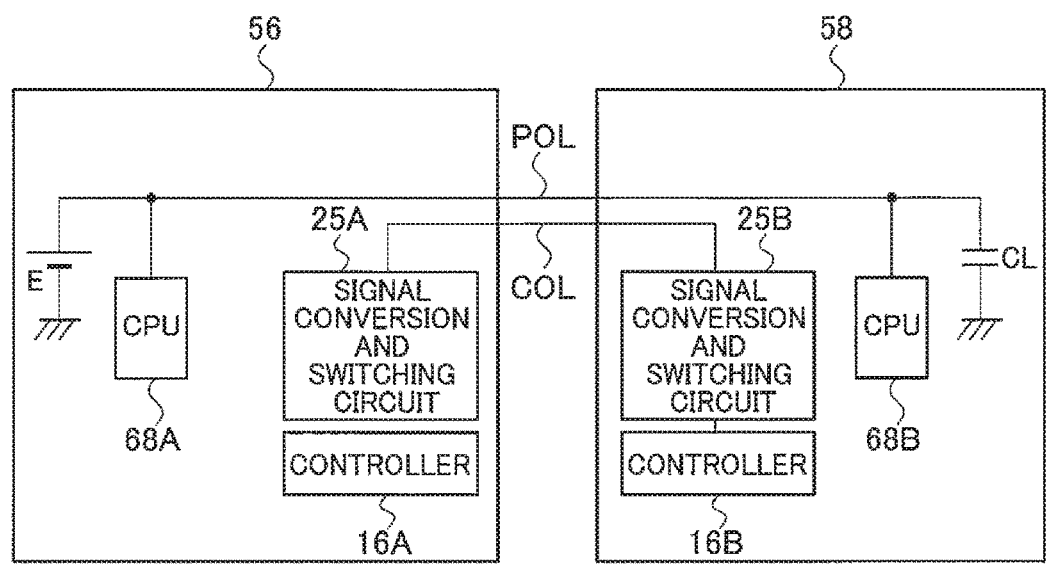
FIG. 62 is another schematic block configuration diagram showing a PD system, to which the PD device according to the embodiments can be applied, including two units different from those in FIG. 35.

In the PD system to which the PD device according to the embodiments can be applied, FIG. 62 shows a schematic block configuration composed of two units 56 and 58 different from the configuration shown in FIG. 61.

The unit 56 includes a battery E, a CPU 68A, the secondary-side controller 16A, and the signal conversion and switching circuit 25A, and the unit 58 includes a CPU 68B, the secondary-side controller 16B, the signal conversion and switching circuit 25B, and a load CL.

The two units 56 and 58 are connected to each other by the power line POL and the communication dedicated line COL. The power line POL and the communication dedicated line COL is plug-connected to the receptacles 41R and 42R (not shown) contained in the two units 56 and 58. The power line POL is connected between the battery E and the load CL, and the communication dedicated line COL is connected between the secondary-side controllers 16A and 16B. Moreover, an output capacitor $C_O$ is connected between the power line POL (VBUS output) and the signal conversion and switching circuits 25A and 25B (illustration is omitted). The coupling capacitors may be respectively provided between the secondary-side controllers 16A and 16B and the signal conversion and switching circuits 25A and 25B. Moreover, the AC coupling capacitors may be respectively provided between the signal conversion and switching circuits 25A and 25B and the communication dedicated line COL.

In the PD system to which the PD device according to the embodiments can be applied, power transmission from the unit 58 to the unit 56, and power transmission to the unit 58 from the battery E can be achieved without replacement of the cable, for example. Moreover, the half-duplex data communications, for example, can be realized between the units 56 and 58.

Figure 63:
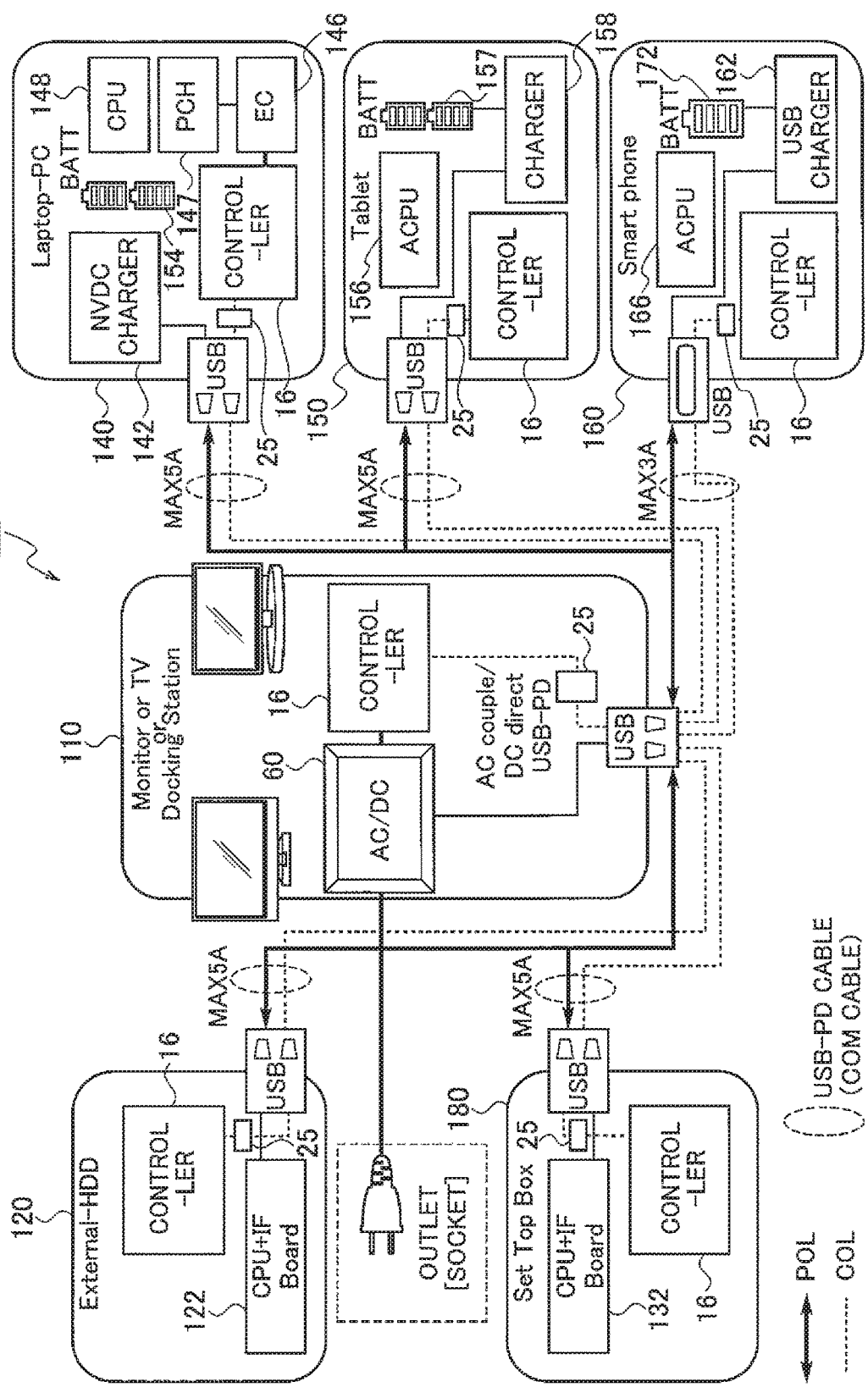
FIG. 63 is a schematic block configuration diagram showing a first PD system to which the PD device according to the embodiments can be applied.

As shown in FIG. 63, a first PD system 100 to which the PD device according to the embodiments can be globally applied includes: a monitor 110 connected to an outlet through a plug; and an external hard disk drive 120, a set top box 180, a laptop PC 140, a tablet PC 150, and a smartphone 160 each connected to the monitor 110 using the USB PD cable. In this context, otherwise, the monitors 110 may be TV or a docking station.

Although the PD device 4 according to the embodiments is mounted in each configuring elements, illustration of the DC/DC converter and the coupling capacitor $C_C$ is omitted, but the controller 16 and the signal conversion and switching circuit 25 are illustrated in FIG. 63. Moreover, an output capacitor $C_O$ is connected between the power line POL (VBUS output) and the signal conversion and switching circuit 25 (illustration is omitted). Moreover, the AC coupling capacitor may be applied to the communication dedicated line COL. Moreover, when applying the USB PD, a USB PD controller may be applied to the controller 16.

Power transmission and communications data transmission can be executed using the power line POL and the communication dedicated line COL, between the monitor 110, and the external hard disk drive 120, the set top box 180, the laptop PC 140, the tablet PC 150 and the smartphone 160. The power line POL is illustrated with the thick solid line, and the communication dedicated line COL is illustrated with the dashed line. When applying the USB PD, the power line POL may be used therefor, instead of the communication dedicated line COL illustrated with the dashed line. Moreover, the communication dedicated line COL is connected to the signal conversion and switching circuit 25 and the controller 16 through the AC coupling capacitor (not shown). Alternatively, the communication dedicated line COL may be directly connected to the signal conversion and switching circuit 25 and the controller 16, without through the AC coupling capacitor Ct.

Portions illustrated with the circular dashed-line illustrate that the cable used for the power line POL and the cable used for communication dedicated line COL are separated. A USB PD cable can be applied to the cable for the power line POL, and a communication dedicated cable (COM) can be applied to the cable for the communication dedicated line COL. Moreover, an internal cable for changing between the power line POL and the communication dedicated line COL may be used therefor.

The AC/DC converter 60, the controller 16, and the signal conversion and switching circuit 25 are mounted in the monitor 110. A CPU+interface board 122, the controller 16, and the signal conversion and switching circuit 25 are mounted in the external hard disk drive 120. A CPU+interface board 132, the controller 16, and the signal conversion and switching circuit 25 are mounted in the set top box 180. A Narrow Voltage DC/DC (NVDC) charger 142, a CPU 148, a Platform Controller Hub (PCH) 147, an Embedded Controller (EC) 146, the controller 16, and the signal conversion and switching circuit 25 are mounted in the laptop PC 140. An Application CPU (ACPU) 156, a battery charger IC (CHG) 158, a battery 157, the controller 16, and the signal conversion and switching circuit 25 are mounted in the tablet PC 150. An Application CPU (ACPU) 166, a USB charger 162, a battery 172, the controller 16, and the signal conversion and switching circuit 25 are mounted in a smartphone 160.

Figure 64:
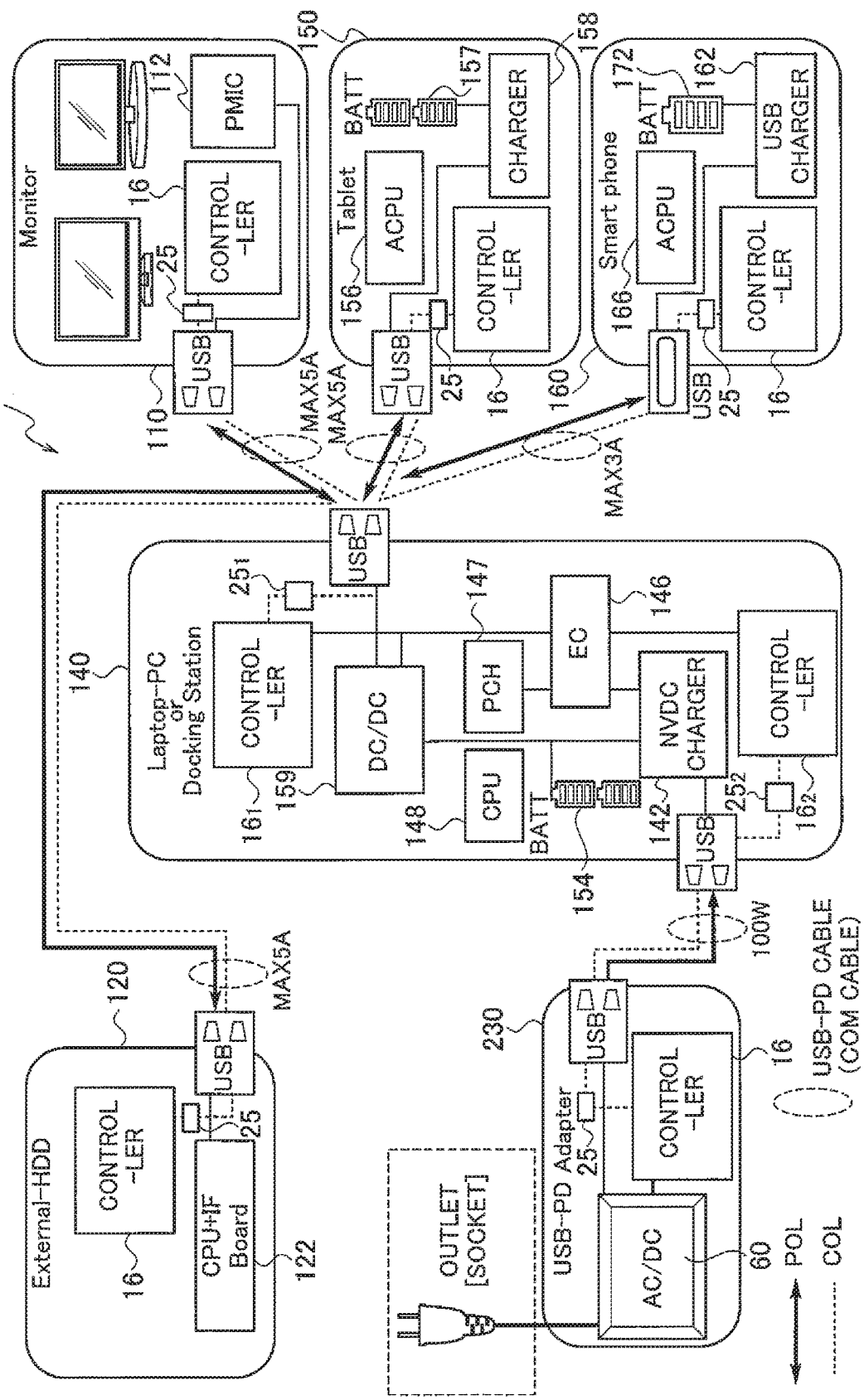
FIG. 64 is a schematic block configuration diagram showing a second PD system to which the PD device according to the embodiments can be applied.

As shown in FIG. 64, a second PD system 200 to which the PD device according to the embodiments can be globally applied includes: a USB PD adapter 230 connected to an outlet through a plug; a laptop PC 140 connected to the USB PD adapter 230; and an external hard disk drive 120, a monitor 110, a tablet PC 150, and a smartphone 160 connected to the laptop PC 140. In this context, otherwise, the laptop PC 140 may be a docking station.

Although the PD device 4 according to the embodiments is mounted in each configuring elements, illustration of the DC/DC converter and the coupling capacitor $C_C$ is omitted, but the controller 16 and the signal conversion and switching circuit 25 are illustrated in FIG. 64. Moreover, an output capacitor $C_O$ is connected between the power line POL (VBUS output) and the signal conversion and switching circuit 25 (illustration is omitted). Moreover, the AC coupling capacitor may be applied to the communication dedicated line COL. Moreover, when applying the USB PD, a USB PD controller may be applied to the controller 16.

Power transmission and communications data transmission can be executed using the power line POL and the communication dedicated line COL, between the laptop PC 140, and the USB PD adapter 230, the external hard disk drive 120, the monitor 110, the tablet PC 150 and the smartphone 160.

The AC/DC converter 60, the controller 16, and the signal conversion and switching circuit 25 are mounted in the USB PD adapter 230. The NVDC charger 142, the CPU 148, the PCH 147, the EC 146, the battery 154, the DC/DC converter 159, the controllers $16_1$ and $16_2$, and the signal conversion and switching circuits $25_1$ and $25_2$ are mounted in the laptop PC 140. The PMIC 112, the controller 16, and the signal conversion and switching circuit 25 are mounted in the monitor 110. Other configurations are the same as that of the first PD system 100 (FIG. 63).

Figure 65:
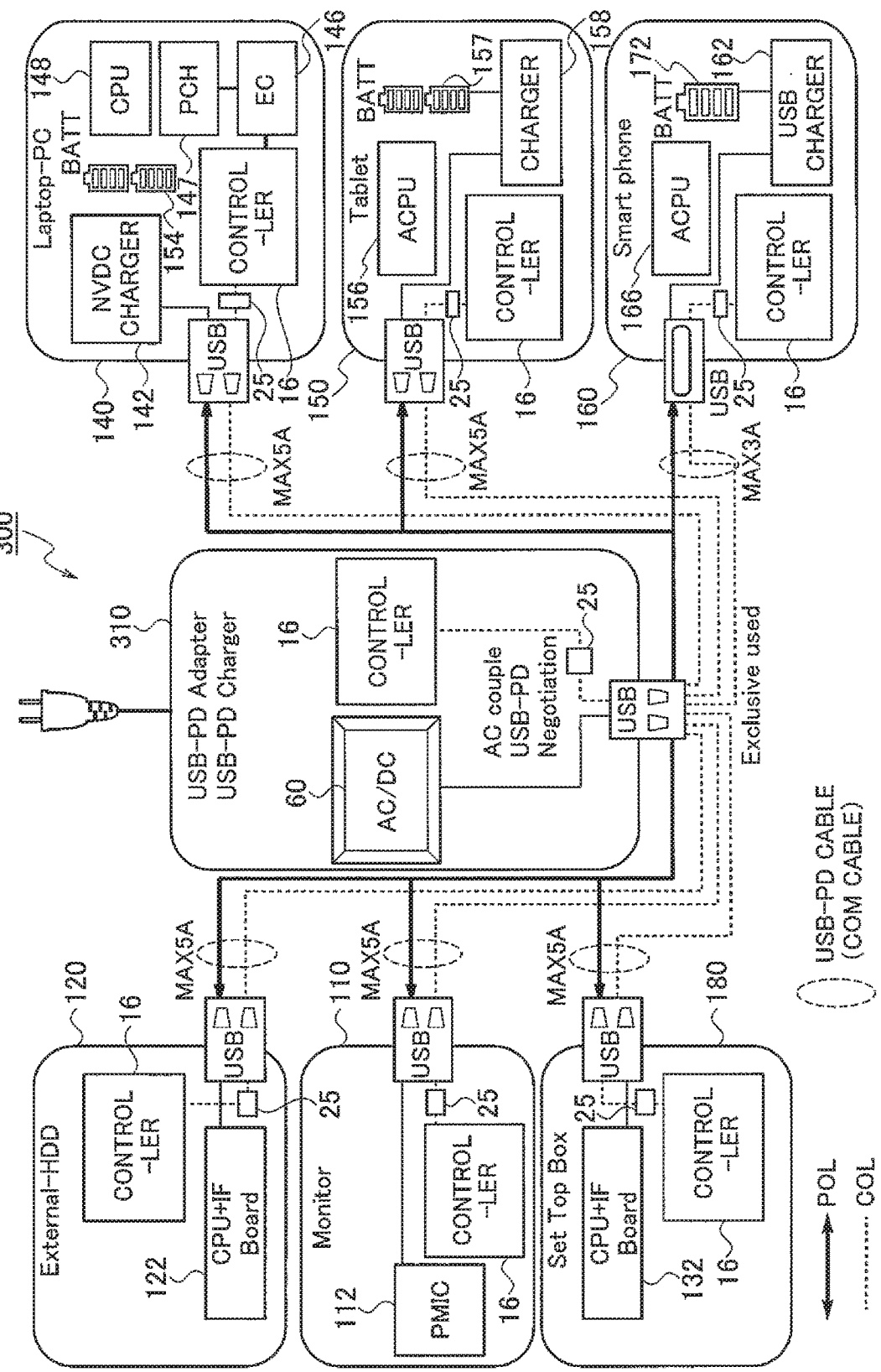
FIG. 65 is a schematic block configuration diagram showing a third PD system to which the PD device according to the embodiments can be applied.

As shown in FIG. 65, a third PD system 300 to which the PD device according to the embodiments can be globally applied includes: a USB PD adapter/charger 310 connected to an outlet through a plug; and an external hard disk drive 120, a monitor 110, a set top box 180, a laptop PC 140, a tablet PC 150, and a smartphone 160 each connected to the USB PD adapter/charger 310.

Although the PD device 4 according to the embodiments is mounted in each configuring elements, illustration of the DC/DC converter and the coupling capacitor $C_C$ is omitted, but the controller 16 and the signal conversion and switching circuit 25 are illustrated in FIG. 65. Moreover, an output capacitor $C_O$ is connected between the power line POL (VBUS output) and the signal conversion and switching circuit 25 (illustration is omitted). Moreover, the AC coupling capacitor may be applied to the communication dedicated line COL. Moreover, when applying the USB PD, a USB PD controller may be applied to the controller 16.

Power transmission and communications data transmission can be executed using the power line POL and the communication dedicated line COL, between the USB PD adapter/charger 310, and the external hard disk drive 120, the monitor 110, the set top box 180, the laptop PC 140, the tablet PC 150 and the smartphone 160.

The AC/DC converter 60, the controller 16, and the signal conversion and switching circuit 25 are mounted in the USB PD adapter/charger 310. Other configurations are the same as those of the first PD system 100 (FIG. 63) and the second PD system 200 (FIG. 64).

Figure 66:
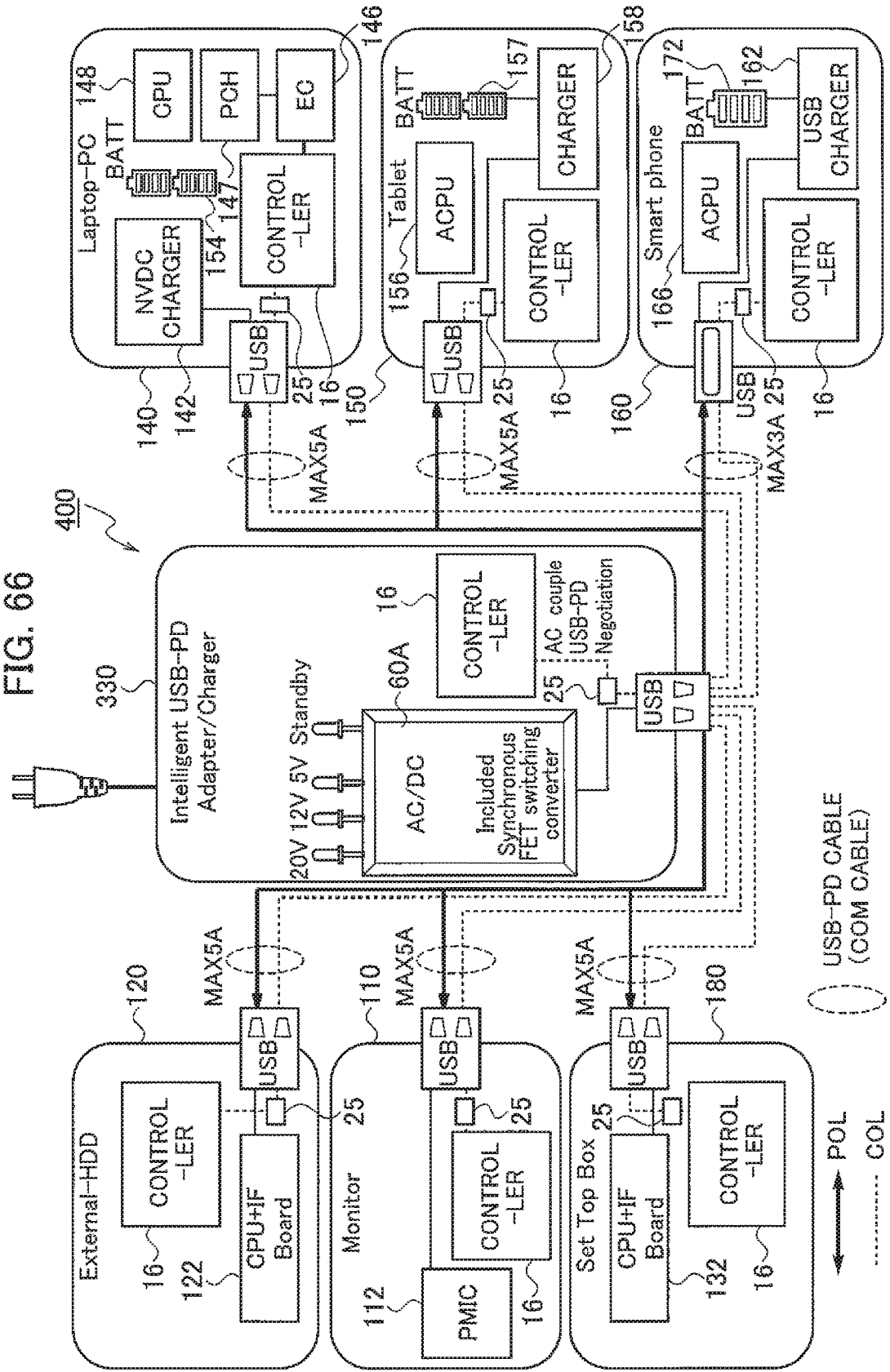
FIG. 66 is a schematic block configuration diagram showing a fourth PD system to which the PD device according to the embodiments can be applied.

As shown in FIG. 66, a fourth PD system 400 to which the PD device according to the embodiments can be globally applied includes: a high-performance USB PD adapter/charger 330 connected to an outlet through a plug; and an external hard disk drive 120, a monitor 110, a set top box 180, a laptop PC 140, a tablet PC 150, and a smartphone 160 each connected to the high-performance USB PD adapter/charger 330.

Although the PD device 4 according to the embodiments is mounted in each configuring elements, illustration of the DC/DC converter and the coupling capacitor $C_C$ is omitted, but the controller 16 and the signal conversion and switching circuit 25 are illustrated in FIG. 66. Moreover, an output capacitor $C_O$ is connected between the power line POL (VBUS output) and the signal conversion and switching circuit 25 (illustration is omitted). Moreover, the AC coupling capacitor may be applied to the communication dedicated line COL. Moreover, when applying the USB PD, a USB PD controller may be applied to the controller 16.

Power transmission and communications data transmission can be executed using the power line POL and the communication dedicated line COL, between the high-performance USB PD adapter/charger 330, and the external hard disk drive 120, the monitor 110, the set top box 180, the laptop PC 140, the tablet PC 150 and the smartphone 160.

The AC/DC converter 60A including a synchronous FET switching converter, the controller 16, and the signal conversion and switching circuit 25 are mounted in the high-performance USB PD adapter/charger 330. Other configurations are the same as that of the third PD system 300 (FIG. 65).

Figure 67:
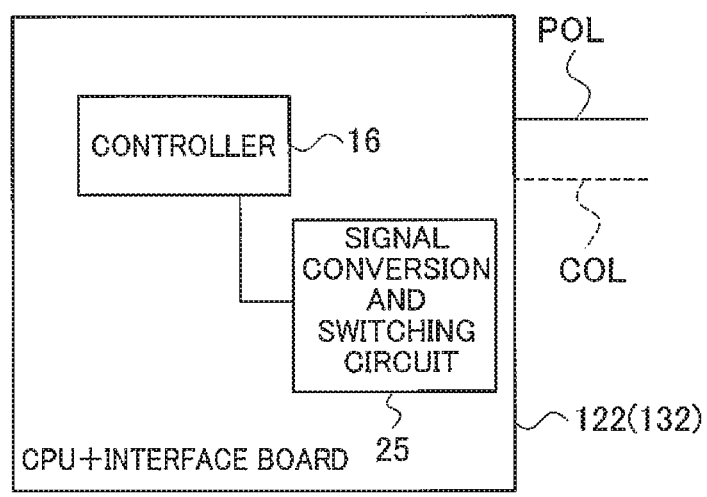
FIG. 67 is a schematic block configuration diagram showing a configuration in which a controller and a signal conversion and switching circuit are contained in a CPU interface, in the PD system to which the PD device according to the embodiments can be applied.

FIG. 67 shows a schematic block configuration having a configuration in which the controller 16 is contained in a CPU+interface board 122 (132), in the PD system to which the PD device according to the embodiments can be applied. More specifically, in the PD systems 100 to 400 respectively shown in FIGS. 63 to 66, the controller 16 may be contained in a CPU+interface board 122 (132). In this case, the power line POL and the communication dedicated line COL are used for the CPU+interface board 122, and thereby electric power and communications data can be transmitted. A chip in which the controller 16 is contained in such a CPU+interface board 122 (132) can also be configured as an integrated chip with a CPU including a controller, a DSP, and another controller.

As explained above, according to the embodiments, there can be provided the PD device, the AC adapter, the AC charger, the electronic apparatus, and the PD system, each capable of switching with respect to the plurality of the apparatuses, and each capable of controlling the output voltage value and the available output current value (MAX value).

Other Embodiments

As explained above, the embodiments have been described, as a disclosure including associated description and drawings to be construed as illustrative, not restrictive. This disclosure makes clear a variety of alternative embodiments, working examples, and operational techniques for those skilled in the art.

Such being the case, the embodiments cover a variety of embodiments and the like, whether described or not.

INDUSTRIAL APPLICABILITY

The PD device, the AC adapter, the electronic apparatus, and the PD system according to the embodiments are applicable to electrical household appliances and electrical equipment, mobile computing devices, etc.

What is claimed is:
1. A power delivery device comprising:
a DC/DC converter disposed between an input and a VBUS output;
a single primary-side controller configured to control an input current of the DC/DC converter;
a single signal conversion and switching circuit coupled to a plurality of control inputs, the signal conversion and switching circuit configured to execute signal conversion and switching of control input signals respectively supplied to each of the plurality of the control inputs from a plurality of external apparatuses, the plurality of external apparatuses being supplied with power;
an output capacitor connected between the VBUS output and the signal conversion and switching circuit in order that an AC signal component of the VBUS output is coupled to the signal conversion and switching circuit; and
a single secondary-side controller coupled to the signal conversion and switching circuit, the secondary-side controller configured to receive the control input signals subjected to the signal conversion and switching executed in the signal conversion and switching circuit, and configured to feed back the received control input signals to the primary-side controller, wherein
the single primary-side controller varies output voltage values and available output current values of the DC/DC converter to be respectively supplied to the corresponding external apparatuses by controlling the input current on the basis of the control input signal fed back from the single secondary-side controller.
2. The power delivery device according to claim 1, further comprising:

a coupling capacitor configured to couple the secondary-side controller and the signal conversion and switching circuit to each other.

3. The power delivery device according to claim 1, further comprising:
an AC coupling capacitor configured to couple the signal conversion and switching circuit and the control inputs.

4. The power delivery device according to claim 1, wherein
the signal conversion and switching circuit can further execute signal conversion and switching of an AC signal component of the VBUS output.

5. The power delivery device according to claim 1, further comprising:
a power output circuit connected to the primary-side controller, the power output circuit configured to supply output voltages to be respectively supplied to the corresponding external apparatuses to a plurality of VBUS outputs disposed in pairs with the plurality of the control inputs for the respective external apparatuses.

6. The power delivery device according to claim 5, wherein
the power output circuit comprises a plurality of DC/DC converters.

7. The power delivery device according to claim 1, wherein the signal conversion and switching circuit comprises:
a protocol conversion unit connected to the secondary-side controller, the protocol conversion unit configured to execute a frequency conversion; and
a communication circuit disposed between the protocol conversion unit and the control inputs, the communication circuit configured to execute a code conversion.

8. The power delivery device according to claim 7, wherein
the output capacitor is connected between the protocol conversion unit and the VBUS output.

9. The power delivery device according to claim 1, wherein
the signal conversion and switching circuit can be controlled by the secondary-side controller.

10. The power delivery device according to claim 1, wherein
the signal conversion and switching circuit comprises a switch controlled by the secondary-side controller, the switch configured to select between the output capacitor and the control inputs.

11. The power delivery device according to claim 1, wherein the signal conversion and switching circuit comprises: a first transceiver connected to the output capacitor; and a switch controlled by the secondary-side controller, the switch configured to select between the first transceiver and the control inputs.

12. The power delivery device according to claim 1, wherein
the signal conversion and switching circuit comprises a switch controlled by the secondary-side controller, the switch configured to select between the output capacitor and the control inputs.

13. The power delivery device according to claim 10, wherein: the signal conversion and switching circuit comprises:
a first transceiver connected to the output capacitor;
a second transceiver connected to the control inputs; and
a switch controlled by the secondary-side controller, the switch configured to select between the first transceiver and the second transceiver.

14. An AC adapter comprising the power delivery device according to claim 1.

15. An AC charger comprising the power delivery device according to claim 1.

16. An electronic apparatus comprising the power delivery device according to claim 1.

17. A power delivery device, comprising:
a DC/DC converter disposed between an input and a VBUS output;
a primary-side controller configured to control an input current of the DC/DC converter;
a signal conversion and switching circuit coupled to a control input, the signal conversion and switching circuit configured to execute signal conversion and switching of a control input signal of the control input; and
a secondary-side controller coupled to the signal conversion and switching circuit, the secondary-side controller configured to receive the control input signals subjected to the signal conversion and switching executed in the signal conversion and switching circuit, and configured to feed back the received control input signals to the primary-side controller, wherein
the primary-side controller varies an output voltage value and an available output current value of the DC/DC converter by controlling the input current on the basis of the control input signal fed back from the secondary-side controller, wherein
the signal conversion and switching circuit comprises a switch configured to select between the VBUS output and the control input.

18. A power delivery system comprising a power delivery device, the power delivery device comprising:
a DC/DC converter disposed between an input and a VBUS output;
a single primary-side controller configured to control an input current of the DC/DC converter;
a single signal conversion and switching circuit coupled to a plurality of control inputs, the signal conversion and switching circuit configured to execute signal conversion and switching of controls input signals respectively supplied to each of the plurality of the control inputs from a plurality of external apparatuses, the external apparatuses being supplied with power;
an output capacitor connected between the VBUS output and the signal conversion and switching circuit in order than an AC signal component of the VBUS output is coupled to the signal conversion and switching circuit; and
a single secondary-side controller coupled to the signal conversion and switching circuit, the secondary-side controller configured to receive the control input signals subjected to the signal conversion and switching executed in the signal conversion and switching circuit, and configured to feed back the received control input signals to the primary-side controller, wherein
the single primary-side controller varies output voltage values and available output current values of the DC/DC converter to be respectively supplied to the corresponding external apparatuses by controlling the input current on the basis of the control input signal fed back from the single secondary-side controller.

19. A power delivery device comprising:
a DC/DC converter disposed between an input and a VBUS output;
a primary-side controller configured to control an input current of the DC/DC converter;
a signal conversion and switching circuit coupled to a control input, the signal conversion and switching circuit configured to execute signal conversion and switching of a control input signal of the control input;
an output capacitor connected between the VBUS output and the signal conversion and switching circuit in order that an AC signal component of the VBUS output is coupled to the signal conversion and switching circuit; and
a secondary-side controller coupled to the signal conversion and switching circuit, the secondary-side controller configured to receive the control input signals subjected to the signal conversion and switching executed in the signal conversion and switching circuit, and configured to feed back the received control input signals to the primary-side controller, wherein
the primary-side controller varies an output voltage value and an available output current value of the DC/DC converter by controlling the input current on the basis of the control input signal fed back from the secondary-side controller, wherein
the signal conversion and switching circuit comprises a switch controlled by the secondary-side controller, the switch configured to select between the output capacitor and the control input.

* * * * *